US012588785B2

(12) United States Patent
Kalyvioti et al.

(10) Patent No.: US 12,588,785 B2
(45) Date of Patent: Mar. 31, 2026

(54) CONDIMENT DISPENSING APPARATUS, SYSTEM, AND METHODS OF USE

(71) Applicant: H. J. Heinz Company Brands LLC, Pittsburgh, PA (US)

(72) Inventors: Ivi Kalyvioti, Utrecht (NL); Gregg Timothy Francis Leech, Wigan (GB); Kim Bertens-Vlems, Berkel-Enschot (NL); Joseph Elisabeth Oberdorf, Maastricht (NL)

(73) Assignee: H. J. HEINZ COMPANY BRANDS LLC, Pittsburgh, PA (US)

( * ) Notice: Subject to any disclaimer, the term of this patent is extended or adjusted under 35 U.S.C. 154(b) by 158 days.

(21) Appl. No.: 18/576,317

(22) PCT Filed: Jul. 6, 2022

(86) PCT No.: PCT/US2022/036168
§ 371 (c)(1),
(2) Date: Jan. 3, 2024

(87) PCT Pub. No.: WO2023/283212
PCT Pub. Date: Jan. 12, 2023

(65) Prior Publication Data
US 2024/0341511 A1 Oct. 17, 2024

Related U.S. Application Data

(60) Provisional application No. 63/218,838, filed on Jul. 6, 2021, provisional application No. 63/218,826, filed on Jul. 6, 2021.

(51) Int. Cl.
*A47J 47/01* (2006.01)
*A47G 19/18* (2006.01)

(52) U.S. Cl.
CPC ............ *A47J 47/01* (2013.01); *A47G 19/183* (2013.01)

(58) Field of Classification Search
CPC .............................. A47J 47/01; A47G 19/183
See application file for complete search history.

(56) References Cited

U.S. PATENT DOCUMENTS

| | | | |
|---|---|---|---|
| 3,144,177 A | 8/1964 | Cookson | |
| 4,225,011 A | 9/1980 | Taguchi | |
| (Continued) | | | |

FOREIGN PATENT DOCUMENTS

| | | | |
|---|---|---|---|
| CN | 103233883 | 8/2013 | |
| CN | 106378275 | 2/2017 | |
| (Continued) | | | |

OTHER PUBLICATIONS

Patent Cooperation Treaty, International Search Report and Written Opinion for International Application No. PCT/US2022/036168 dated Oct. 21, 2022 (13 pages).

(Continued)

*Primary Examiner* — Jeremy Carroll
(74) *Attorney, Agent, or Firm* — Fitch, Even, Tabin & Flannery LLP

(57) ABSTRACT

In one aspect, a cartridge for containing condiment is provided. The cartridge includes a body having an inner substantially cylindrical surface for containing a fluid. The body has a first end defining an opening. The cartridge includes a plunger disposed within the body that is configured to slide axially within the body and to force fluid within the body toward the opening of the body. The cartridge includes a valve within the opening sealing the fluid within the body and permitting the fluid to exit the body.

15 Claims, 63 Drawing Sheets

(56)                    References Cited

U.S. PATENT DOCUMENTS

| | | | | |
|---|---|---|---|---|
| 4,349,133 | A * | 9/1982 | Christine | A47K 5/1215 222/207 |
| 4,858,788 | A | 8/1989 | Meckenstock | |
| 4,898,307 | A | 2/1990 | Tiramani | |
| 5,341,965 | A | 8/1994 | Maas | |
| 5,716,007 | A | 2/1998 | Nottingham | |
| 6,089,406 | A | 7/2000 | Feldner | |
| 6,269,837 | B1 | 8/2001 | Arent | |
| 6,367,664 | B1 | 4/2002 | Bunyan | |
| 6,802,436 | B2 | 10/2004 | Drennow | |
| 8,205,771 | B2 | 6/2012 | Compton | |
| 10,194,763 | B2 | 2/2019 | Sowieja | |
| 10,961,105 | B1 | 3/2021 | Rusch | |
| 11,759,060 | B2 | 9/2023 | Yang | |
| 2006/0186140 | A1 | 8/2006 | Kanfer | |
| 2006/0243740 | A1 | 11/2006 | Reynolds | |
| 2007/0119873 | A1 | 5/2007 | Boll | |
| 2008/0023505 | A1 | 1/2008 | Sassoon | |
| 2009/0308896 | A1 | 12/2009 | Stark | |
| 2011/0233234 | A1 | 9/2011 | Drygala | |
| 2012/0279985 | A1 | 11/2012 | Snow | |
| 2013/0134183 | A1 | 5/2013 | Van Diepen | |
| 2014/0061233 | A1 | 3/2014 | Lang | |
| 2020/0114378 | A1 * | 4/2020 | Barthelmes | B05B 11/0037 |
| 2021/0070532 | A1 * | 3/2021 | Cedergren | B67D 1/0001 |
| 2022/0024749 | A1 | 1/2022 | Rusch | |

FOREIGN PATENT DOCUMENTS

| | | | | |
|---|---|---|---|---|
| EP | 0523765 | B1 | 5/1996 | |
| EP | 0997641 | | 5/2000 | |
| EP | 1448475 | B1 | 4/2013 | |
| EP | 2558220 | B1 | 4/2014 | |
| JP | H06321273 | | 11/1994 | |
| JP | 2002529330 | | 9/2002 | |
| KR | 20170047296 | A | 5/2017 | |
| WO | 1997026998 | A3 | 10/1997 | |
| WO | WO-2007094833 | A1 * | 8/2007 | G01F 11/029 |
| WO | 2014015022 | | 1/2014 | |
| WO | 2013160869 | A3 | 2/2014 | |
| WO | 2014145371 | A1 | 9/2014 | |
| WO | 2022020687 | A1 | 1/2022 | |

OTHER PUBLICATIONS

EPO; Application No. 22838320.0; Supplementary European Search Report issued Jun. 6, 2025.

* cited by examiner

252

266

262

264

262

262

262

264

262

264

262

262

104

284

244A

244

244B

11C

284

316

362

364

362

366

240

368

11C

730

734B

734

734A

744

736

740

744

732

CONDIMENT DISPENSING APPARATUS, SYSTEM, AND METHODS OF USE

CROSS-REFERENCE TO RELATED APPLICATIONS

This application is a U.S. national phase application filed under 35 U.S.C. § 371 of International Application Number PCT/US2022/036168, filed Jul. 6, 2022, designating the United States which claims benefit of U.S. Provisional Application Nos. 63/218,826, filed Jul. 6, 2021, and 63/218,838, filed Jul. 6, 2021, which are hereby incorporated herein by reference in their entireties.

FIELD

This disclosure relates to fluid dispensing devices and, in particular, to condiment dispensing devices.

BACKGROUND

Restaurants often provide customers with one or more condiments for their food items. These condiments include, as examples, ketchup, mustard, mayonnaise, and barbeque sauce, as well as other condiments including particulate. Some restaurants provide large containers of one or more condiments along with a hand pump that is actuated to dispense the condiment to the user for use with their food.

Condiment dispensers are often required to be cleaned daily. Current hand pump solutions are difficult to clean. This is in part due to the long passageways that are difficult to reach along with the many internal crevices and ledges within the pump components and containers. Employees are often reluctant to clean current hand pump solutions due to the difficulty of doing so. Moreover, disassembling the pump may result in the loss of one or components, particularly the small components, during cleaning. As a result, the pumps are not cleaned as often, and, even when cleaned, the pump may not be fully cleaned. Thus, current pump solutions are prone to contamination. Additionally, many restaurants use more than one dispenser and, due to the thorough and manual cleaning that is required, restaurants may need additional resources to properly maintain their condiment dispensers.

Refilling the existing condiment dispensers may also be cumbersome as employees must withdraw the pump from a container of the condiment dispenser, connect the pump to the new condiment pouch, and carefully lower the pump and the condiment pouch into the container without the pump coming disconnected from the condiment pouch. Moreover, when the condiment dispenser needs to be refilled, the condiment dispenser may be out of use by customers for a significant period of time which the condiment is being loaded into the condiment dispenser. Additionally, once the condiment is placed in the condiment dispenser for use, the condiment is not sealed and is prone to contamination if not used within a certain period of time.

DETAILED DESCRIPTION

Figure 1A:
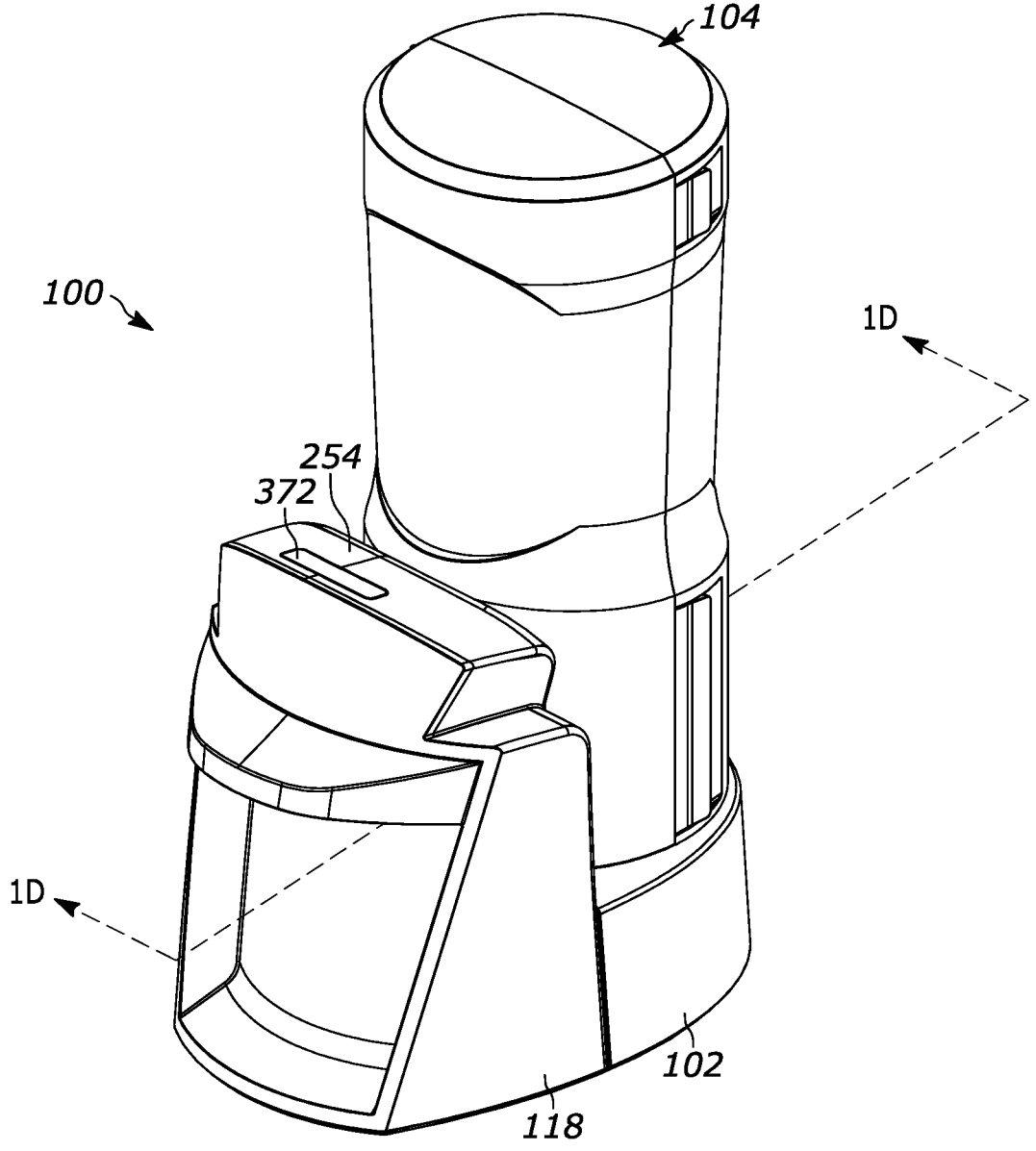
FIG. 1A is a top perspective view of a condiment dispenser according to a first embodiment and a cartridge.
Figure 1B:
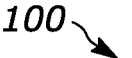
FIG. 1B is a right side elevation view of the condiment dispenser and cartridge of FIG. 1A.
Figure 1B:
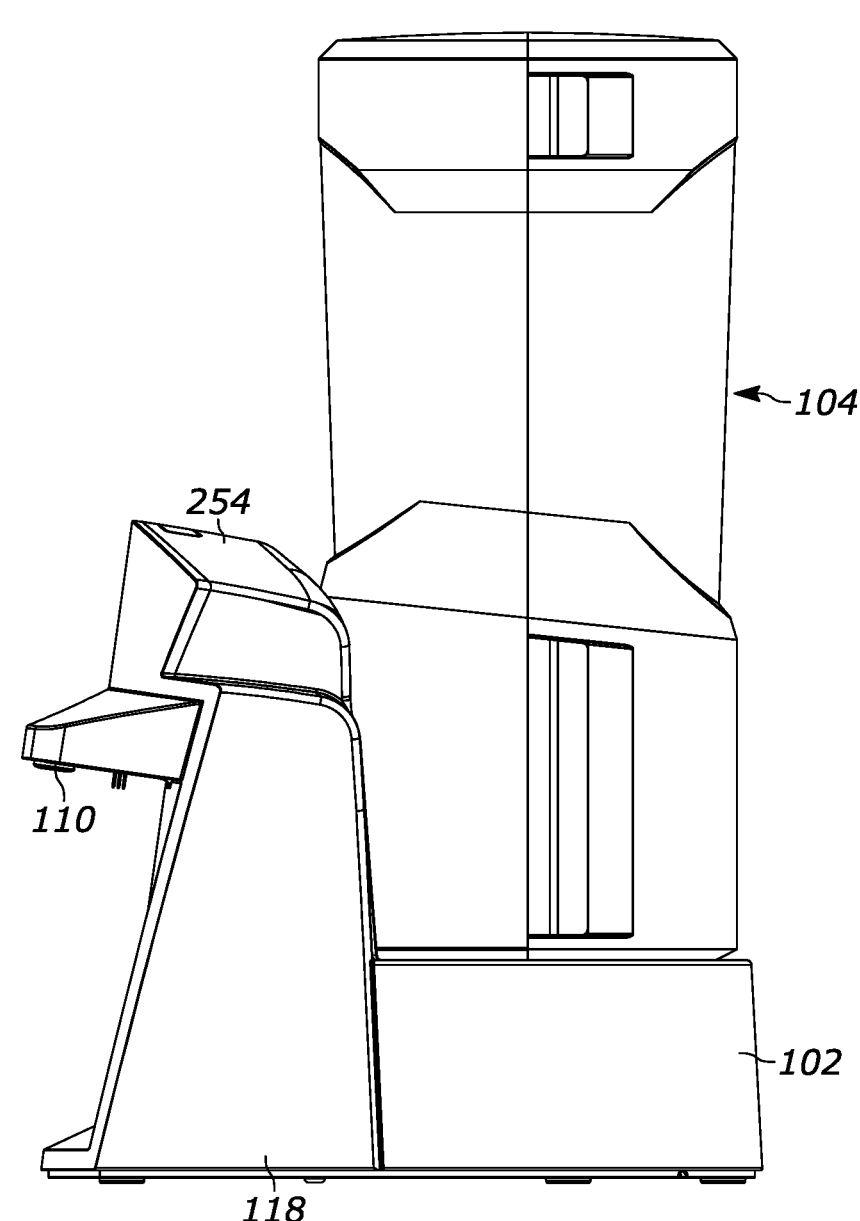
Figure 1C:
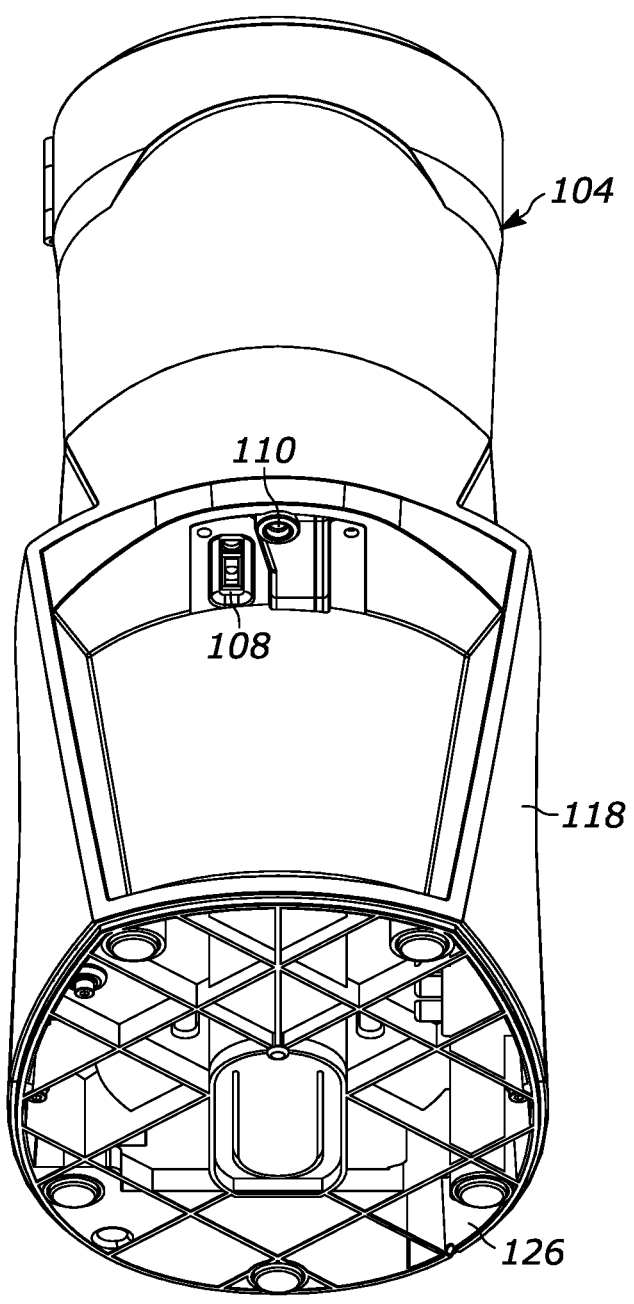
FIG. 1C is a bottom perspective view of the condiment dispenser and cartridge of FIG. 1A.
Figure 1D:
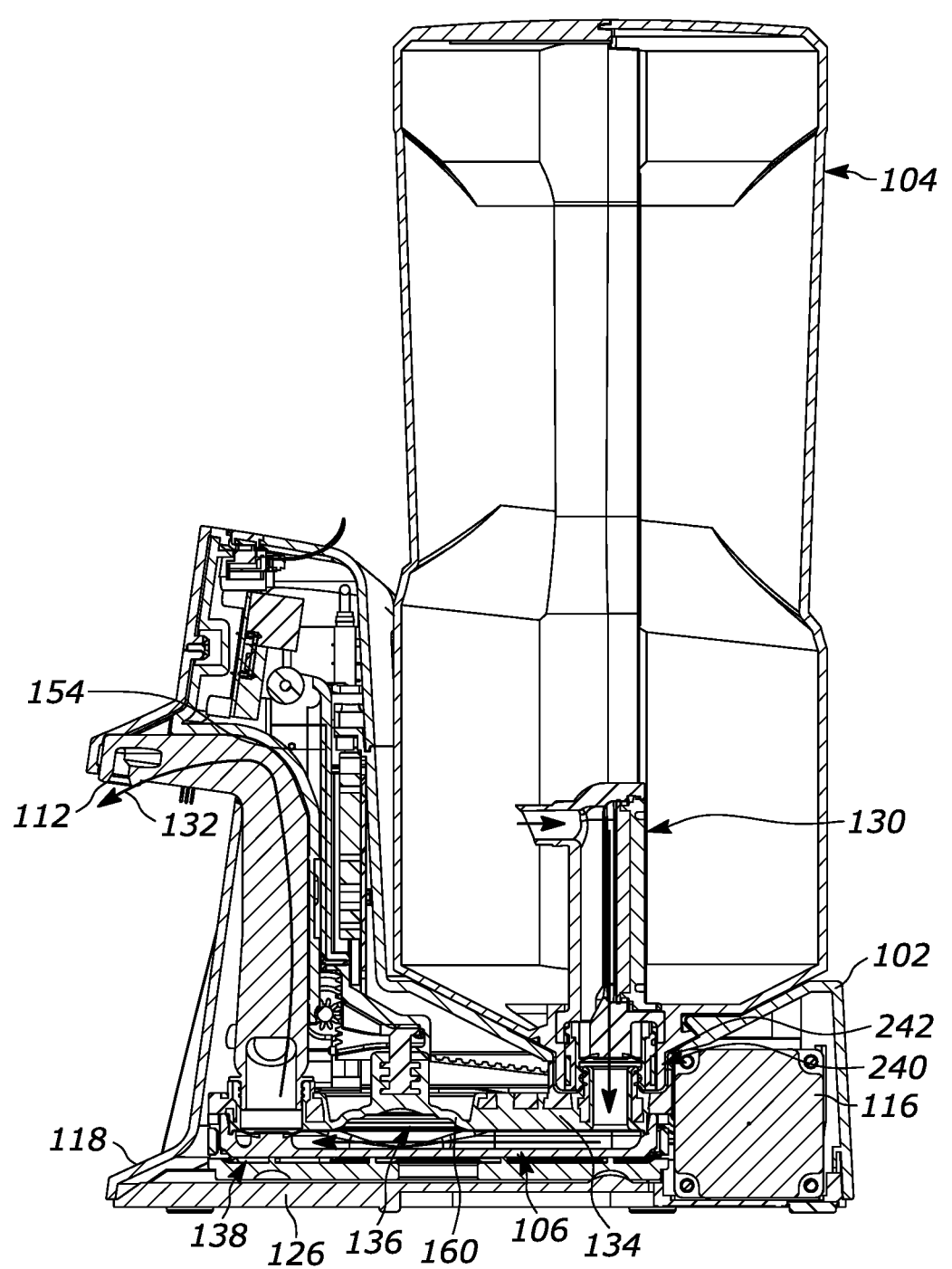
FIG. 1D is a side cross-sectional view of the condiment dispenser and cartridge of FIG. 1A taken along lines 1D-1D of FIG. 1A.
Figure 2:
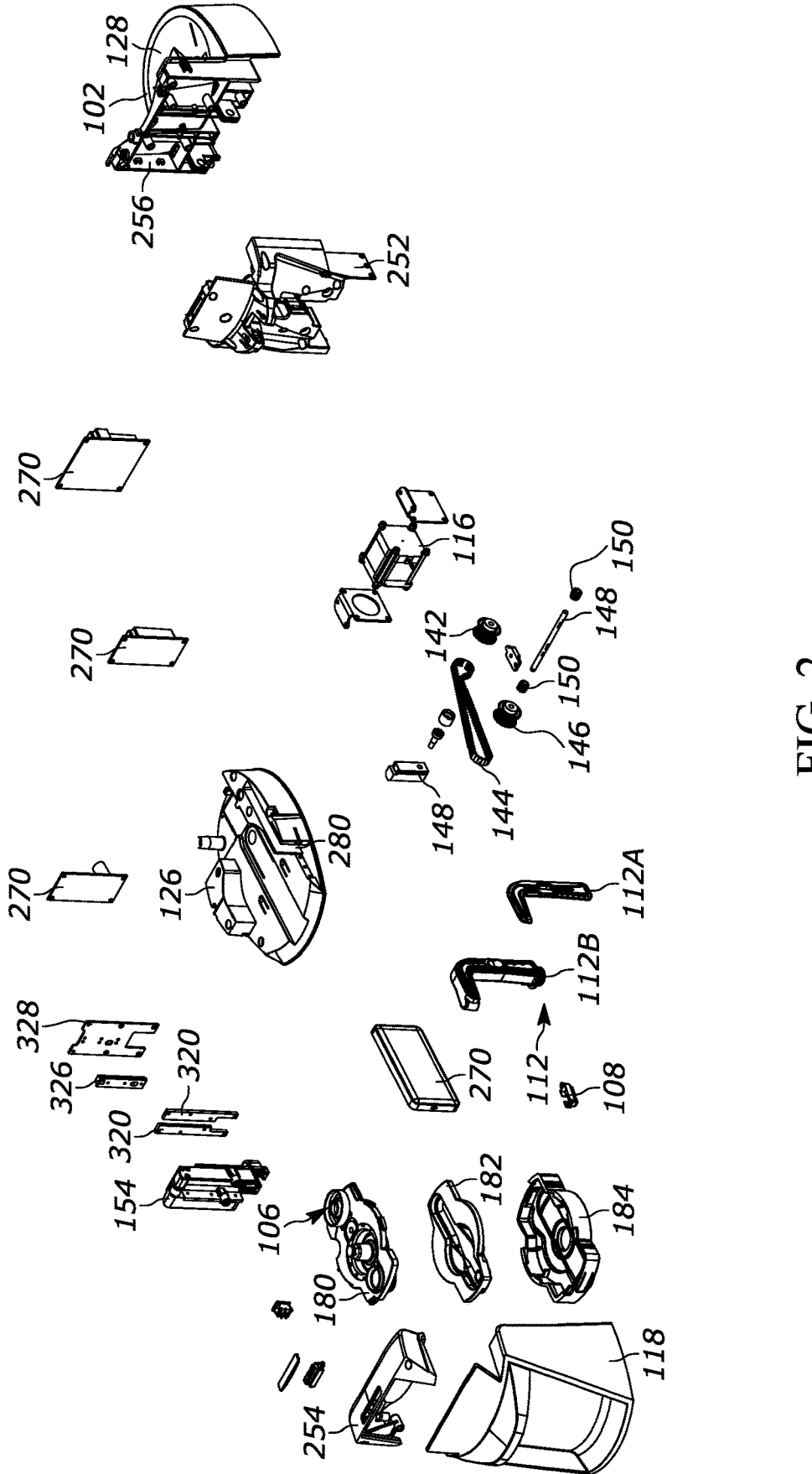
FIG. 2 is an exploded view of the condiment dispenser of FIG. 1A.

With respect to FIGS. 1A-2, a condiment dispenser 100 is shown according to a first embodiment. The condiment dispenser 100 includes a cartridge receiver 102 into which a removable cartridge 104 may be inserted. The cartridge 104 may include a fluid such as a condiment that flows into a pump, such as pump tray 106, of the condiment dispenser 100. The condiment dispenser 100 includes a sensor 108 positioned to detect proximity and/or motion proximate an outlet 110 of the spout 112. A controller 114 monitors the data provided by the sensor 108 and upon detecting proximity and/or motion proximate the outlet 110, the controller 114 may operate a motor 116. Operation of the motor 116 causes the pump tray 106 to draw fluid from the cartridge 104 and pump the fluid toward the outlet 110 of the spout 112 as described in further detail below.

Figure 3:
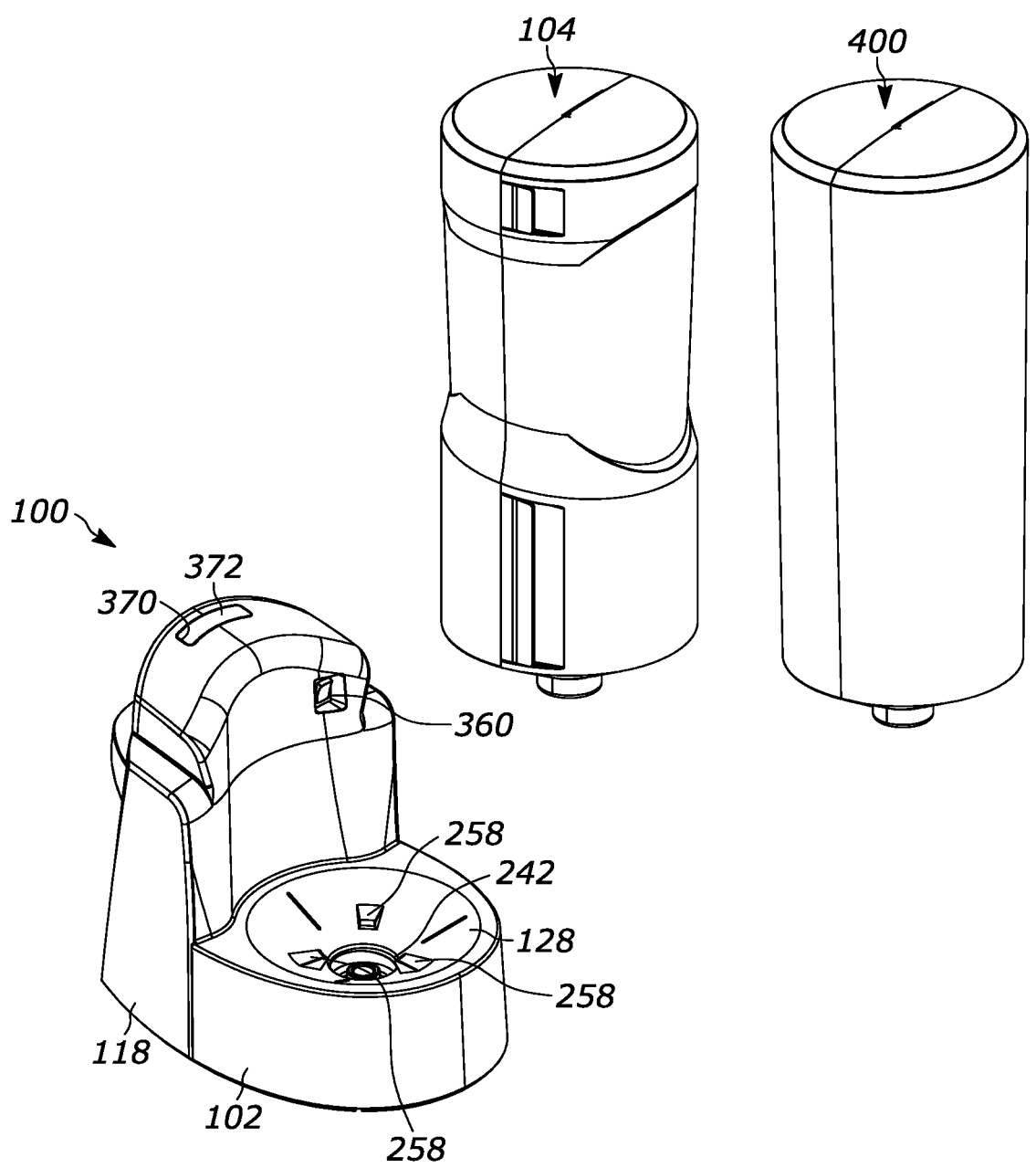
FIG. 3 is a side perspective view illustrating the compatibility of the condiment dispenser of FIG. 1A with various cartridge types.

With respect to FIG. 3, the cartridge 104 may be easily removed from the cartridge receiver 102 to be refilled and/or replaced by another cartridge 104. As described in further detail below, to remove the cartridge 104 from the condiment dispenser 100, a user may lift the cartridge 104 out of the cartridge receiver 102. In some forms, the cartridge 104 may need to be rotated to unlock the cartridge 104 from the condiment dispenser 100. Thus, when the cartridge 104 is empty or ready to be replaced, the old cartridge 104 may be quickly removed and replaced with a new and/or full cartridge 104. By providing a condiment dispenser 100 with replaceable cartridges, the condiment dispenser 100 can be easily refilled without decommissioning the condiment dispenser for long periods of time. This is especially advantageous in restaurants and food courts with high customer traffic as employees spend less time refilling condiment dispenser 100 and customers do not have to wait as long to get condiment after the condiment dispenser 100 runs empty. As described in further detail below, the condiment dispenser 100 may also be similarly used with cartridge 400 of FIGS. 13A-E.

Figure 4A:
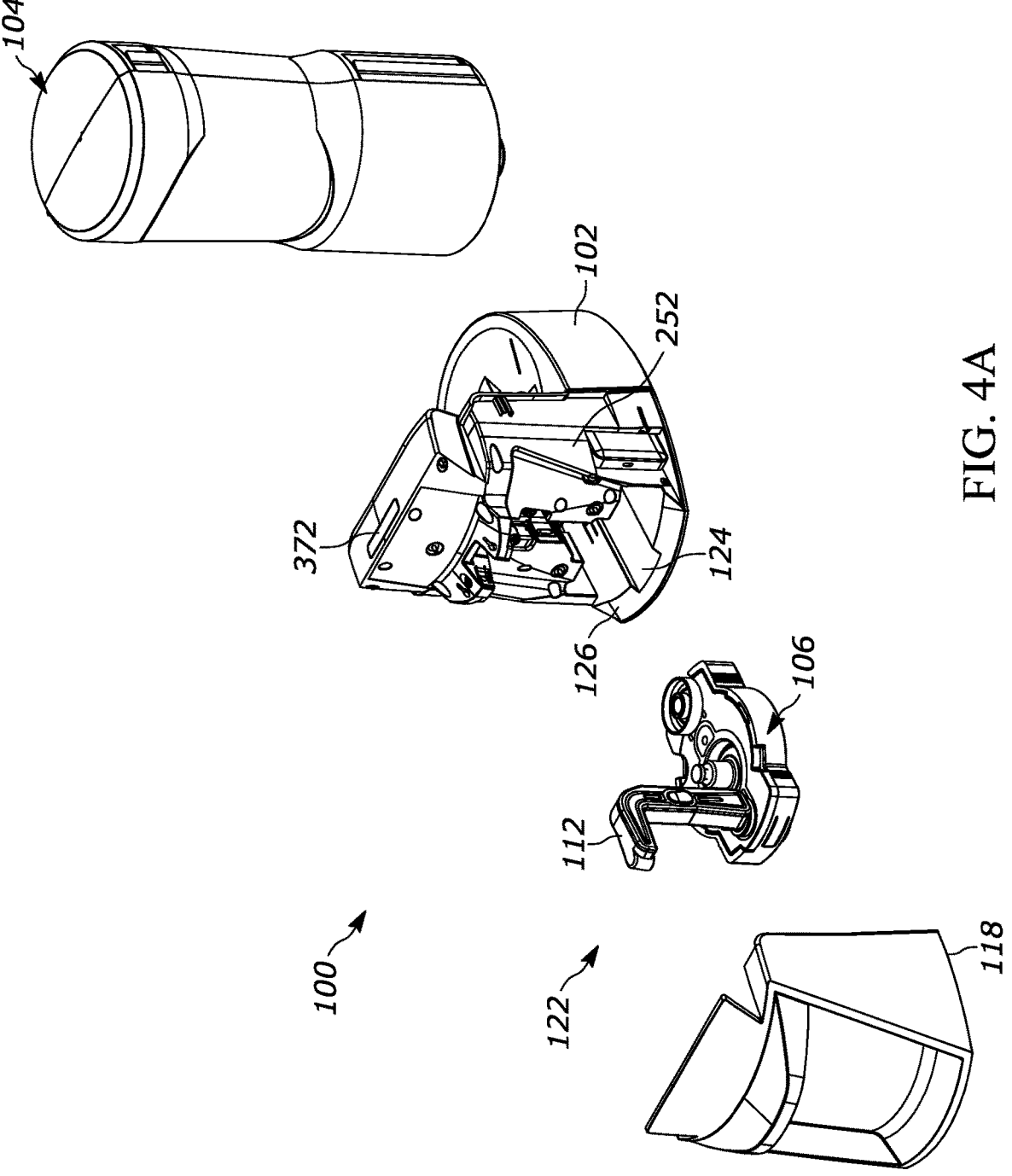
FIG. 4A is a front perspective view illustrating the separability of the cartridge and a front cover and a fluid transfer system of the condiment dispenser of FIG. 1A.

With respect to FIG. 4A, the condiment dispenser 100 is also readily cleanable. As described in further detail below, the cartridge 104 may be removed and the front cover 118 slid forward from the housing 120 of the condiment dispenser 100. A fluid transfer system 122 may also be slid forward from the remainder of the condiment dispenser 100 along a track 124 in the base 126 of the condiment dispenser 100. The fluid transfer system 122 contains the components that are in contact with the fluid after the fluid exits the cartridge. To clean the condiment dispenser 100, the fluid transfer system 122 may be removed, disassembled, washed, reassembled, and slid back into the condiment dispenser 100. As described in further detail below, the components of the fluid transfer system 122 are configured to be easily disassembled and intuitively reassembled to enable employees to quickly and effectively clean the condiment dispenser 100. The components of the fluid transfer system 122 may be formed of food safe materials and dishwasher safe materials to permit the fluid transfer system 122 to be washed in a dishwasher. This aids restaurants in properly cleaning the condiment dispenser 100 while reducing the resources required to properly clean the condiment dispenser 100. Other surfaces of the condiment dispenser 100 may inadvertently have fluid (e.g., condiment) dripped or spilled thereon. For instance, when a user removes the cartridge 104 from the cartridge receiver 102, fluid may drip onto the bowl or basin 128 of the cartridge receiver 102. As another example, a user may cause fluid dispensed at the outlet 110 to be brought into contact with the front cover 118. These surfaces are smooth and/or flat to enable these surfaces to be quickly wiped clean and disinfected.

While the cartridge receiver 102 is shown as having a bowl or conical shape, the cartridge receiver 102 may have other shaped surfaced for receiving a cartridge. For example, the cartridge receiver 102 may have an engaging surface for contacting the cartridge that has any shape that substantially corresponds to a bottom surface of the cartridge. As examples, the cartridge receiver 102 may have an engaging surface that is flat, a concave, a convex, conical, and undulating (e.g. with smooth or sharp transitions). In some embodiments, a portion of the cartridge receiver 102 that engages the cartridge 104 is removeable from the remainder of the condiment dispenser 100 for cleaning (e.g., in a dishwasher). For example, and with reference to FIG. 4B, a tray 102A which engages the cartridge 104 may be removed. The tray 102A may be removed as it may need to be cleaned due to condiment dripping on the surface during insertion and removal of the cartridge 104. The tray 102A may be attached to the remainder of the cartridge receiver 102 by a friction-fit or snap fit connection to enable quick removal while inhibiting the removable portion from inadvertently becoming detached from the remainder of the condiment dispenser 100.

With respect to FIGS. 1D, the fluid flow path 132 through the condiment dispenser 100 is shown. The cartridge 104 may be inserted into the cartridge receiver 102 of the condiment dispenser 100. The cartridge 104 may contain a pouch filled with a condiment. The dispenser-pouch adapter 130 may pierce the condiment pouch permitting the condiment to flow from the condiment pouch and into the dispenser pouch adapter 130. Fluid flows from the cartridge 104 through the dispenser-pouch adapter 130 of the cartridge 104 and into the pump tray 106. The pump tray 106 includes a membrane 134 that includes a diaphragm portion 160 that is moved in a reciprocating motion, or upward and downward, to increase and decrease the volume within the pumping chamber 136 of the pump tray 106. As the membrane 134 moves upward, the volume of the pumping chamber 136 increases which draws fluid from the cartridge 104 and into the pumping chamber 136. As the membrane 134 is moved downward, the volume of the pumping chamber 136 decreases which forces the fluid in the pumping chamber up the spout 112. The pump tray 106 forces the fluid along the spout 112 which causes fluid to be dispensed out the outlet 110 of the condiment dispenser 100 when fluid fills the length of the spout 112. As described in further detail below, the cartridge 104 includes a one-way valve to prevent fluid from returning into the cartridge when the volume of the pumping chamber 136 is decreased due to the downward movement of the membrane 134. Likewise, the outlet end

138 of the pump tray 106 includes a one-way valve to prevent fluid from being drawn from the spout 112 when the volume of the pumping chamber 136 is increased due to the upward movement of the membrane 134.

Figure 5A:
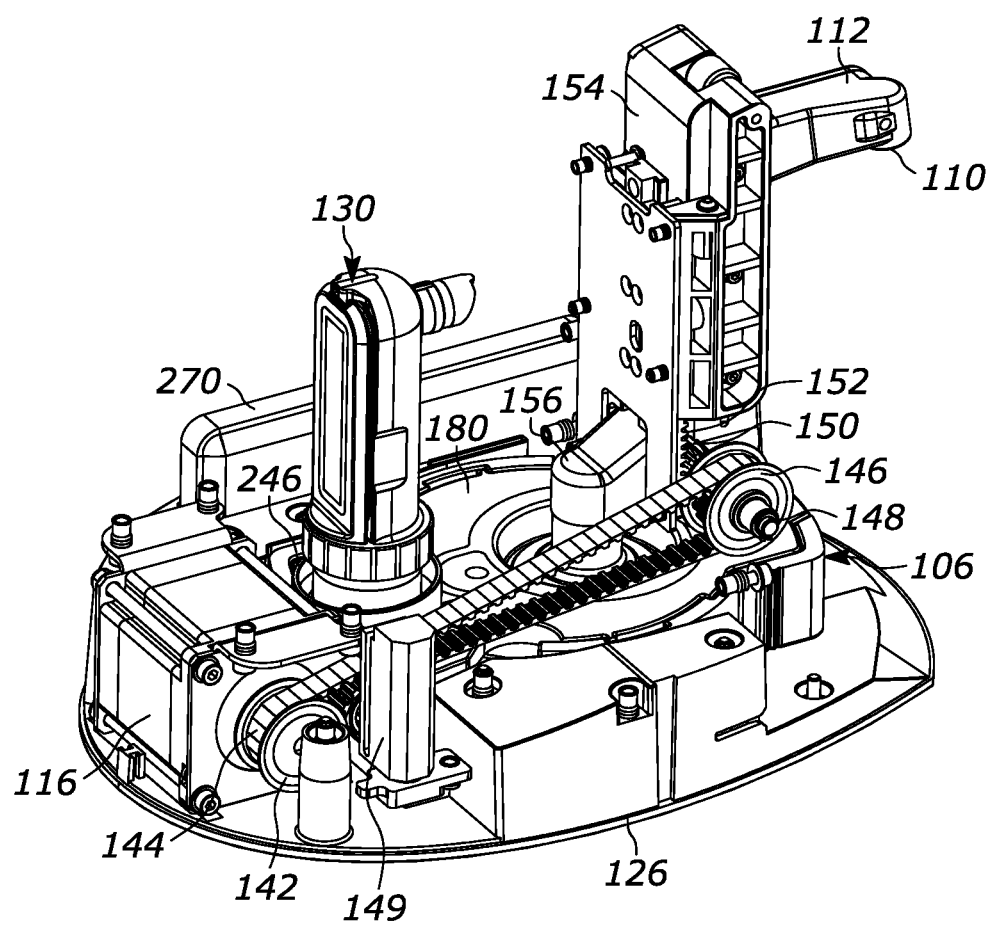
FIG. 5A is a left side perspective view of the condiment dispenser of FIG. 1A shown in a partially disassembled configuration.
Figure 5B:
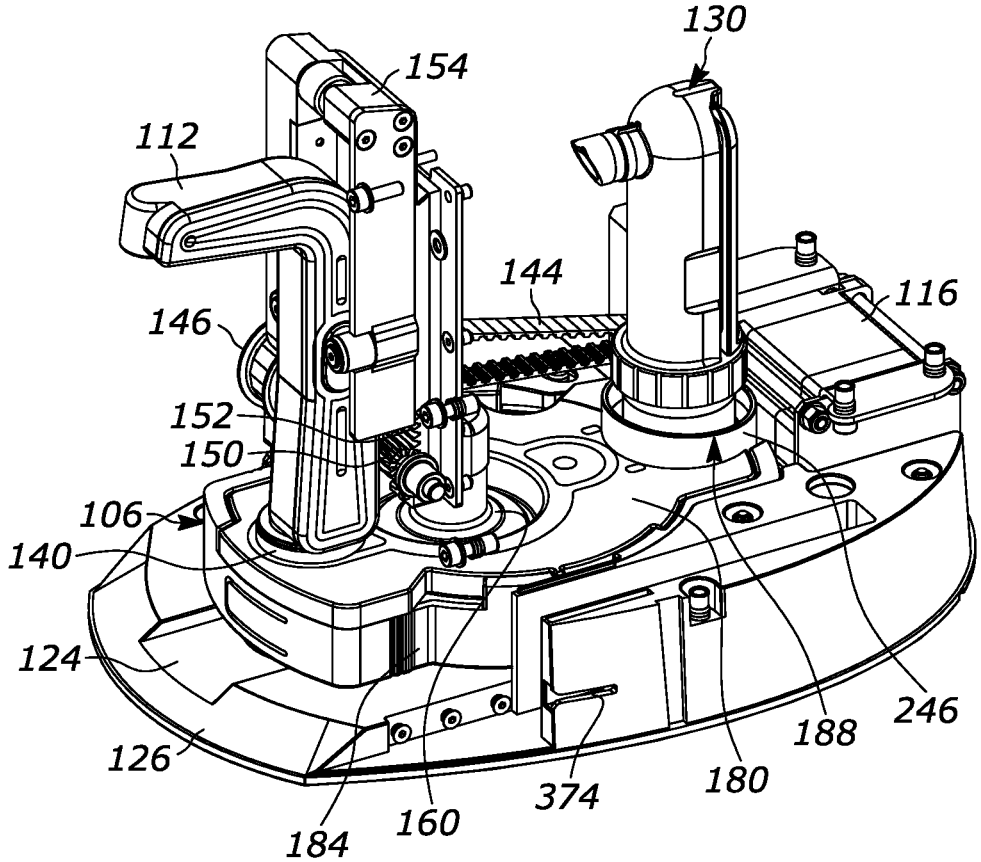
FIG. 5B is a right side perspective view of the condiment dispenser of FIG. 1A shown in the partially disassembled configuration similar to FIG. 5A.
Figures 6A, 6B:
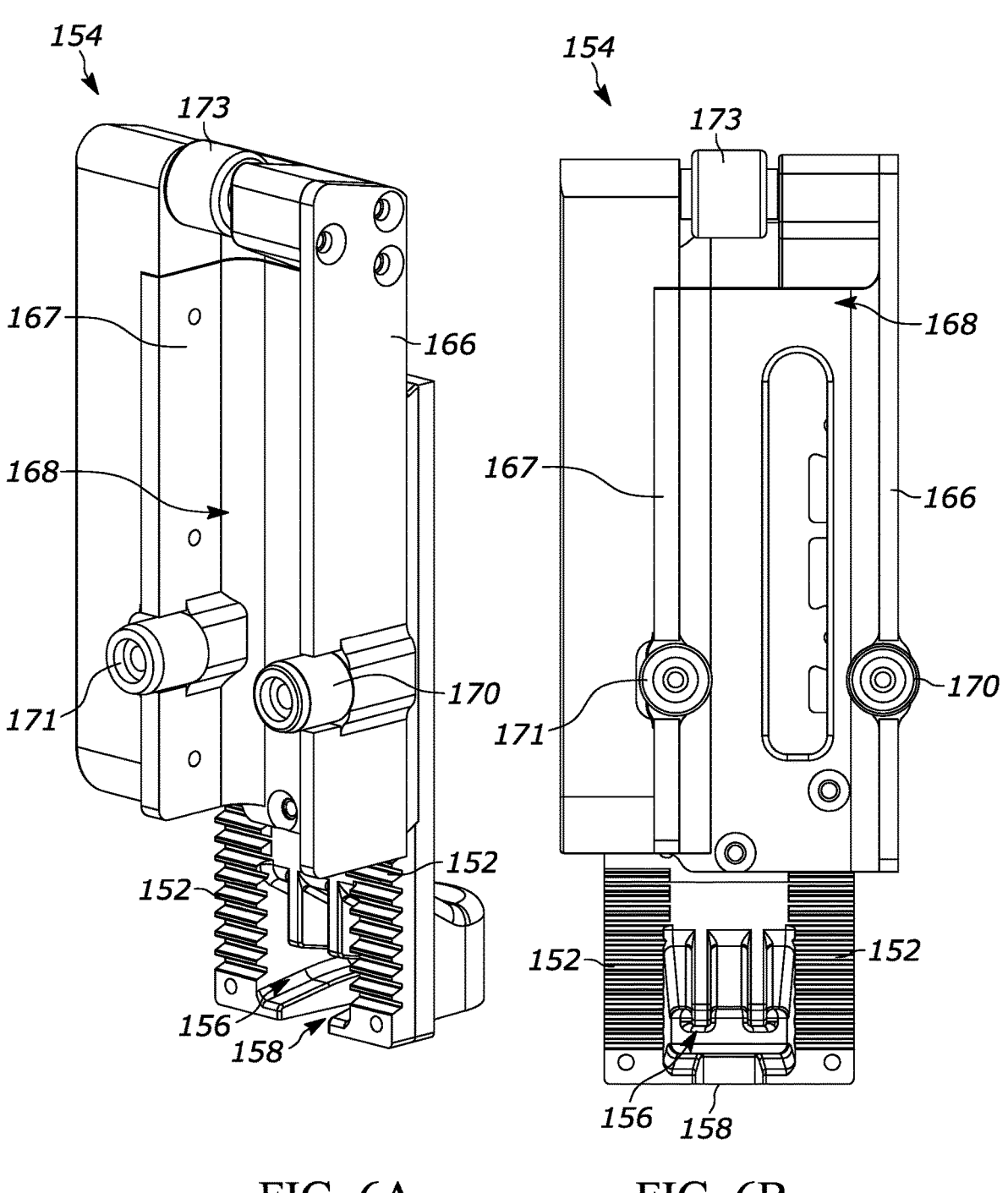
FIG. 6A is a front perspective view of a piston of the condiment dispenser of FIG. 1A.
FIG. 6B is a front elevation view of the piston of FIG. 6A.

With respect to FIGS. 5A-B, the linkage or connection between the motor 116 and the membrane 134 is shown. The motor 116 includes a shaft (not shown) that is coupled to a first pulley 142. The motor 116 is configured to rotate the shaft which causes the pulley 142 to rotate. A belt 144 extends about the first pulley 142 and a second pulley 146 that is mounted proximate to a reciprocating member or piston 154. The belt 144 may be made of a rubber material, for example, a reinforced rubber. The belt 144 is secured about the first pulley 142 and the second pulley 146 such that rotation of the first pulley 142 by the motor 116 causes the second pulley 146 to rotate. A belt tensioner 149 may be configured to engage the belt 144 to ensure the belt 144 is sufficiently engaging the first pulley 142 and the second pulley 146 to mitigate slippage of belt 144 relative to the pulleys 142, 146. The second pulley 146 is coupled to a shaft 148 that includes pinion gears 150 coupled thereto. The second pulley 146 is rigidly coupled to the shaft 148 such that rotation of the second pulley 146 by the motor 116 causes the shaft 148 to rotate. The pinion gears 150 is positioned along the shaft 148 to engage a rack or linear gear 152 on the reciprocating member or piston 154 (see FIG. 6A). As the pinion gears 150 are rotated, the pinion gear 150 engages the rack 152 to move the piston 154 upward or downward along the rack 152. During a pumping operation, the controller 114 is configured to operate the motor 116 to cycle between operation in a forward and reverse direction. This causes the pinion gear 150 to drive the piston 154 upward and downward cyclically or in a reciprocating motion as described in further detail below.

As shown in FIGS. 5A-6C, the piston 154 includes compartment 156 and a channel 158 for receiving a head 159 of the diaphragm 160 of the membrane 134. The head 159 is attached to the diaphragm 160 of the membrane 134 by a neck 162 (see FIG. 7B). To attach the piston 154 to the membrane 134, the head 159 of the membrane 134 is slid into the compartment 156 with the neck 162 sliding along the channel 158 of the piston 154. The head 159 has a larger diameter than the neck 162 and the channel 158, thus preventing the piston 154 from becoming detached from the membrane 134 as the piston 154 is moved upward and downward.

The piston 154 may be formed of plastic (e.g., ABS) and/or metal materials. In some forms, the piston 154 is a unitary piece. In other forms, the piston 154 is formed of multiple pieces attached together. The piston 154 further includes a body 164 extending from the rack 152 and the compartment 156. The body 164 includes walls 166, 167 forming a recess 168 within the body 164. The body 164 may be positioned such that the spout 112 is positioned at least partially within the recess 168. The piston 154 aids to support the spout 112 in an upright position. The piston 154 may further include a rollers 170, 171 mounted to the walls 166, 167 that are positioned to roll along the sides of the spout 112 as the piston 154 is moved upward and downward by the motor 116. The rollers 170, 171 permit the spout 112 and the piston 154 to remain in contact with one another while reducing the frictional resistance therebetween during movement of the piston 154. Roller 170 is further positioned to engage a bellows 234 of the spout 112 as described in further detail below. The piston 154 further includes a top roller 173 that is used in connection with the condiment dispenser 500 of the second embodiment discussed with regard to FIGS. 14-16C.

Figure 6C:
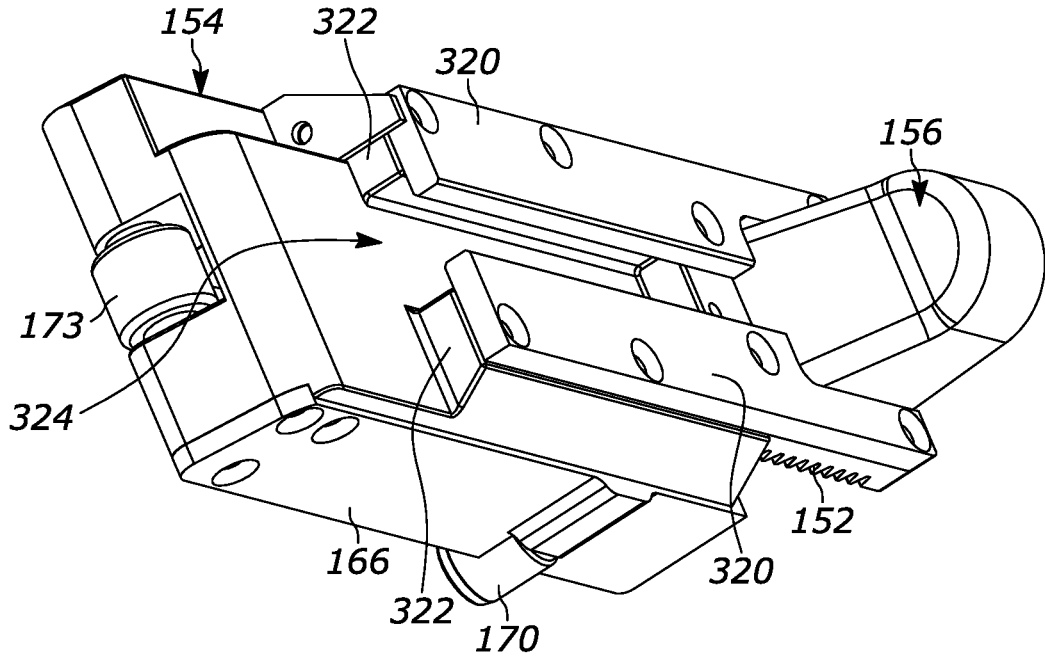
FIG. 6C is a top rear perspective view of the piston of FIG. 6A.
Figure 6D:
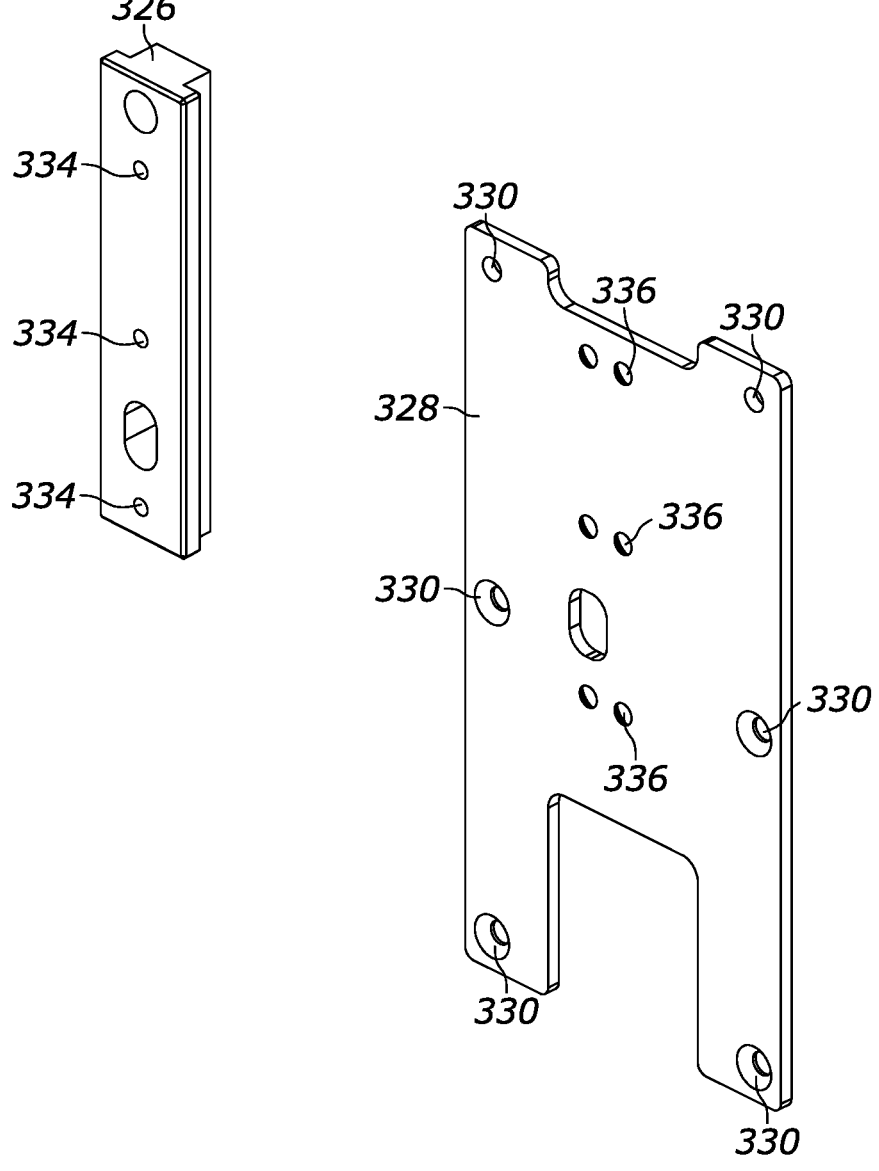
FIG. 6D is a guiding track and a mounting plate of the condiment dispenser of FIG. 1A for the piston of FIG. 6A.
Figure 10A:
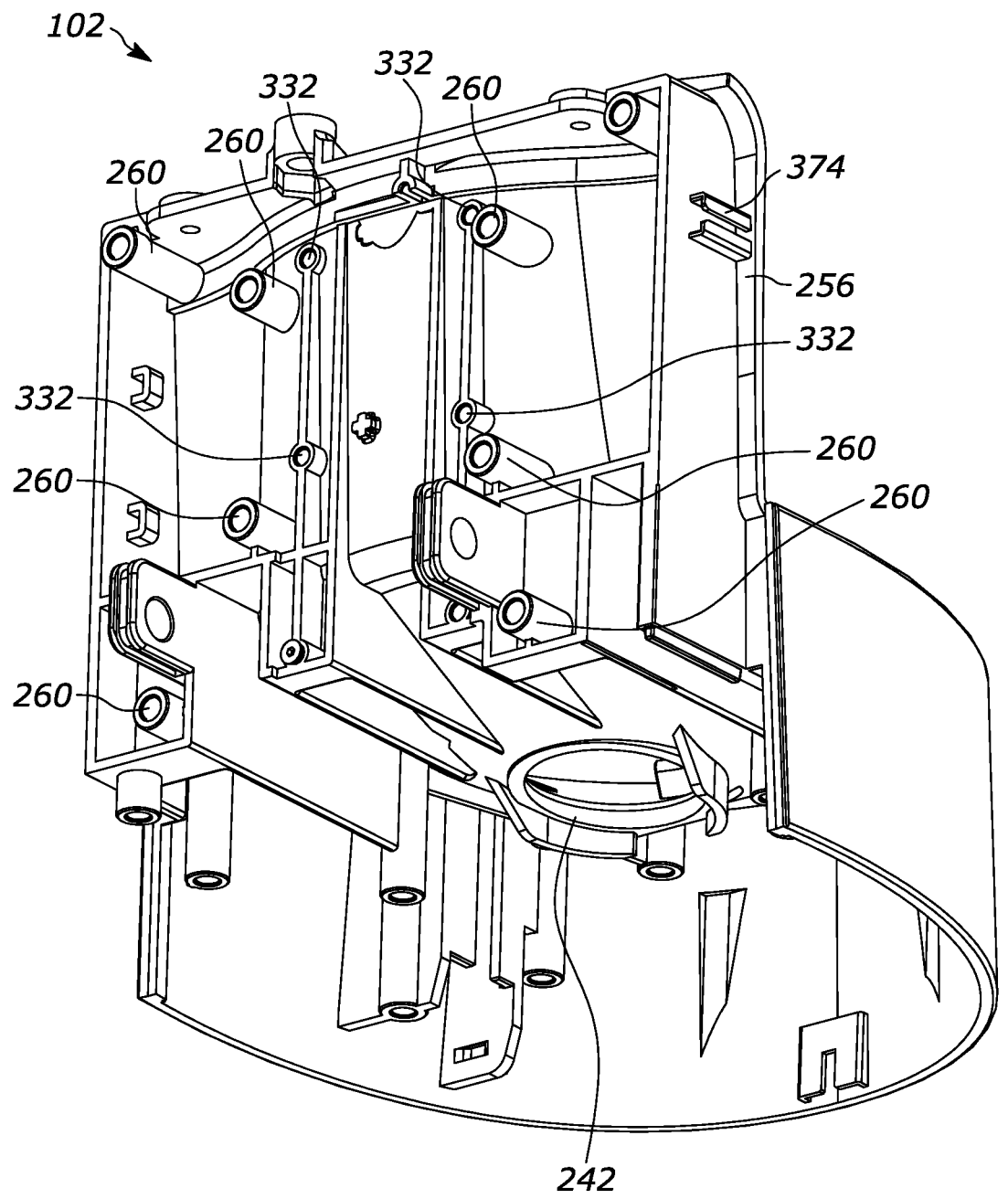
FIGS. 10A-B are front and rear perspective views, respectively, of a cartridge receiver of the condiment dispenser of FIG. 1A.
Figure 10B:
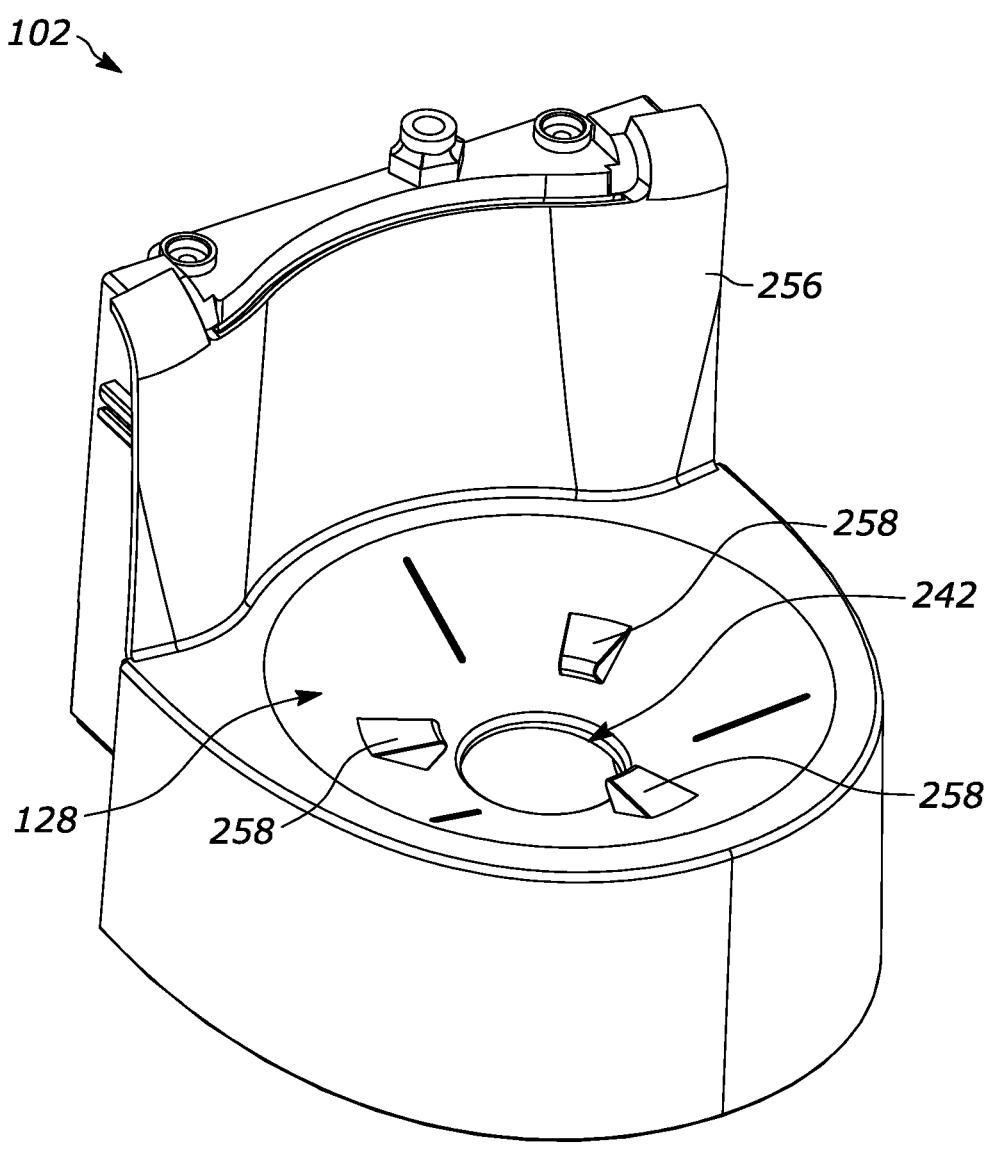

With respect to FIG. 6C-D, the reciprocating motion of the piston 154 is guided by a track. The piston 154 includes side plates 320 mounted on raised portions 322 on the back side of the piston 154. The side plates 320 extend toward one another from the raised portions 322 to form a T-shaped channel 324 on the piston 154. The condiment dispenser 100 includes a T-shaped track 326 that is mounted to a mounting plate 328. The mounting plate 328 may be mounted to the back plate 256 of the cartridge receiver 102 via fasteners extending through the mounting holes 330 of the mounted plate and into the fastener receivers 332 of the back plate 256 (see FIG. 10A). The T-shaped track 326 includes holes 334 through which a fastener may be extended into holes 336 to secure the T-shaped track 326 to the mounting plate 328.

The T-shaped channel 324 of the piston 154 receives the T-shaped track 326. As the piston 154 moves upward and downward, for example, by the motor 116, the piston 154 is guided upward and downward by the track 326. The T-shaped channel 324 and T-shaped track 326 aid to prevent the piston 154 from tipping or rotating substantially, limiting the movement of the piston to be primarily along the longitudinal length of the track 326.

Figure 7A:
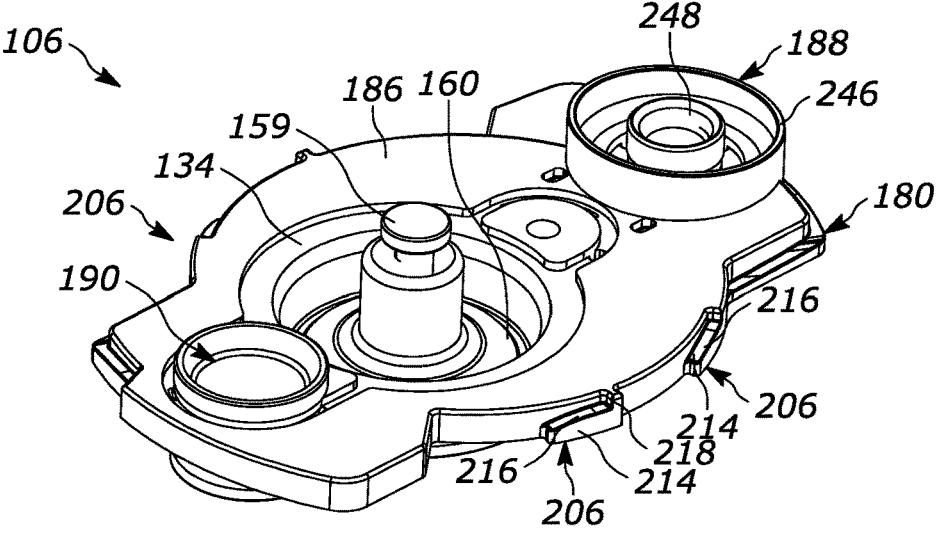
FIG. 7A is an exploded view of a pumping tray of the condiment dispenser of FIG. 1A.
Figure 7A:
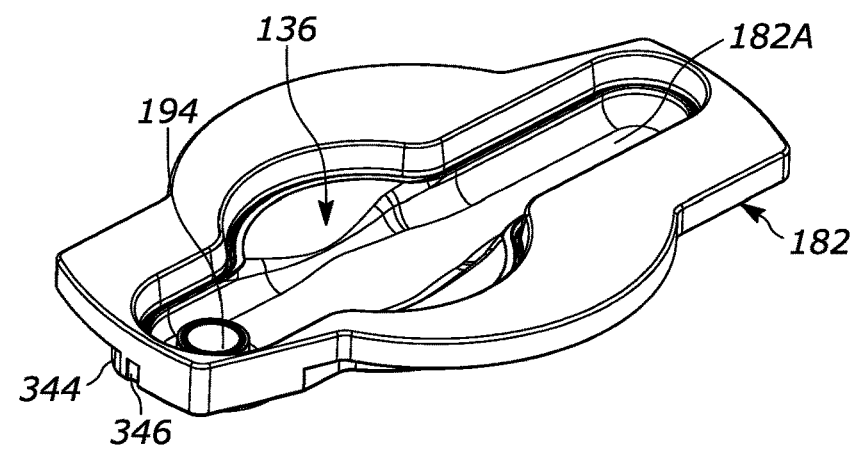
Figure 7A:
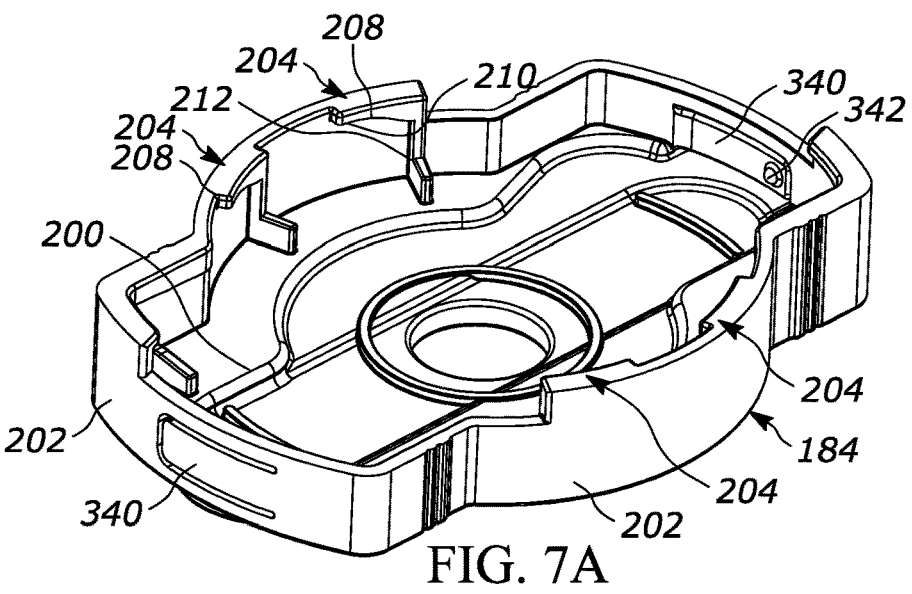
Figure 7B:
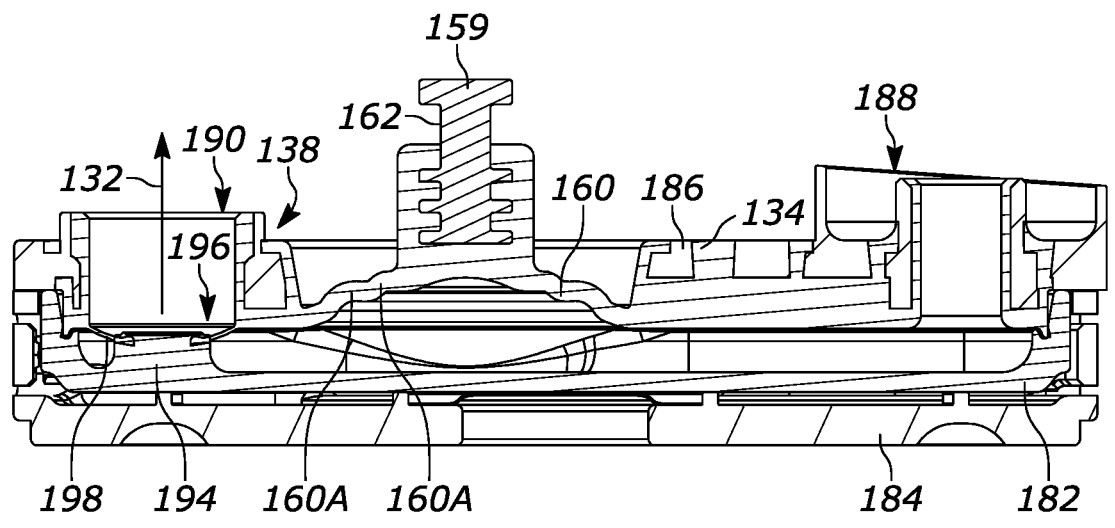
FIG. 7B is a cross-section view of the pumping tray of FIG. 7A shown in an assembled configuration.
Figure 7C:
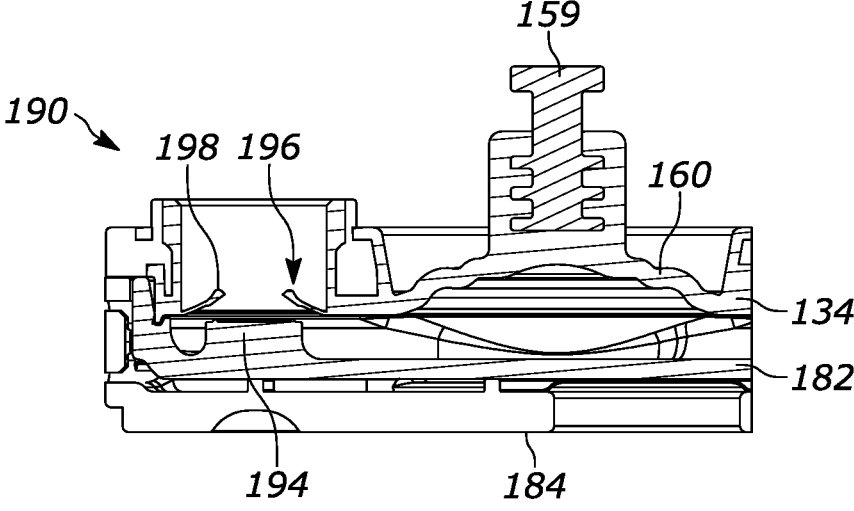
FIG. 7C is a close-up cross-section view of a valve of the pumping tray of FIG. 7A similar to the cross-section of FIG. 7B.

With respect to FIGS. 7A-7C, the pump tray 106 is shown. The pump tray 106 includes a lid 180, a channel member 182, and a base 184. The membrane 134 may form a portion of the lid 180. The lid 180 includes a body 186 having an inlet port 188 and an outlet port 190 and a central opening across which the membrane 134 extends. The body 186 and the base 184 may be formed of a rigid material such as a plastic (e.g., ABS). The membrane 134 may be formed of a flexible material and is preferably formed of a food safe material. As examples, the membrane 134 may be formed of a rubber, silicon, or polyurethane. The membrane 134 may be flexible enough to permit the membrane to be deflected with relative ease to reduce the amount of force required to deflect the membrane 134, yet stiff enough to be sufficiently stable as the diaphragm of 160 is moved upward and downward. The membrane 134 may have a shore hardness in the range of about 60-80. In one example, the membrane 134 has a shore hardness of 70 A. The membrane 134 may have a substantially consistent thickness such that the membrane 134 maintains a stable, consistent shape in the upward drawn (intake) position and the downward (dispense) position. Reducing the local thinner areas within the membrane may aid to create a more stable shape within the diaphragm 160 as it moves between positions for more consistent pump performance. The membrane 134 may be affixed to the body 186 by molding the membrane 134 to the body 186. In other forms, the membrane 134 is separable from the body 186 which enables the membrane 134 to be separated for cleaning. The membrane 134 may be positioned between the body 186 and the channel member 182 during assembly. In some forms, the diaphragm portion 160 of the membrane may extend further upward and through the opening of the lid 180 to provide an increased volume within the pumping chamber 136. For example, the diaphragm 160 may be substantially cylindrical or a conical shape with a greater height and configured to be compressed downward and drawn upward to increase and decrease the volume within the pumping chamber 136. The volume of the pumping chamber 136 and height, shape, and/or configuration of the diaphragm may be based on the viscosity of the fluid being pumped and/or the desired volume of dose to be pumped with each pump cycle.

The inlet port 188 of the lid 180 interfaces with the cartridge 104 (the dispenser-pouch adapter 130) when inserted into the cartridge receiver 102 and permits fluid to pass into the pump chamber 136 formed between the lid 180 and the channel member 182. In the form shown, the inlet valve 307 forms a part of the cartridge 104. In other embodiments, the inlet valve 307 may be part of the inlet port 188.

The diaphragm 160 may have kinks 160A or waves within the diaphragm 160 to make the diaphragm 160 easier to deflect during pumping. The embodiment shown includes two kinks 160A. In some embodiments, the diaphragm 160 may have one or three kinks 160A. In other embodiments, the diaphragm 160 may have no kinks.

The channel member 182 may be formed of a rigid material. The channel member 182 may form a sealed connection with the lid 180 when assembled with the channel member 182 in contact with the membrane 134. The channel member 182 may be separated from the lid 180 for cleaning of the channel member 182. In the embodiment shown, the membrane 134 on the bottom side of the lid 180 extends from the body 186 of the lid to the flange 192 of the channel member 182 to form the sealed connection therebetween when the channel member 182 is brought into contact with the lid 180. The channel member 182 includes a channel 182A formed by a recess portion or groove along the length of the channel member 182. The channel 182A guides fluid from the inlet port 188 of the lid 180 along the channel 182A to the pump chamber 136. The channel member 182 defines an area of increased width that corresponds to the diaphragm 160 of the membrane 134 to form the pumping chamber 136. The size of the pumping chamber 136 may correspond to the dosing size and volume of condiment dispended from the condiment dispenser 100. The size of the pumping chamber 136 and/or pump tray 106 may be adjusted to dispense a desired dose of condiment with each pump cycle. The size of the pumping chamber 136 and/or pump tray 106 may also be adjusted based on the condiment being pumped from the cartridge 104 to accommodate for differences in the viscosities and particle sizes across various condiments. The channel 182A extends from the pump chamber 136 to the outlet port 190. The channel 182A thus serves to guide fluid from the inlet port 188, to the pump chamber 136 and to the outlet port 190. Reducing the distance fluid travels from the pump chamber 136 to the outlet valve 196 increases the efficiency of the pump as it is easier to displace the fluid in the pumping chamber 136 due to there being less viscous friction and sauce compression that may result over longer distances.

The pump chamber 136 may have a maximum volume in the range of about 10-25 mL when the diaphragm 160 is in the fully upward intake position. As one example, the pump chamber 136 may have a volume of about 17 mL. The size of the diaphragm 160, the pump chamber 136, and the stroke length of the piston 154 may be modified to provide a desired flow rate of fluid toward the outlet 110 or a desired volume of fluid pumped per pump cycle. The size of the diaphragm 160 and the pump chamber 136 may be modified based on the condiment being pumped by the condiment dispenser 100. The piston 154 may have a stroke length in the range of about 10-20 mm, for example 15 mm. The stroke length of the piston 154 may be adjustable to set the change in volume of the pumping chamber 136 as the pump tray 106 is pumping fluid. The diaphragm 160 may have a diameter in the range of about 50-60 mm, for example, 53 mm. The ratio of the diaphragm 160 height to diaphragm 160 radius determines the ease of deflection of the diaphragm 160. The diaphragm 160 may have a height of about 7.5 mm and a radius of about 26.5. An increased slope of the walls forming the diaphragm 160 cone may result in more volume being displaced in a pump cycle but also results in the diaphragm 160 being more difficult to deflect, requiring more power to perform a pump cycle. In some forms, the diaphragm 160 is does not have a conical shape or a diaphragm 160 height when in a resting position but is flat.

The outlet end of the pump tray 106 includes a one-way valve 196. The one-way valve 196 permits fluid to exit the channel 182A through the outlet port 190, but inhibits fluid from entering the channel 182A through the outlet port 190. As shown in FIGS. 7B-C, the channel 182A includes a raised portion or sealing protrusion 194. The membrane 134 forms a one-way valve 196 with the sealing protrusion 194. The membrane 134 includes a sealing flap 198 extending within the outlet port 190 and about the sealing protrusion 194. The sealing flap 198 is circular and extends radially inward toward the sealing protrusion 194. Use of a circular sealing flap 198 is beneficial for a reliable, predictable seal that closes consistently. The flap 198 is biased such that the flap 198 is normally resting or sealing against the sealing protrusion 194. The flap 198 rests on the sealing protrusion 194 such that fluid is not able to enter the channel 182A through the outlet port 190. Fluid entering the outlet port 190 forces the flap 198 against the sealing protrusion 194 to close the outlet port 190. When the diaphragm 160 is moved to force fluid along the channel 182A to the outlet port 190, the force of the fluid forces the flap 198 upward and off of the sealing protrusion 194 to open the valve 196. The length the flap 198 extends radially inward may be selected for adequate and sufficient sealing. Too short of a flap 198 may result in the flap 198 being too stiff for the pump tray 106 to force fluid through and too long of a flap 198 may result in the seal not returning to form a fluid tight seal against the sealing protrusion 194. The flap 198 may have a shore hardness of about 70 A to cause the flap 198 to quickly seal against the sealing protrusion 194 when force is removed and to return to the same location and shape consistently. Thus, fluid is able to exit the channel 182A, but is not able to enter the channel 182A via the outlet port 190. In other embodiments, the outlet valve 196 may be positioned within the spout 112.

The base 184 of the pump tray 106 is configured to receive the channel member 182 and the lid 180. The base 184 includes a bottom 200 and sidewalls 202 forming a compartment. The base 184 may be removably locked to the lid 180 and the channel member 182 to permit the pump tray 106 to be disassembled. For example, the base 184 and the lid 180 may be attached to one another by a bayonet connection. The sidewalls 202 of the base 184 include locking hooks 204 configured to engage with corresponding locking hooks 206 on the periphery of the lid 180. The locking hooks 204 include a ramped protrusion 208 extending inwardly from the sidewalls 202. The ramped protrusion 208 includes an engagement surface 210 having a thin leading edge that increases in thickness to a stop 212. The locking hooks 206 of the lid 180 include ramped protrusions 214 extending outwardly from the periphery of the lid 180. The ramped protrusions 214 include an engagement surface 216 having a thin leading edge that increases in thickness to a stop 218. The leading edge of the locking hooks 204 of the base 184 face either the clockwise direction or counterclockwise direction and the leading edge of the locking hooks 206 of the lid 180 face the other opposite direction of the locking hooks 204 of the base 184. To connect the lid 180 to the base 184, the channel member 182 may be positioned within the compartment of the base 184. The lid 180 may positioned on top of the channel member 182 and oriented such that the leading edges of the locking hooks 206 of the lid 180 are adjacent the leading edge of the locking hooks 204 of the base 184. The lid 180 and the base 184 may then be rotated relative to one another to bring the sloped engagement surface 216 of the locking hooks 206 of the lid 180 into contact with the sloped engagement surface 210 of the locking hooks 204 of the base 184. As the lid 180 is rotated relative the base 184, the sloped engagement surfaces of the locking hooks 204, 206 force the lid 180 toward the bottom 200 of the base 184. The lid 180 and/or the channel member 182 on which the lid 180 rests may be forced against the base 184 such that the frictional resistance between the lid 180 and the base 184 is increased at the locking hooks 204, 206. This forces the membrane 134 against the channel member 182 forming a tight sealed connection therebetween. The lid 180 may be rotated relative to the base 184 until the locking hooks 204, 206 contact the corresponding stop 212, 218. In other words, the lid 180 includes partial threads (locking hooks) and the base 184 includes complementary partial threads (locking hooks) enabling the lid 180 to be screwed to the base 184.

The channel member 182 may be rotated with the lid 180 as the lid 180 is secured by the locking hooks 204, 206 to lock the channel member 182 and the lid 180 from rotation relative to the base 184. The base 184 may include a deflectable tab 340 on both ends of the base 184. The deflectable tabs 340 include a protrusion 342 configured to be snapped into a corresponding recess 346 of the channel member 182 to lock the channel member 182 from rotating therein. The channel member 182 includes an angled surface 344 leading to a recess 346 on both ends. The channel member 182 may be rotated relative to the base 184 to cause the protrusion 342 of the base 184 to slide along the angled surface 344 of the channel member 182 until the protrusion 342 is aligned with the recess 346. The deflectable tab 340 elastically returns to its original position with the protrusion 342 within the recess 346 of the channel member 182 thus preventing the channel member 182 and the lid 180 from rotating substantially within the base 184 from the locked position, thereby preventing the locking hooks 204, 206 from inadvertently rotating toward the unlocked position from the locked position.

To disassemble the pump tray 106, the lid 180 may be rotated in the opposite direction to remove the locking hooks 204, 206 from engagement with one another. The lid 180 may need to be rotated with force sufficient to cause the protrusions 342 of the base 184 to be removed from the recesses 346 of the channel members 182.

By including such a locking mechanism to hold the lid 180 to the base 184, the pump tray 106 may quickly and easily be disassembled. For instance, when an employee seeks to clean the condiment dispenser 100, the pump tray 106 may be easily disassembled to permit the inside to the pump tray 106 to be cleaned. The components of the pump tray 106 may be formed of dishwasher safe materials to permit the disassembled pump tray 106 to be placed within a dishwasher for cleaning. When cleaned the pump tray 106 may be quickly reassembled by inserting the channel member 182 into the base 184, placing the lid 180 on the channel member 182 and rotating the lid 180 relative to the base 184 to secure the lid 180 to the base 184.

With respect to FIG. 7B, the fluid flows along path 153 in the inlet port 188 along the channel 182A, through the pump chamber 136, and out the outlet port 190. As described above, the piston 154 is connected to the diaphragm 160 of the membrane 134 and is moved in a reciprocating motion to cause the diaphragm 160 to move upward and downward. As the diaphragm 160 is drawn upward, the volume within the pumping chamber 136 is increased.

The diaphragm 160 has a sufficient stiffness such that the diaphragm 160 shape changes quickly resulting in a quick change of volume. This increase in volume creates a low-pressure area within the pump tray 106. Since the outlet port 190 include the one-way valve, fluid is not able to be drawn toward the pump chamber 136 from the outlet port 190. Instead, the fluid is drawn from the inlet port 188. Where the cartridge 104 is attached to the inlet port 188, the fluid is drawn from the cartridge 104, along the channel 182 and toward the pump chamber 136. When the piston 154 forces the diaphragm 160 downward, the volume within the pumping chamber 136 is decreased creating high pressure within the pump chamber 136. The diaphragm 160 may take on a shape that sufficiently corresponds with the portion of the channel member 182 forming the pumping chamber 136 such that a substantial amount of fluid within the pumping chamber 136 is forced out of the pumping chamber 136 when the diaphragm 160 is forced downward. As discussed in further detail below with regard to FIGS. 12A-F, the cartridge 104 includes a one-way valve permitting fluid to exit the cartridge 104, but inhibiting fluid from reentering the cartridge 104. Thus, when the diaphragm 160 is forced downward, fluid is forced from the pumping chamber 136 and toward the outlet port 190. The fluid forces the one-way valve 196 open and travels through the outlet port 190. Where the spout 112 is connected to the outlet port 190, the fluid is forced into the spout 112 and toward the outlet 110. The diaphragm 160 has a stiffness such that the shape of the diaphragm 160 is consistent and predictable as the diaphragm 160 is moved upward and downward to pump fluid.

With respect to FIGS. 8A-D the spout 112 is shown. The spout 112 may be formed of a plastic material, such as ABS or other food-safe, dishwasher safe materials. The spout 112 includes a substantially vertical portion 220 and a substantially horizontal portion 222 connected at an angled or curve portion. The spout 112 includes a channel 224 extending along the length of the spout 112 from the base portion 225 to the outlet 110. The channel 224 may have a cross-sectional area selected to permit a desired flow rate of condiment, for example, about 8 mm to about 16 mm. As one example, the channel 224 may have a cross-sectional area of 12 mm. A smaller cross-sectional area may require increased force to move the sauce through the channel 224 and result in the sauce being forced through the outlet 110 as a higher velocity. A larger cross-section may be selected to reduce the force required to move the sauce through the channel 224. Selecting a larger cross-sectional area channel 224 is especially advantageous for sauces of increased viscosity (e.g., mayo). The outlet 110 may have a diameter in the range of about 4 to 10 mm permitting fluid of varying viscosities to be dispensed from the condiment dispenser 100. In one example, the diameter of the outlet 110 is 8 mm. The spout 112 may be configured to enable the condiment dispenser 100 to dispense 10-15 mL of sauce in about one to four seconds.

The base portion 225 is configured to interface with the outlet port 190 of the pump tray 106. The base portion 225 is insertable into the outlet port 190 such that the base portion 225 is attached to the pump tray 106. The base portion 225 may form a sealed connection with the pump tray 106 when inserted into the outlet port 190. In some forms, a seal (e.g., an O-ring) may extend between the base portion 225 of the spout 112 and the outlet port 190 to form a seal connection therebetween. The seal may be positioned in a groove 226 formed about the periphery of the base portion 225. Forming a sealed connection between the spout 112 and the pump tray 106 prevents fluid from leaking out of the fluid transfer system 122 at the connection point between the spout 112 and the pump tray 106.

The spout 112 includes a side panel 112A that may be separated from the remainder of the spout, such as main body 112B. The side panel 112A may attach to the main body 112B by a snap-fit or friction fit connection and be inserted into an opening 228 in the spout 112. The side panel 112A includes an insertion portion 230 that may be inserted into the opening 228 of the spout 112 and an outer portion 232 that abuts the portion of the main body 112B about the opening. The insertion portion 230 may have a shape that corresponds to the shape of the opening 228 of the spout 112 to ensure the opening 228 is closed when the side panel 112A is attached. A seal (e.g., an O-ring) may be positioned about the insertion portion 230 to form a sealed connection between the side panel 112A and the main body 112B when connected together. The side panel 112A may be removed by pulling the side panel 112A from the main body 112B. The side panel 112A may slide apart with the application of an amount of force to ensure the side panel 112A does not become inadvertently detached from the main body 112B, but enables a user to pull the side panel 112A off without significant difficulty. By including a side panel 112A that is removable, a significant portion of the channel 224 is able to be directly and easily accessed. This is advantageous for cleaning the spout 112, whereas in prior designs, long channels are difficult to clean, often resulting in being insufficient cleaned. For example, many prior pump designs include a long dip tube that extends from the condiment to the outlet that is difficult to properly clean due to the length of the tube. Such tubes require manual cleaning with a brush while the disclosed spout 112 allows for the spout 112 to be disassembled to permit access along the length of the spout 112 for cleaning. This ensures the spout 112 is properly cleaned as water and detergent is able to flow along the channel 224 to clean the length of the channel, for example, when washed in a dishwasher.

Figure 9A:
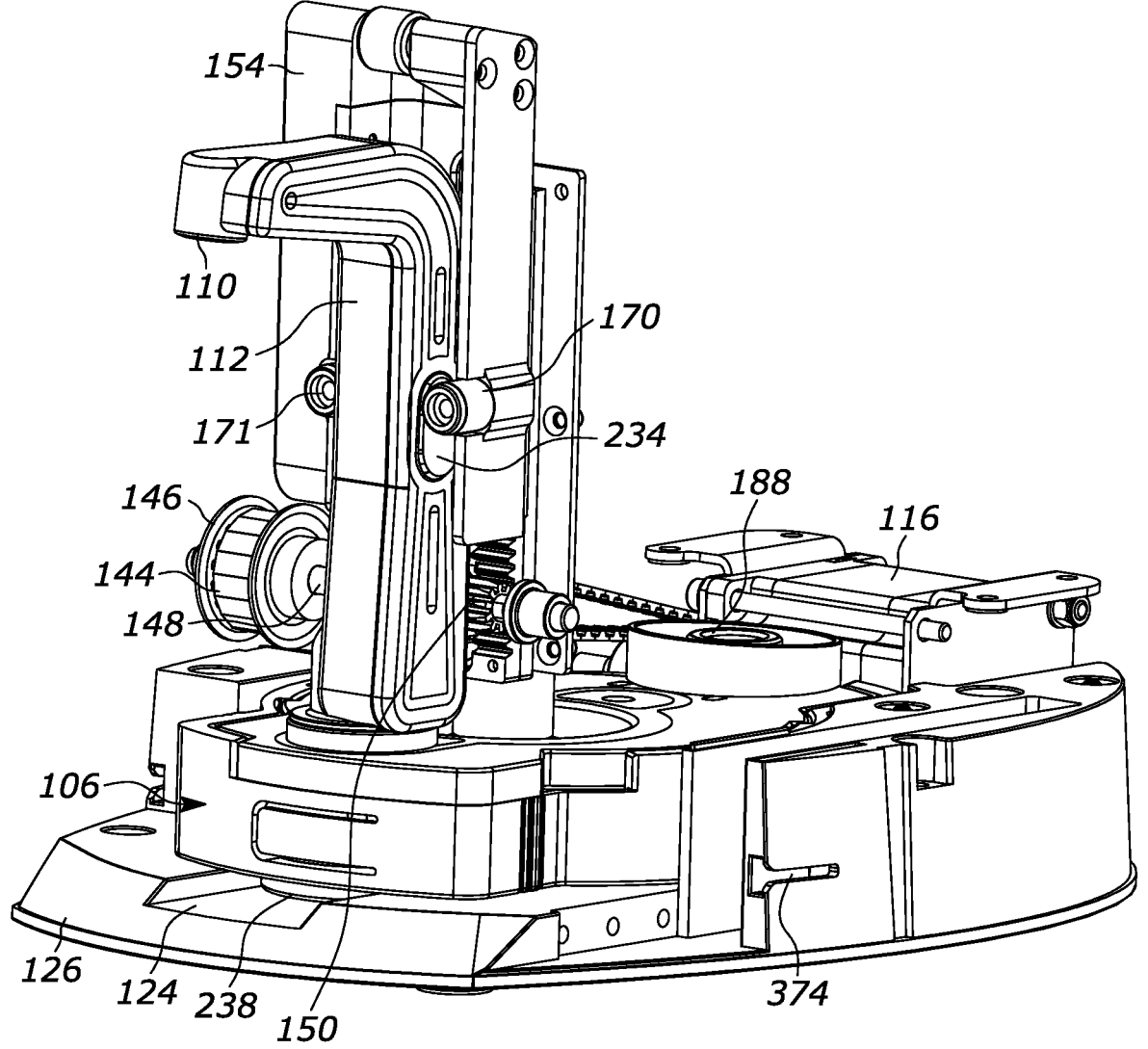
FIG. 9A is a top perspective view of the fluid transfer system of the condiment dispenser of FIG. 1A shown with the piston and drive assembly.
Figure 9B:
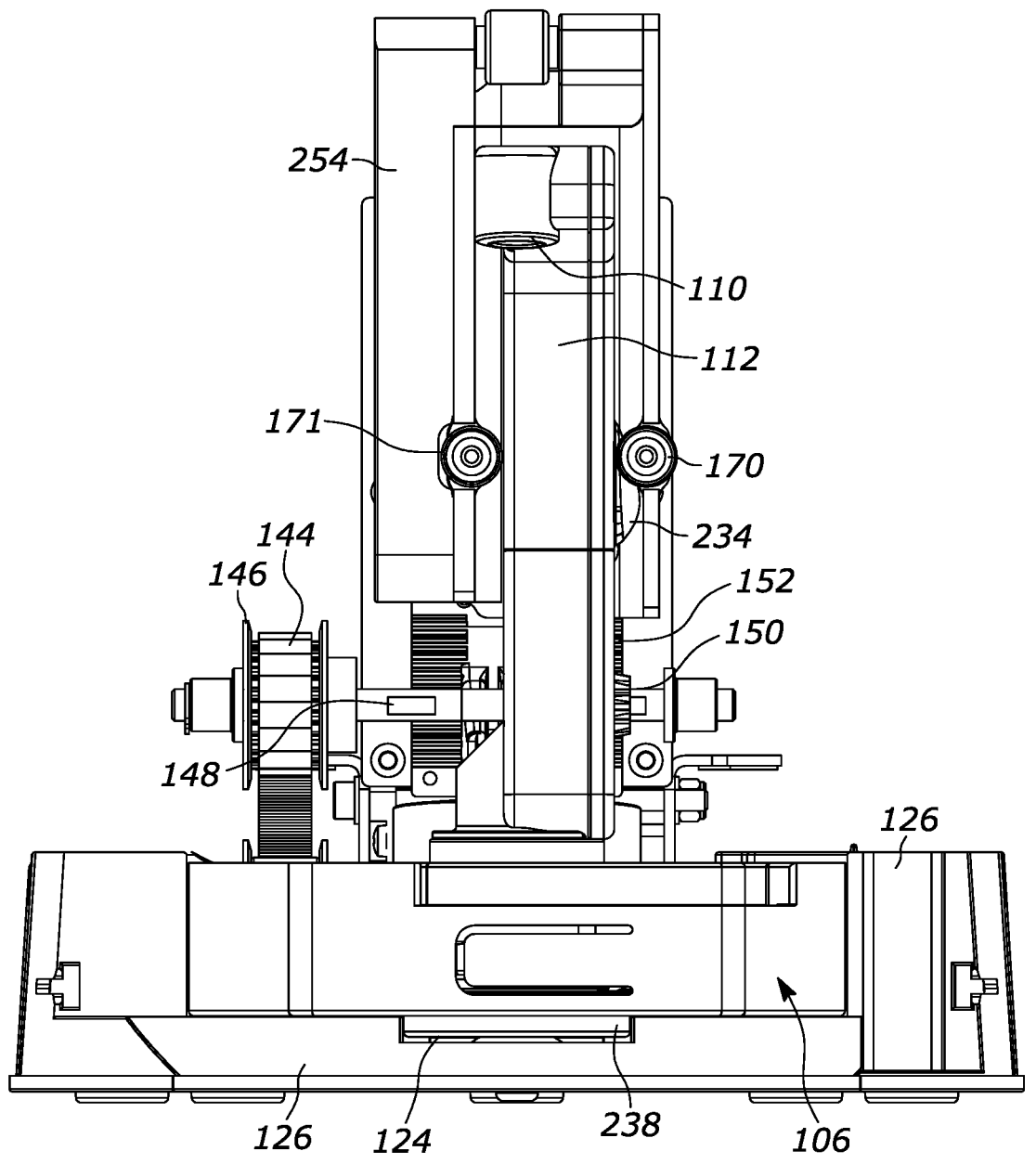
FIG. 9B is a front elevation view of the fluid transfer system of the condiment dispenser of FIG. 1A shown with the piston and drive assembly.

In the embodiment shown, the side panel 112A further includes a bellows 234. The bellows 234 bubbles or extends outward from the side panel 112A. The bellows 234 may be formed of a semi-flexible material such as rubber, silicon, or polyurethane and the like such that the bellows 234 may be pressed or flexed inward toward the side panel 112A, but returns to its normal shape extending from the bellows 234 when force is removed. The bellows 234 aids in preventing fluid from exiting the outlet 110 of the spout 112 when the piston 154 is not in a downward position and forcing fluid out of the pump chamber 136 and up the spout 112. As mentioned above, and with respect to FIGS. 9A-B, the piston 154 includes the roller 170 that is positioned to engage the bellows 234. When the piston 154 is forced downward (e.g., by the motor 116) to cause the pump tray 106 to force fluid up the spout 112 and out the outlet 110, the roller 170 engages the bellows 234, which decreases the volume within the spout 112 and aids to force fluid up the spout 112 and toward the outlet 110. In other embodiments, the piston 154 does not include a roller or wheel, but instead includes a protrusion or other member that is configured to engage and compress the bellows.

As the piston 154 is moved upward, the roller 170 is removed from the bellows 234, permitting the bellows 234 to expand. This increases volume in the spout 112 creating a low-pressure region at the bellows 234. This low-pressure region draws fluid in the spout 112 at the outlet 110 toward the bellows 234 thereby causing the condiment dispenser 100 to promptly cease dispensing fluid when the piston 154 is moving upward, such as at the end of a dispensing cycle. Drawing the fluid away from the outlet 110 also reduces the possibility that the fluid will remain above the outlet 110 and potentially drip from the outlet 110 after a dispensing cycle, e.g., when a user's plate or sauce cup is not under the outlet. Drawing the fluid away from the outlet 110 further minimizes the time employees spend maintaining the condiment dispenser 100 to ensure the condiment dispenser 100 has a clean appearance because the accidental dripping on the surface of the dispenser 100 or the surface where the dispenser 100 rests is reduced. Moreover, drawing the condiment back from the outlet 110 and within the spout 112 also ensures that condiment does not remain in contact with air that may dry out the condiment which may give the condiment an undesirable look and texture if the dispenser 100 is not used for a certain time. The bellows 234 may be shaped to have a slope permitting the roller 170 to smoothly transition to moving along the bellows 234 without hooking or catching on the bellows 234 and forcing the piston 154 upward relative to the spout 112. As shown the bellows 234 has a teardrop shape. The size of the bellows 234 may be adjusted based on the condiment type being pumped to aid in forcing the fluid along the spout 112 and to withdraw the fluid from the outlet 110.

In other embodiments, the bellows 234 is disposed on main body 112B of the spout 112. In some forms, a bellows 234 is disposed on both side panel 112A and main body 112B of the spout 112. In some forms, there may be multiple bellows 234 along the length of the spout 112 with the piston 154 engaging the bellows 234 as the piston 154 reciprocates. In some forms, the bellows 234 is disposed on the outlet port 190 after the valve 196 along the fluid flow path 132.

In other embodiments, the condiment dispenser 100 includes another member that is configured to compress the bellows 234 as the pump tray 106 is pumping fluid toward the outlet 110. The condiment dispenser 100 may include a clamping mechanism or solenoid that is configured to compress the bellows 234 while the pump tray 106 is operating. For example, the control circuitry 270 may cause the solenoid to extend a plunger to engage the bellows 234 during a pumping cycle. In some forms, the bellows 234 remains compressed while the condiment dispenser 100 is dispensing fluid in response to an input from the sensor 108 (e.g., for several pump cycles or reciprocating motions of the piston 154) and is released when the condiment dispenser 100 has completed dispensing (e.g., when a 10 mL dose has been dispensed). The bellows 234 may remain released until the condiment dispenser 100 receives input from the sensor 108 to dispense another dose.

Figure 7D:
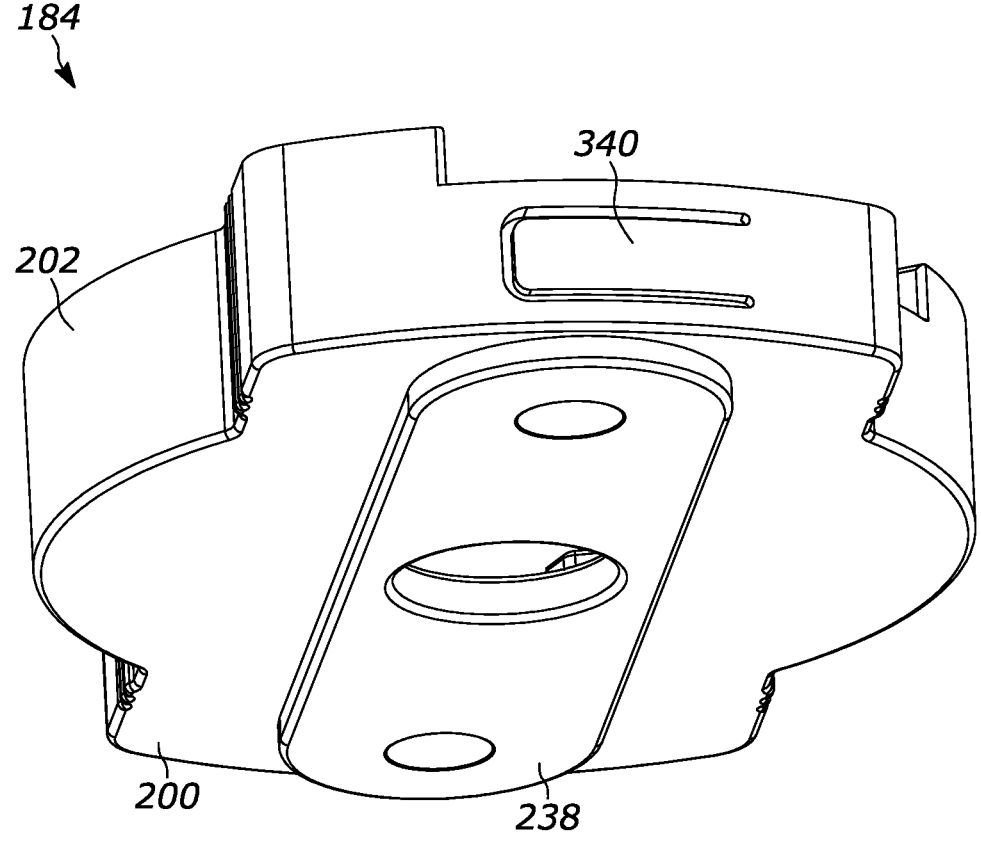
FIG. 7D is a bottom perspective view of a base of the pumping tray of FIG. 7A.
Figure 8A:
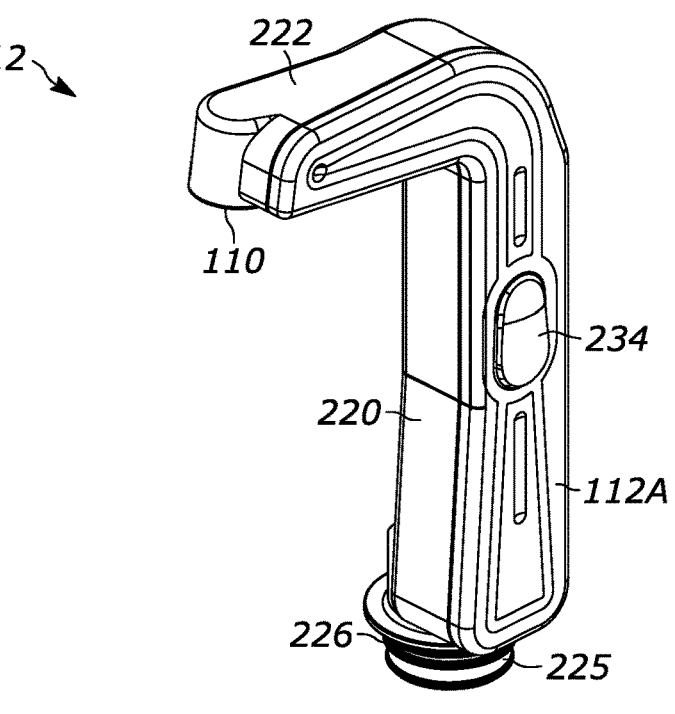
FIGS. 8A and 8B are front perspective and rear perspective views, respectively, of a spout of the condiment dispenser of FIG. 1A.
Figure 8B:
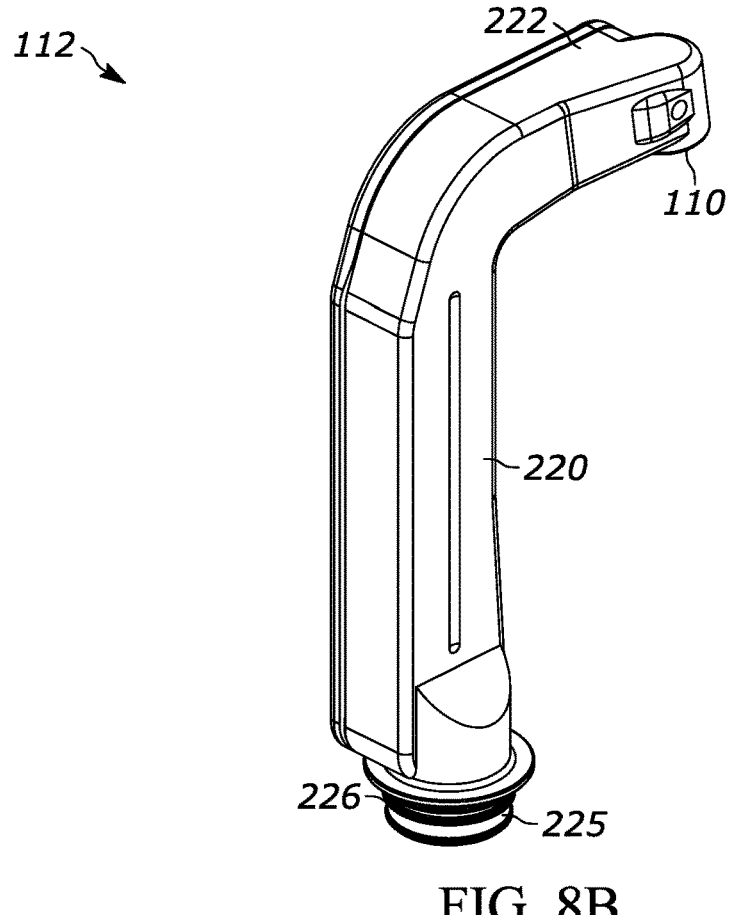
Figure 8C:
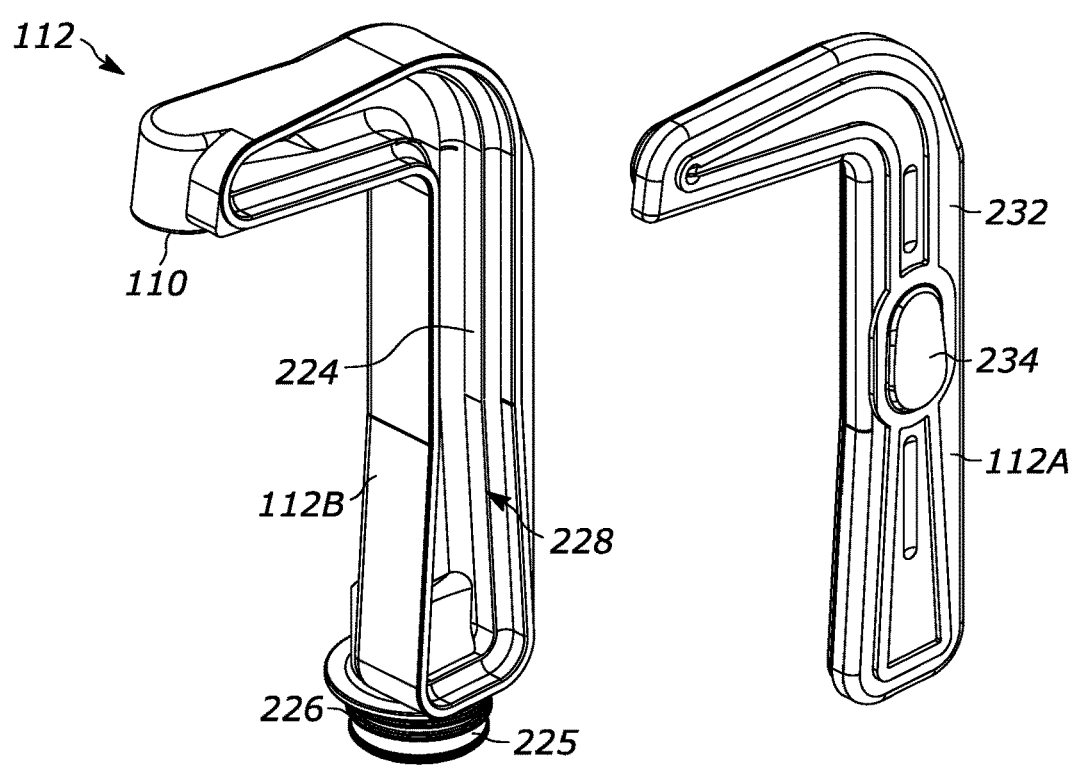
FIGS. 8C and 8D are front perspective and rear perspective views, respectively, of the spout of FIG. 8A shown with a side cover removed.
Figure 8D:
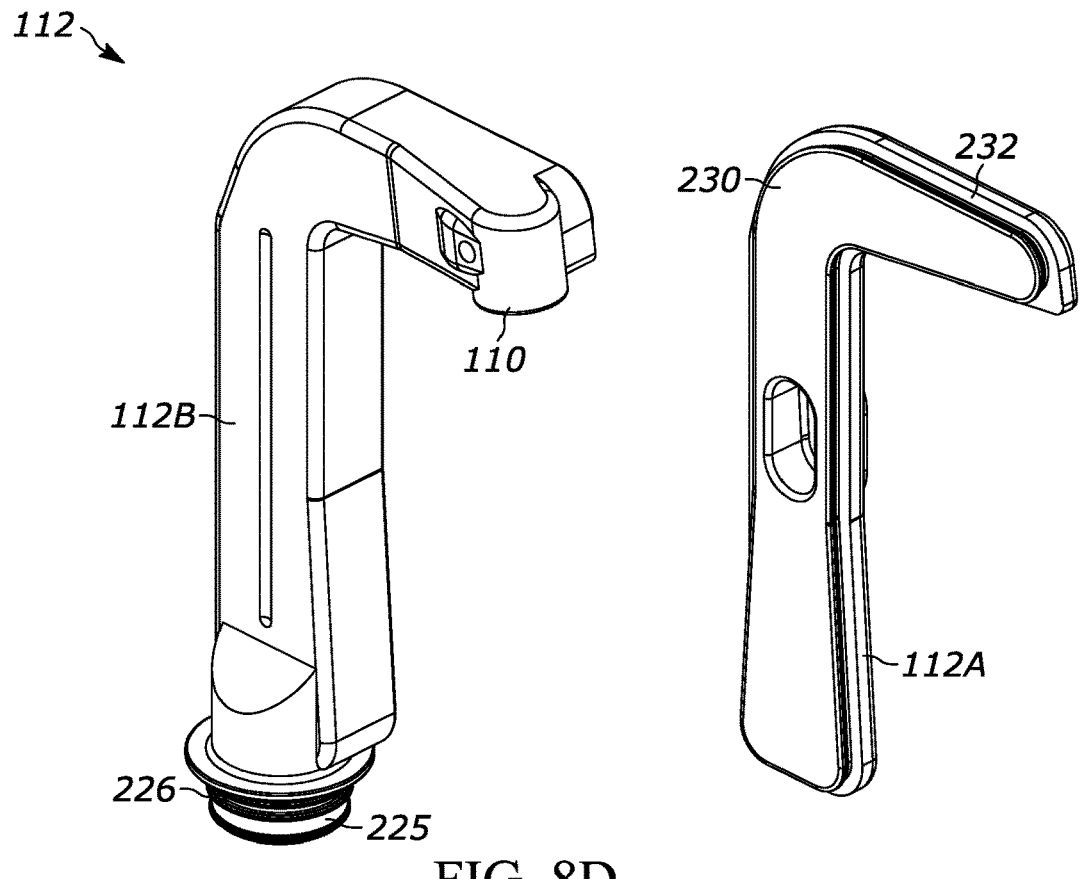

With reference again to FIG. 4, the fluid transfer system 122 includes the pump tray 106 and the spout 112. As shown in FIG. 7D, the base 184 of the pump tray 106 includes an elongate protrusion 238 that is sized to slide within a corresponding groove or track 124 in the base 126 of the condiment dispenser 100 (see, e.g., FIG. 9A-B). The elongate protrusion 238 extends into the track 124 when the pump tray 106 is positioned on the base 126. The track 124 guides the pump tray 106 as the pump tray 106 is slid longitudinally into and out of the base 126 of the housing 120. This permits the fluid transfer system 122 to quickly be removed from the housing 120 without having to remove any fasteners or connections between the fluid transfer system 122 and the housing 120. The fluid transfer system 122 is also easily and intuitively reinstalled or inserted into the base 126. The elongate protrusion 238 of the pump tray 106 is aligned with the track 124 of the base 126 and slid therealong to position the fluid transfer system 122 within the housing. The front cover 118 may then be attached to the housing 120 to secure the fluid transfer system 122 between the front cover 118 and the housing 120.

Figure 10C:
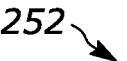
FIG. 10C is a rear perspective view of a front plate of the housing of the condiment dispenser of FIG. 1A.
Figure 10D:
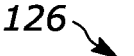
FIG. 10D is a front perspective view of a base of the condiment dispenser of FIG. 1A.
Figure 10D:
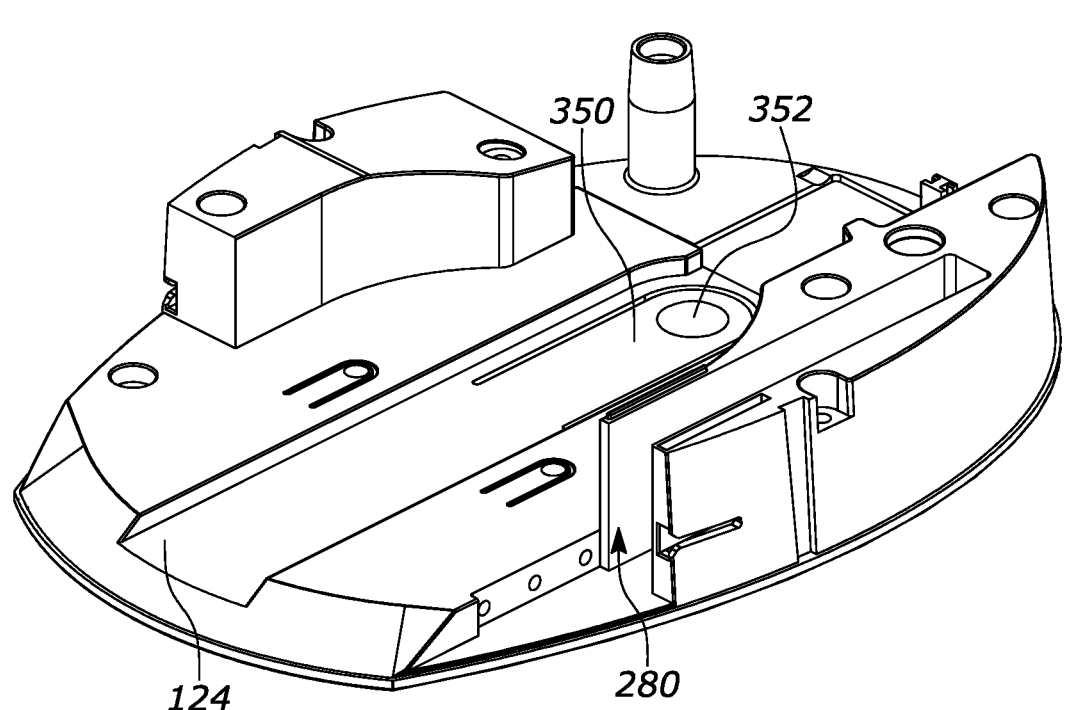

With respect to FIG. 10D, the base 126 includes the track 124 for receiving the fluid transfer system 122. The track 124 may further include a deflectable tab 350 for holding the pump tray 106 in place within the base 126 and to aid in aligning the inlet port 188 with the opening 242 in the cartridge receiver 102. The deflectable tab 350 includes a protrusion 352 that is configured to be inserted into a recess 354 on the bottom side of the of the base 184 of the pump tray 106 to hold the pump tray 106 in place. As the base 184 of the pump tray 106 slides along the track 124, the base 184 engages the protrusion 352 causing the tab 350 to deflect downward. Once the base 184 has be slide along the track 124 to the point where the recess 354 is above the protrusion 352, the protrusion 352 elastically returns to its original position with the protrusion 352 within the recess 354 of the base. The protrusion 352 may snap into the recess 354 of the base 184 at the point where the inlet port 188 of the pump tray 106 is in the proper location and aligned with the opening 242 of the cartridge receiver 102.

The base 126 may further include a slot 280 for receiving the battery 272. Upon removal of the front cover 118, the battery 272 may easily be accessed to be replaced and/or recharged. The base 126 may be secured to the cartridge receiver 102 by fasteners to secure the base 126 to the cartridge receiver 102.

The tip portion 240 of the cartridge 104 is inserted into the opening 242 of the cartridge receiver 102 and extends to attach to the inlet port 188 of the pump tray 106 (see FIG. 1D). As can be seen in FIGS. 5A-B, the cartridge body 244 is not shown and the dispenser-pouch adapter 130 is shown attached to the inlet port 188. The inlet port 188 includes an outer annular wall 246 and an inner cylindrical entry tube 248 to which the tip portion 240 of the cartridge attaches. In the form shown, and with respect to FIGS. 1D and 7A-B, the dispenser-pouch adapter 130 of the cartridge 104 includes a cylindrical outlet 250 that fits over the entry tube 248 and inside the outer annular wall 246. The outer annular wall 246 may aid to guide the cylindrical outlet 250 to connect to the entry tube 248 as the cartridge 104 is inserted into the cartridge receiver 102. The outer annular wall 246 may also serve as a barrier that prevents any fluid that may leak from the cartridge 104 during insertion or removal from flowing from the inlet port 188.

The fluid transfer system 122 may be held in place at least in part by the cartridge 104. Because the cartridge 104 extends through the opening 242 of the cartridge receiver 102 of the housing 120 and attaches to the inlet port 188 of the pump tray 106, the fluid transfer system 122 is not able to be moved along the track 124 when a cartridge 104 is inserted into the condiment dispenser 100. The fluid transfer system 122 is also prevented from rotating or pivoting about the inlet port 188 by the elongate protrusion 238 resting within the track 124 of the base 126. As a result of this configuration, the fluid transfer system 122 is not able to move substantially when a cartridge 104 is inserted into the condiment dispenser 100. To withdraw the fluid transfer system 122 (e.g., for cleaning), the cartridge 104 must first be removed from the cartridge receiver 102 and detached from the inlet port 188 of the pump tray 106. The fluid transfer system 122 may then be slid along the track 124 with force to cause the protrusion 352 of the base 126 to deflect and be moved from the recess 354 of the base 184 of the pump tray 106. To install the fluid transfer system 122, the fluid transfer system 122 is slid along the track 124 of the base 126 until the inlet port 188 of the pump tray 106 is substantially aligned with the opening 242 of the cartridge receiver 102 and the protrusion 352 of the base 126 snaps into the recess 354 of the pump tray 106. The tip portion 240 of the cartridge 104 may then be inserted into the cartridge receiver 102 with the dispenser-pouch adapter 130 attached to the inlet port 188.

The housing 120 of the condiment dispenser 100 includes the front cover 118, front plate 252, the cartridge receiver 102, the base 126, and a top cover 254 (see, e.g., FIG. 2). The front cover 118, front plate 252, the cartridge receiver 102, the base 126, and top cover 254 may be formed of a plastic material such as ABS. With respect to FIGS. 1A-B, the cartridge receiver 102 includes a bowl or basin 128 and a back plate 256. The basin 128 is shaped to receive the bottom conical face 316 of the cartridge 104. The basin 128 includes locking protrusions 258 (see FIG. 3) to which locking slots 362 of the cartridge 104 may be attached to secure the cartridge 104 to the condiment dispenser 100 as described in further detail below. The back plate 256 includes a plurality of fastener members 260 that enable the back plate 256 to be attached to the front plate 252. The fastener members 260 may include magnets configured to interact with corresponding magnets or ferromagnetic materials of fastener members 262 of the front plate 252. In another embodiment, the fastener members 260 receive fasteners that are extended through the front plate 252 to secure the front plate 252 to the back plate 256. The top cover 254 mounts to the top end of the back plate 256 and forms the top of the condiment dispenser 100, extending from the front plate 252 to the back plate 256. The top cover 254 may also include a plurality of fastener members 260 which correspond to fastener members 262 of the front plate 252. For example, the fastener members 260 of the top cover 254 may be used to magnetically attach the top cover 254 to the front plate 252 as described above. In other forms, fasteners may be extended through the fastener members 262 of the front plate 252 and into the fastener members 260 to secure the front plate 252 to the top cover 254.

With respect to FIG. 10C, the rear side of the front plate 252 is shown. The front plate 252 includes a plurality of cylindrical tubes or fastener members 262 including magnets or ferromagnetic metals for magnetically attaching the front plate 252 to the back plate 256. The front plate 252 further includes an elongate opening 264 through which the rollers 170, 171 of the piston 154 may be extended to engage the bellows 234 of the spout 112 as the piston 154 moves upward and downward. The front plate 252 also includes a recessed portion 266 for receiving the spout 112 when the fluid transfer system 122 is inserted into the housing 120. The recess portion 266 is shaped to follow the contour of the spout 112 so that the spout 112 may be received within the recessed portion 266. The recessed portion 266 aids to prevent the spout 112 from moving substantially when inserted into the condiment dispenser 100. For instance, the walls of the recessed portion 266 engage the spout 112 to prevent the fluid transfer system 122 from rocking or pivoting about the elongate protrusion 238 within the track 124 of the base 126, for example, as the roller 170 of the piston 154 engages the bellows 234 of the spout 112. This ensures that the roller 170 deforms or depresses the bellows 234 when in a downward or compressed state and inhibits the spout 112 and/or the bellows 234 from deflecting substantially as the roller 170 is brought into engagement with the bellows 234.

The front plate 252, top cover 254, and back plate 256 of the cartridge receiver 102 form a cavity and houses the control circuitry 270 which may be on one or more circuit boards (FIG. 2). The control circuitry 270 may include a microcontroller or processor, memory, and, in some cases, communication circuitry. The control circuitry 270 may be mounted to one or more circuit boards and mounted to the rear surface of the front plate 252. The control circuitry 270 enables the condiment dispenser 100 to operate automatically. The processor is communicatively and electrically coupled to the memory, the communication circuitry, the sensor 108, and the battery 272.

The control circuitry 270, the sensor 108, and/or the motor 116 may receive power from the battery 272. The battery 272 may be a rechargeable battery such as lithium-ion battery. In other embodiments, other battery types may be used, for example, standard household battery cells (e.g., AA, C, D batteries). The control circuitry 270 may be electrically coupled to the sensor 108 via wires or a ribbon. The sensor 108 may be mounted at an opening 276 in the front plate 252 (see FIG. 1C) along the recessed portion 266 near the outlet 110 of the spout 112 to sense motion and/or proximity near the outlet 110. The control circuitry 270 may provide electrical power to the sensor 108 via wires. The sensor 108 may also communicate with the control circuitry 270 via the wires. For example, the sensor 108 may provide signals to the control circuitry 270 indicating whether motion is detected or whether an object is proximal to the sensor 108. The sensor 108 may continuously provide sensor data to the control circuitry 270 for processing and analysis. In another example, the sensor 108 only provides a signal to the control circuitry 270 when motion is detected or when an object is detected to be proximal to the sensor 108.

Upon receiving a signal from the sensor 108 indicating that motion is detected or an object is proximal to the sensor 108, the controller of the control circuitry 270 may determine whether to actuate the motor 116 to dispense the condiment. In one example, the controller actuates the motor 116 upon receiving communication from the sensor 108 indicating motion has been detected or an object is proximal to the sensor 108. In another example, the controller processes the communication to determine the length of time for which motion is detected or that an object has been proximal to the sensor 108. For example, the controller may be configured to monitor the motion signals for a certain period of time before dispensing the condiment, for example, for one or two seconds. Requiring a detection of motion for a certain minimum period of time may reduce the likelihood that condiment is dispensed when a user is not ready or when the sensor 108 detects movement that is not meant to request fluid be dispensed. Similarly, where the sensor 108 is a proximity sensor, the controller may be configured to dispense the condiment only after the object has been proximal to the sensor 108 for a minimum period of time.

The control circuitry 270 may be configured to delay the dispensing of the fluid for a certain period of time after determining that a user desires the condiment be dispensed (e.g., user motion or proximity). The controller may wait one or two seconds, for example, before operating the motor 116 to dispense the condiment. This allows time for the user to position their container, plate, or food item underneath the outlet 110 before the condiment is dispensed. This may reduce the dispensing of fluid when a user is not ready, which may result in the condiment being dispensed on the surface on which the container rests or where not desired by the user. The condiment dispenser 100 may indicate to the user when the condiment is going to be dispensed. This may be done, for example, by using an indicator light disposed on the condiment dispenser 100. The indicator light may, for instance, turn green when the condiment dispenser 100 has detected the user desires the condiment and is going to dispense, allowing the user to position their container or food item accordingly.

When the control circuitry operates the motor 116, the control circuitry 270 may send a signal to the electric motor 116 to operate. The control circuitry 270 may cause the motor 116 to operate in a forward direction for a period of time or number of rotations and then in a reverse direction for a period of time or number of rotations to cause the piston 154 to reciprocate, or according to a predetermined cycle of upward and downward motion to cause the diaphragm 160 of the pump tray 106 to move upward and downward to pump fluid. For example, the motor 116 may repeatedly rotate the pulley 142 half of a rotation in a forward direction from and initial position and then half of a rotation in a reverse direction back to the initial position. The motor 116 drives the piston 154 and the diaphragm 160 of the pump tray 106 in the manner described above with regard to FIGS. 5A-B to cause the fluid transfer system 122 to pump fluid from the cartridge 104 to the outlet 110 of the spout 112. The control circuitry 270 may be configured to cause piston 154 to have different length strokes to cause the volume of the diaphragm 160 increased and decreased to varying degrees. The length of the stroke of the piston 154 may be adjusted based on the fluid being pumped through the pump tray 106 and/or the desired size of the dose to be dispensed at the outlet 110. In some forms, the motor 116 is a servo motor and the control circuitry 270 sends pulse-width modulated signals to the motor 116 to cause the motor 116 to rotate to between precise positions to ensure the piston 154 is moved within a predetermined range. The control circuitry 270 may cause the motor 116 to return to an initial starting position after each dispensing cycle to ensure that the motor 116 drives the piston 154 within the proper range of motion and so that the roller 170 of the piston 154 is removed from the bellows 234 of the spout 112 to withdrawn the fluid from the outlet 110 of the spout 112 to prevent dripping or fluid leakage.

The control circuitry 270 may provide control signals to the motor 116 until the desired amount of condiment has been dispensed, for a predetermined length of time, or predetermined number of pump cycles (upward/downward cycles of the piston 154). The controller may be programmed to operate the electric motor 116 based on the condiment being dispensed. The controller may be programmed with a different setting for each condiment. For example, the controller may operate the motor 116 at different speeds for each condiment to provide a suitable flow rate. As another example, the motor 116 may be operated for a different period of time or a different number of pump cycles for different types of condiments. This may be done to accommodate the varying viscosities and densities of the condiments. This may also be done to dispense a certain amount of the condiment in a period of time. For instance, the condiment dispenser 100 may dispense 30 grams of condiment over a five second period of time. The motor 116 may be operated to achieve this dispensing rate based on the fluid properties of the condiment.

In some forms, the condiment dispenser 100 includes a user interface, such as one or more buttons, disposed thereon that a user may input the condiment type of the cartridge 104 inserted into the cartridge receiver 102. The user interface may be in communication with the control circuitry 270 and provide a signal to the control circuitry 270 indicating the type of condiment. The motor 116 may then be operated by the controller accordingly. In some forms, the cartridges 104 may have a tag, such as an RFID tag, attached to them that is readable by the condiment dispenser 100 when the cartridge 104 is received therein. The control circuitry 270 may receive or determine the condiment type from a tag reader of the condiment dispenser 100 and adjust the settings of the condiment dispenser 100 accordingly.

Once the motor 116 has forced a certain amount of condiment out the outlet 110 of the spout 112, finished a pumping cycle, and/or the sensor 108 indicates a user is no longer present, the control circuitry 270 and/or the motor 116 may cease operation, causing fluid to no longer be dispensed. The control circuitry 270 may continue to operate the motor 116 to cause the motor 116 to return to an initial position or a position where the roller 170 of the piston 154 is not engaging the bellows 234 of the spout 112. This causes prompt cessation of the condiment from being dispensed and may draw the condiment further inside the spout 112 and away from the outlet 110 which may reduce dripping of the condiment out of the outlet 110.

The control circuitry 270 may be configured to delay dispensing for a period of time after a dispensing cycle. This allows the user to move their plate, container, or food item out of the range of the sensor 108 before dispensing another dose of the condiment. If the sensor 108 detects that a user continues to desire more condiment (e.g., their plate, container, or food time remain under the sensor 108), the controller may delay dispensing the condiment for a period of time to ensure the user has had time to move away from the sensor 108. The controller may delay for a certain period of time, for example, one, two, or three seconds before dispensing another dose of the condiment. This provides adequate time for a user to withdraw their plate, container, or food item from the range of the sensor 108 if they no longer desire additional condiment. This reduces the likelihood that the control circuitry 270 will cause condiment to be dispensed after a user has pulled their plate, container, or food item away from the outlet 110.

In other embodiments, the control circuitry 270 is configured to continue dispensing the condiment until the sensor no longer detects the user's presence (e.g., their plate, container, or food item) under the sensor 108. The controller may be configured to immediately cease dispensing upon a determination that the user is pulling their plate, container, or food item away from the outlet 110.

The condiment dispenser 100 may include a microphone coupled to the control circuitry 270 for receiving a user's oral command to dispense. The condiment dispenser 100 may dispense the condiment to the user upon a determination that the user has said a trigger word, such as "dispense" for example. The condiment dispenser 100 may dispense a dose of the condiment before ceasing to dispense the condiment. In another example, the condiment dispenser 100 may dispense the condiment until the user says another trigger word, such as "stop" for example. Upon a determination, for example by the control circuitry 270, that the user has said "stop," the control circuitry 270 may cease dispensing the condiment.

With respect to FIG. 2, the battery 272 is may be slide within a slot 280 in the base 126. The battery 272 electrically powers the electrical components of the condiment dispenser 100. The battery 272 may be electrically coupled to the other electrical components by wires. The battery 272 may be a rechargeable battery that may be recharged by withdrawing the battery 272 from the base 126 and placing the battery on a charger. The battery 272 may be swapped or replaced with another battery 272 when the battery 272 is low or out of charge by removing the front cover 118 to gain access to the battery 272. The battery 272 may be withdrawn from the base 126 by sliding the battery 272 along the slot 280. The battery 272 may then be recharged or replaced with another battery 272 and inserted along the slot 280. In some forms, the battery 272 may need to be plugged into a wire to electrically connect the battery 272 to the condiment dispenser 100. In other forms, the battery 272 may be electrically connected upon sliding the battery 272 into the slot until the terminals of the battery 272 engage corresponding terminals of the condiment dispenser 100. In some forms, the battery 272 is snapped into place and electrically connected to the condiment dispenser upon being snapped into place. In some forms, the battery 272 may be recharged while remaining within the condiment dispenser 100. For example, the base 126 of other portion of the condiment dispenser 100 may include a recharging port for connection to a power source to recharge the battery 272 without removing the battery 272 from the condiment dispenser 100. In other embodiments, the battery 272 is comprised of one or more replaceable standard batteries (e.g., four AA batteries). The replaceable batteries may be removed and replaced with new batteries. In some forms, the batteries that are removed may be recharged via a battery charger. In yet other embodiments, the condiment dispenser 100 includes a power cord that may be attached to or inserted in a standard wall outlet to provide electrical power to the condiment dispenser 100. The condiment dispenser 100 may include power conditioning circuitry to provide the proper electrical power to the electronics of the condiment dispenser 100.

The condiment dispenser 100 may include an on/off switch 360 on the back side of the top cover 254 for turning the condiment dispenser on and off. The condiment dispenser 100 may be turned off to prevent the condiment dispenser 100 from dispensing fluid when the sensor 108 is triggered. The condiment dispenser 100 may be turned off before disassembling the condiment dispenser 100, for example, for cleaning. The condiment dispenser 100 may be turned on to provide power to the electronics of the condiment dispenser 100 to permit fluid to be dispensed in response to input detected by the sensor 108.

The top cover 254 further includes an opening 370 on the top surface through which an indicator light 372 may extend from the control circuitry (FIGS. 1A, 3). The indicator light 372 may be one or more LEDs and be configured to light up in various colors and/or flashing patterns to indicate various states a user. The control circuitry 270 is communicatively coupled to the indicator light 372, determines the state of the dispenser 100, and controls the indicator light 372 based on a determined state. The control circuitry 270 may cause the indicator light 372 to display a color (e.g., green) when the condiment dispenser 100 is not being used, but is available for use to indicator to users that the condiment dispenser is available for use. The control circuitry 270 may cause the indicator light to display a different color (e.g., yellow) and/or flash when the dispenser 100 has sensed proximity/motion via the sensor 108 and to alert the user the condiment dispenser 100 will be dispensing fluid. The control circuitry 270 may cause the light to be yet another color (e.g., red) and/or flash when the battery 272 is low or needs to be replaced.

The front cover 118 may attached to the front plate/cartridge receiver 102. In some forms, the front cover 118 is magnetically attached to the front plate 252 and cartridge receiver 102. The front cover 118 may include magnets or ferromagnetic metals that interact with the magnetic fastener members 262 of the front plate 252, when brought into contact or proximity with the cartridge receiver 102. Additionally, or alternatively, the front cover 118 may include an insertion protrusions (e.g., T-shaped protrusions) be configured to slid into receiving slots 374 of the front plate 252/cartridge receiver 102 (see FIGS. 5B, 10A) such that the front cover 118 remains attached to the remainder of the housing 120 by friction fit, but is easily detachable. The front cover 118 may also be attached by a snap-fit connection with the front plate 252/cartridge receiver 102. Having the front cover 118 be attached such that it is easily detachable (by magnetic, snap-fit, or friction fit attachment) is advantageous to quickly performing maintenance on the condiment dispenser 100. For example, when the condiment dispenser 100 is to be cleaned or the battery 272 replaced, the front cover 118 may be quickly and easily removed to access the fluid transfer system 122 and/or the battery 272.

In operation, a cartridge 104 may be inserted into the basin 128 of the cartridge receiver 102 to connect the dispenser-pouch adapter to the inlet port 188 of the pump tray 106. A user may place their plate, food item, or other condiment receptacle under the outlet 110 of the condiment dispenser 100. The control circuitry 270 detects the user's proximity and/or motion at the outlet 110 via data from the sensor 108 and determines that the user desires condiment to be dispensed (e.g., based on detecting the user's presence for a period of time). The control circuitry 270 operates the motor 116 in a pump cycle to drive the piston 154 upward and downward to cause the diaphragm 160 of the pump tray 106 to pump fluid through the pump tray 106. Fluid is drawn from the cartridge 104, pumped along the channel of the pump tray 106, out the outlet port 190, up the spout 112, and to the outlet 110 where the fluid is dispensed to the user. The control circuitry 270 may be configured to pump the fluid for a certain period of time or a certain number of pump cycles before checking if the user is still present at the outlet 110 with the sensor 108 data. In some forms, the control circuitry 270 continues to monitor the data from the sensor 108 throughout the pump cycle and stops the pump cycle when the user is no longer present at the outlet 110 (e.g., the user withdraws their condiment receptacle from the outlet 110).

When the cartridge 104 has been emptied by the condiment dispenser 100 or when it is desired to replace the cartridge 104, the cartridge 104 may be removed from the cartridge receiver 102 and detached from the inlet port 188 of the pump tray 106. The cartridge 104 may be refilled and the cartridge 104 or a new cartridge 104 may be inserted into the cartridge receiver 102 as described above to continue to dispense fluid to users.

To clean the condiment dispenser 100, the cartridge 104 is removed. The front cover 118 may be removed from the base by unsnapping the front cover 118 from the front plate. The fluid transfer system 122 may then be withdrawn from the housing 120 along the track 124 of the base 126. The fluid transfer system 122 may be disassembled and washed. The side panel 112A of the spout 112 may be removed from the spout 112 to provide access to the channel 224 of the spout 112 which minimizes the area where condiment may be trapped and avoid cleaning. The pump tray 106 may also be disassembled with the lid 180 being rotated relative to the base 184 to unlock the lid 180 and the channel member 182 from the base 184. The lid 180, channel member 182, and the base 184 may then be washed separately to fully clean the pump tray and minimize areas where fluid may be trapped within the pump tray 106 and avoid cleaning. The components of the fluid transfer system 122 may be washed by hand or may be washed in a dishwasher, being formed of dishwasher safe materials. Since all of the components of the fluid transfer system 122 are separable for cleaning, the condiment dispenser 100 has no long channels or enclosed areas that are hard to reach and clean. This obviates the need for specialized cleaning tools, such as long brushes or cleaning utensils, for properly and fully cleaning the condiment dispenser as in prior art dispensers. Instead, all areas of the condiment dispenser 100 where fluid is in contact is easily accessible for cleaning. The components of the housing 120 may also be wiped down as needed.

Once washed, the fluid transfer system 122 may then be reassembled and inserted into the housing 120. The side cover 112A of the spout 112 may be inserted into the spout body 112B to form the spout 112. The channel member 182 may be positioned within the base of the pump tray 106 and the lid 180 positioned on the channel member 182. The lid 180 may be rotated relative to the base 184 to secure the lid 180 and the channel member 182 to the base 184 to form the pump tray 106. The spout 112 may be attached to the outlet port 190 of the pump tray 106 and inserted along the track 124 of the base 126. The front cover 118 may be reattached to the housing 120. The condiment dispenser 100 is then ready to receive a cartridge 104 and resume pumping fluid to users.

With respect to FIGS. 11A-D and 12A-G, the cartridge 104 is shown according to a first embodiment of a cartridge compatible with the condiment dispenser 100. Cartridge 104 is a refillable cartridge configured to store a condiment pouch within a body 244. The condiment may be any condiment including, as examples, ketchup, mustard, barbeque, mayonnaise, relish, and other sauces with or without particulates. As shown, the body 244 is comprised of two halves 244A, 244B, connected by a hinge 282. The side of each of the halves 244A, 244B opposite the hinge 282 are configured to be secured together by a snap connection. The halve 244A includes two snap members 284 that have a barbed hook 286 for attaching to a ridge 288 of the halve 244B (see FIG. 11C). The snap members 284 are elastically deflectable to remove the barbed hook 286 from hooking the ridge 288 to permit the halves 244A, 244B to rotate relative to one another about the hinge 282. The halves 244A, 244B may be closed by bringing the snap members 284 to the ridge 288 of the half 244B. The barbed hooks 286 of the snap members 284 may include a ramped surface 286A that engage the ridge 288 as the cartridge 104 is being closed. As the barbed hook 286 is forced against the ridge 288, the ramped surface 286A causes the snap member 284 to deflect away from the ridge 288 until the barbed hook 286 passes over the ridge 288. At this point, the barbed hook 286 elastically springs back to its original position, hooking the ridge 288 and inhibiting the halves 244A, 244B from being rotated relative to one another about the hinge 282. The halves 244A, 244B may be opened by manually deflecting the snap members 284 and passing the barbed hook 286 over the ridge 288.

A condiment pouch may be inserted into the cartridge body 244 when in the open position (see FIG. 11D) and connected to the pouch piercer 290 of the dispenser-pouch adapter 130. The cartridge body 244 may then be moved to the closed position with the condiment pouch within the cartridge body 244. The cartridge 104 is then ready to be inserted into the cartridge receiver 102 of the condiment dispenser 100 to dispense the fluid in the condiment pouch.

The cartridge 104 further includes a tip portion 240 to which the dispenser-pouch adapter 130 may be connected. The dispenser-pouch adapter 130 includes a first end with the pouch piercer 290 and a second end with a valve 307 for attachment to the inlet port 188 of the pump tray 106. A channel 291 (see FIG. 12E) extends from the pouch piercer 290 to the valve 307 within the dispenser-pouch adapter 130. The dispenser-pouch adapter 130 includes a body 292 and a side panel 294 configured to be removably attached to the body 292. The side panel 294 may attach to the body 292 by a snap-fit or friction fit connection and be inserted into an opening 293 in the body 292. In other embodiments, the side panel 294 is connected to the body 292 by one or more straps or a clip. The side panel 294 includes an insertion portion 296 that may be inserted into the opening 293 of the body 292 and an outer portion 298 that abuts the portion of the body 292 about the opening. The insertion portion 296 may have a shape that corresponds to the shape of the opening of the body 292 to ensure the opening is closed when the side panel 294 is attached. A seal (e.g., an O-ring) may be positioned about the insertion portion 296 to form a sealed connection between the side panel 294 and the body 292 when connected together. The body 292 may include a hook 300 that is configured to hook a protrusion 295 of the side panel 294 when the side panel 294 is attached to the body 292. To attach the side panel 294 to the body 292, the protrusion 295 of the side panel 294 may be positioned underneath the hook 300 and the opposite end of the side panel 294 pivoted about the hook 300 to force the insertion portion 296 into the opening of the body 292. The side panel 294 includes a tab 302 at the end opposite from the protrusion 295 with a protrusion 304 that snaps into a corresponding recess of the body 292. The side panel 294 may be removed by applying force to the tab 302 end of the side panel 294 to pivot the side panel 294 about the hook 300 to draw the insertion portion 296 of the side panel 294 from the body 292. The side panel 294 may slide apart with the application of an amount of force to ensure the side panel 294 does not become inadvertently detached from the body 292, but enables a user to pull the side panel 294 off without significant difficulty. By including a side panel 294 that is removable, a significant portion of the channel 291 is able to be directly and easily accessed, for example, for cleaning (e.g., in a dishwasher).

The body 292 includes an attachment end including a base 305 and an annular skirt 306 having attachment threads, partial threads, or protrusions 308. The annular skirt 306 is for attaching the valve 307 to the body 292 of the dispenser-pouch adapter 130. The valve 307 may be substantially cylindrical shaped and include corresponding threads 310 that engage the threads 308 of the annular skirt 306 of the body 292 to attach the valve 307 to the body 292. The body 292 includes an opening 309 extending through the base 305 and a sealing post 312 extending within the channel 291 from the base 305. The opening 309 permits fluid to flow along the channel 291 through the base 305 to the valve 307. The valve 307 includes a sealing flap 314 that extends about the sealing post 312 within the channel 291. The sealing flap 314 may have a shore hardness of about 40 A being flexible enough to permit suction from the pump tray 106 to open the valve 307, but stiff enough to return to the closed position. In other embodiments, the shore hardness may be increased, for example, about 70 A. The valve 307 forms a one-way valve with the body 292 of the dispenser-pouch adapter 130. With reference to FIG. 12F, the sealing flap 314 may be biased toward the normally closed position with the sealing flap 314 engaging the sealing post 312 of the body 292 to form a sealed connection. This biasing prevents fluid from leaking from the cartridge 104 or dripping out of the cartridge 104 when the cartridge 104 is removed from the condiment dispenser 100 (e.g., during insertion or removal from the cartridge receiver). The valve 307 thus may serve as an anti-drip valve. With reference to FIG. 12G, when the valve 307 is connected to the inlet port 188, the pump tray 106 may create a negative pressure at the inlet port 188 drawing the sealing flap 314 from the sealing post 312 and permitting fluid to flow from the channel 291 and into the inlet port 188 of the pump tray 106. When there is positive pressure from the pump tray 106, such as when the pump tray 106 is forcing fluid out of the outlet port 190, the fluid forces the sealing flap 314 against the sealing post 312 as shown in FIG. 12E thereby inhibiting fluid from passing back through the valve 307 and into the channel 291 of the dispenser-pouch adapter 130. When fluid is not being drawn from the cartridge 104, the valve 307 remains in the closed, sealed position which aids in maintaining the freshness of the condiment within the cartridge and thus aids to inhibit the spoilage of the condiment that remains sealed from the air within the dispenser-pouch adapter 130 and/or the condiment pouch.

The valve 307 further includes sealing members 318 that extend radially inward from the cylindrical body of the valve 307. These sealing members 318 may contact the inner cylindrical entry tube 248 of the inlet port 188 when the cartridge 104 is attached to the condiment dispenser 100. These sealing members 318 aid to form a sealed connection between the valve 307 and the inlet port 188 to prevent fluid from passing through the connection. This aids to prevent air from entering the inlet port 188 when the pump tray 106 is pumping fluid, thus causing fluid to be drawn from the cartridge 104. The sealed connection also servers to preserve the freshness of the fluid or condiment within the pump tray 106.

Figure 11A:
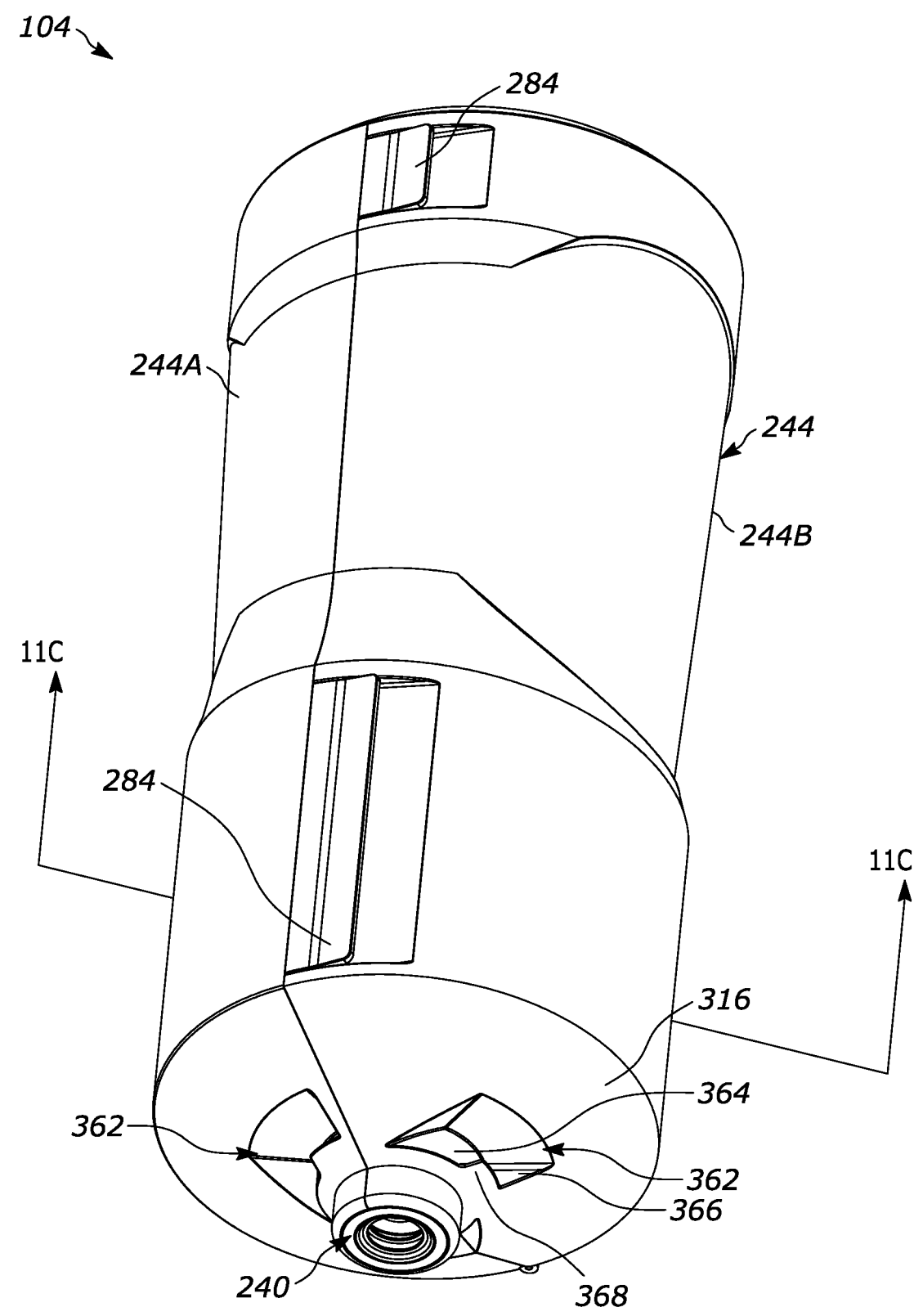
FIGS. 11A-B are front and rear perspective views, respectively, of the cartridge according to a first embodiment.
Figure 11B:
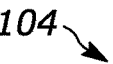
Figure 11C:
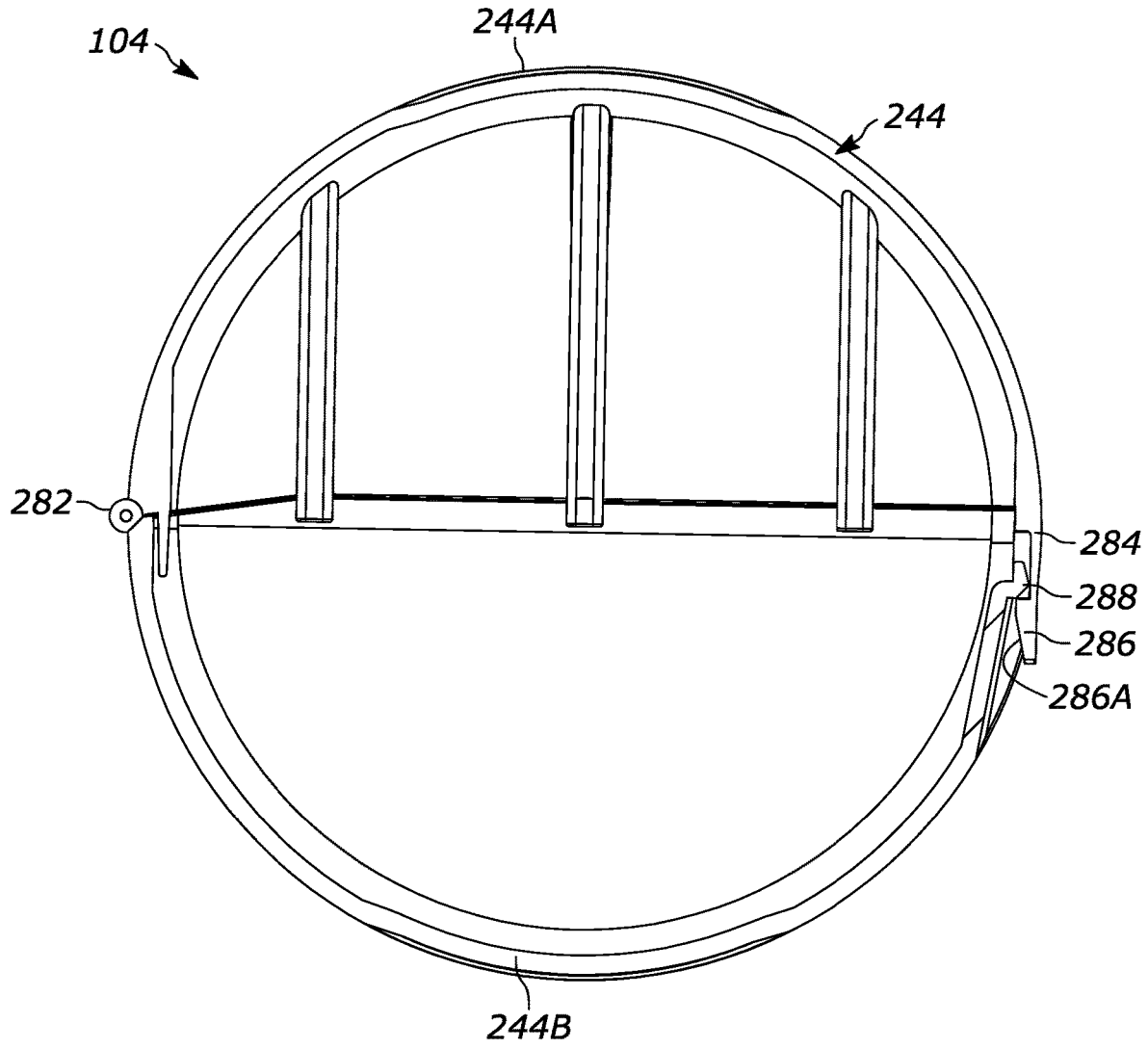
FIG. 11C is a cross-section view of the cartridge of FIG. 11A taken along lines 11C-11C of FIG. 11A.
Figure 11D:
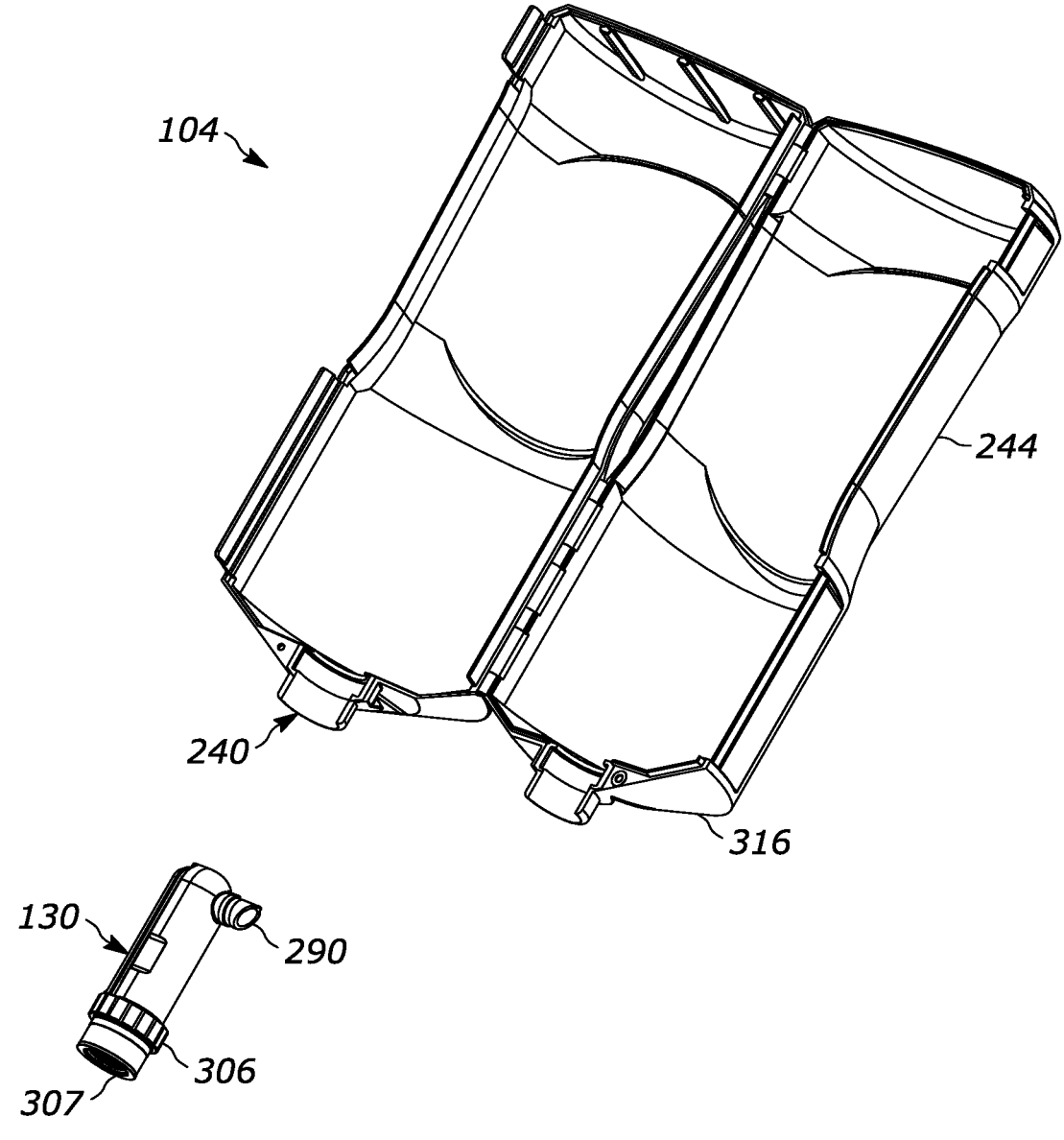
FIG. 11D is a perspective view of the cartridge of FIG. 11A shown in an open configuration.
Figure 11E:
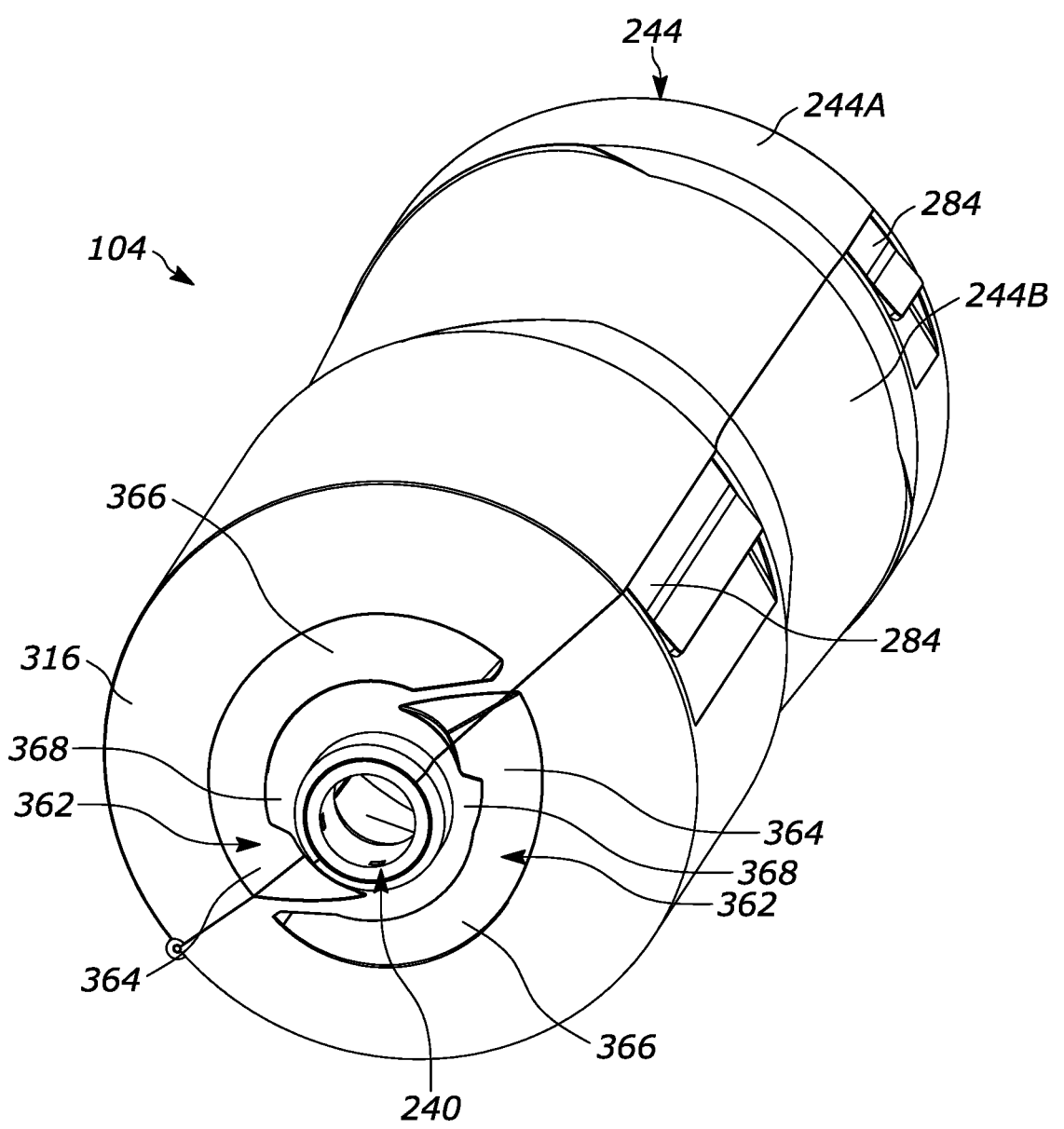
FIG. 11E is a bottom perspective view of a condiment cartridge of FIG. 11A having an alternative locking slot configuration.

With reference again to FIGS. 11A-B, the bottom face 316 of the cartridge 104 is substantially conical in shape. The bottom face 316 has a shape that corresponds substantially to the shape of the basin 128 of the cartridge receiver 102 such that when the bottom face 316 rests on the basin 128, the cartridge 104 is supported in an upright position. The bottom face 316 of the cartridge 104 includes three locking slots 362 configured to hook locking protrusions 258 within the basin 128 of the cartridge receiver 102. In another embodiment shown in FIG. 11E, the cartridge 104 may include two locking slots 362. In other embodiments, any number of locking slots 362 may be used that correspond to the locking protrusions 258 of the cartridge receiver 102. For example, the cartridge 104 of FIG. 11E having two locking slots 362 may be attached to the tray 102A of FIG. 4B having two locking protrusions 258. The locking slots 362 and the locking protrusion 258 enable the cartridge 104 to be attached to the cartridge receiver 102 by a bayonet connection. The locking slots 362 are L-shaped slots each have a mouth 364 into which the locking protrusions 258 may be inserted into the locking slots 362. The cartridge 104 may then be rotated relative to the cartridge receiver 102 to move the locking protrusions 258 along a leg portion 366 of the locking slot 362. Once the locking protrusions 258 are positioned within the leg portion 366 of the slot, the locking protrusions 258 catch on a ledge 368 of the locking slot 362 that prevents the cartridge 104 from being moved along its axis relative to the cartridge receiver 102. The cartridge 104 is then secured to the cartridge receiver 102 and prevented from moving substantially relative to the cartridge receiver 102, for example, due to pressure of the fluid at the inlet port 188 of the pump tray 106 when the diaphragm is compressed for force fluid toward the outlet 110.

To insert the cartridge 104 into the condiment dispenser 100, the bottom face 316 of the cartridge 104 is brought to the basin 128 of the cartridge receiver 102. The locking protrusions 258 of the cartridge receiver 102 are aligned with the mouths 364 of the locking slots 362 of the cartridge 104. The locking protrusions 258 are slid into the locking slots 362 and the cartridge 104 rotated relative to the cartridge receiver 102 to slide the locking protrusions 258 along the leg portion 366 of the locking slot 362. The cartridge 104 is then secured to the condiment dispenser 100.

To remove the cartridge 104 from the condiment dispenser 100, the cartridge 104 is rotated relative to the cartridge receiver 102 to move the locking protrusions 258 toward the mouth 364 of the locking slots 362. Once the locking protrusions 258 are aligned with the mouths 364 of the locking slots 362, the cartridge 104 may lifted from the cartridge receiver 102.

In use, the pouch piercer 290 of the dispenser-pouch adapter 130 may be used to pierce a condiment pouch (now shown) to allow condiment from the condiment pouch to flow through the channel 291 to the valve 307. The condiment pouch may be positioned within the cartridge body 244 when in the open configuration. The valve 307 may be positioned within the tip portion 240 and the cartridge body 244 moved to the closed configuration with the condiment pouch within the cartridge body 244. The halves 244A, 244B of the cartridge body 244 may be moved relative to one another about the hinge 282 until the snap member 284 of the first half 244A hooks onto the ridge 288 of the second half 244B to secure the cartridge body 244 in a closed configuration. The cartridge 104 may then be inserted into the condiment receiver 102 of the condiment dispenser 100 to dispense the fluid from the condiment pouch.

With respect to FIGS. 13A-E, a cartridge 400 is shown according to a second embodiment that is compatible with the condiment dispenser 100. The cartridge 400 is similar in many respects to the cartridge 104 of the previous embodiment, with the differences being highlighted in the following discussion. The cartridge 400 does not include a condiment pouch, but rather the condiment is placed directly inside the cartridge. The cartridge 400 may be refilled with condiment each time the cartridge 400 is emptied. In some forms, the cartridge 400 may need to be returned to a supplier to be refilled. The cartridge 400 may be sealed and configured to be opened with special tools by a supplier for cleaning and refilling, and to otherwise prevent those purchasing the cartridges 400 from opening or refilling the cartridges 400 themselves.

The cartridge 400 includes a cartridge body 402, a plunger 404, a lid 406, and a valve 408. The cartridge body 402 receives the plunger 404 and has a cylindrical interior surface along which the plunger 404 slides to aid in emptying the cartridge 400. The bottom face 410 of the cartridge body 402 has a conical shape that is similar to the bottom face 316 of the cartridge 104 and configured to be placed in the basin 128 of the cartridge receiver 102. The bottom face 410 has locking slots 412 for attaching the cartridge 400 to the cartridge receiver 102 of the condiment dispenser 100 similar to the locking slots 362 of the cartridge 104 described above. The valve 408 is positioned within the tip portion 414 of the cartridge body 402 and configured to be attached to the inlet port 188 of the pump tray 106 when the cartridge 400 is inserted into the cartridge receiver 102.

Figure 13A:
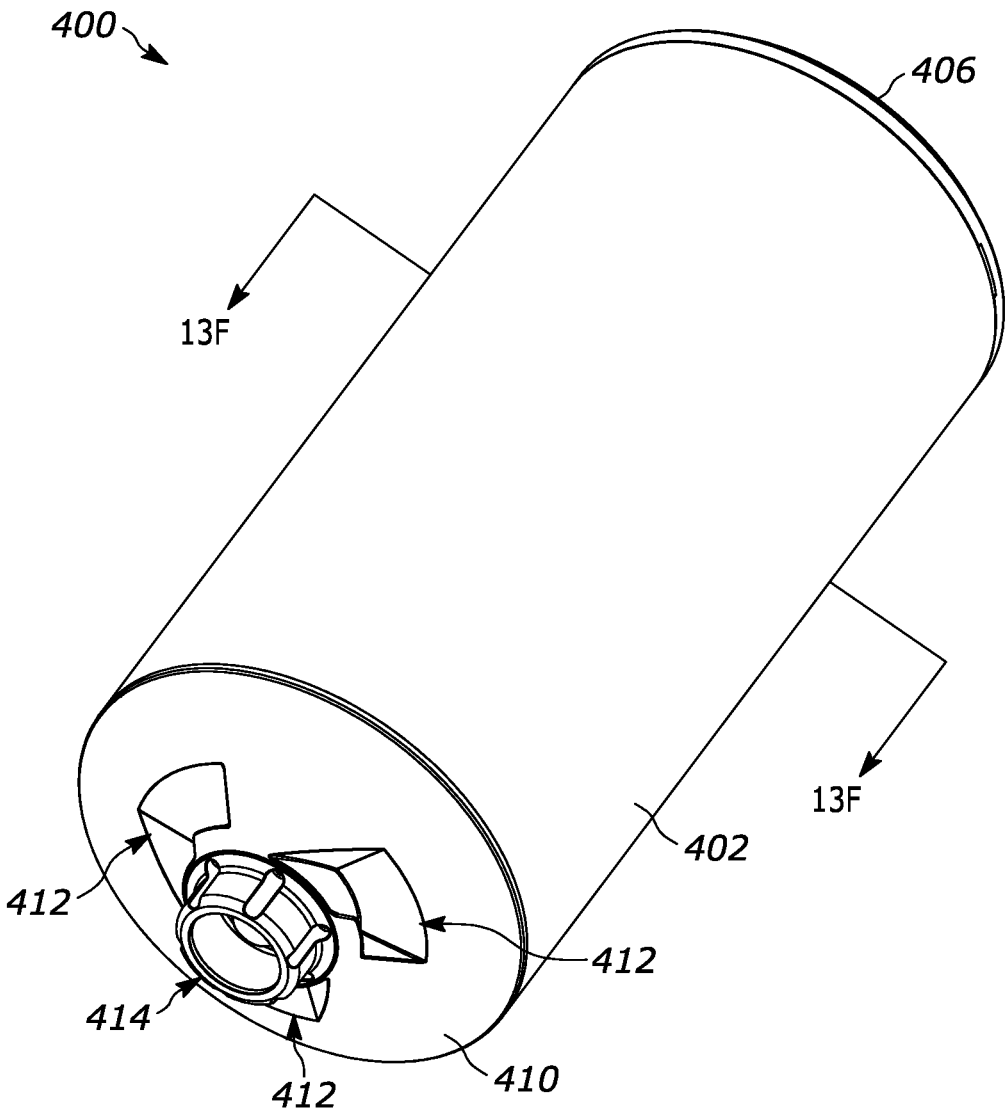
FIG. 13A is a bottom perspective view of a cartridge according to a second embodiment.
Figure 13B:
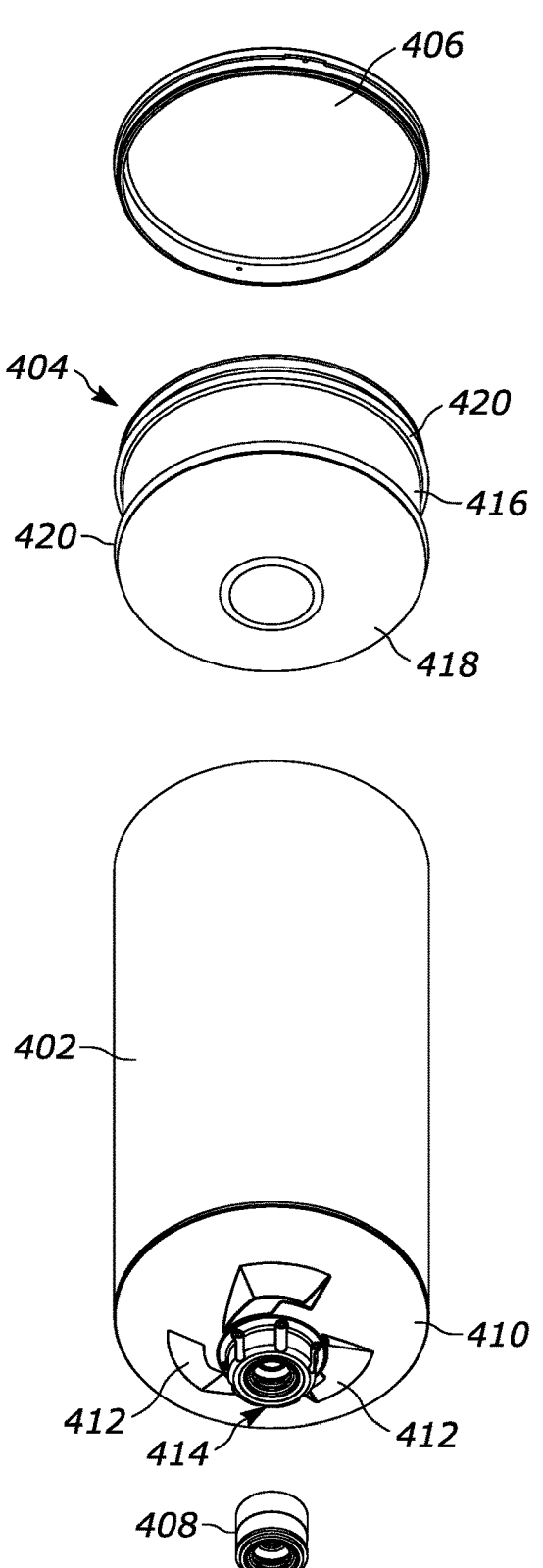
FIG. 13B is an exploded view of the cartridge of FIG. 13A.
Figure 13C:
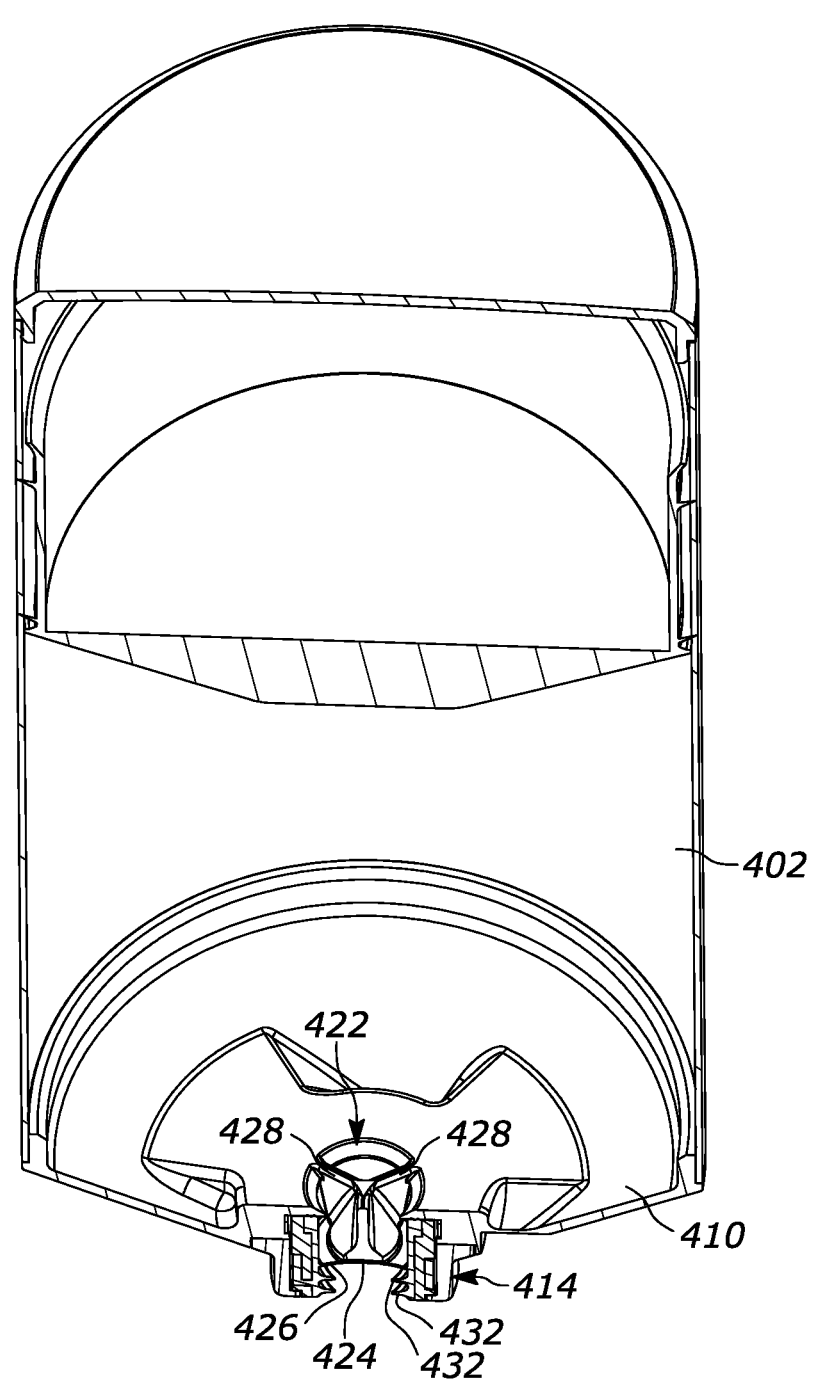
FIG. 13C is a perspective cross-sectional view of the cartridge of FIG. 13A.
Figure 13D:
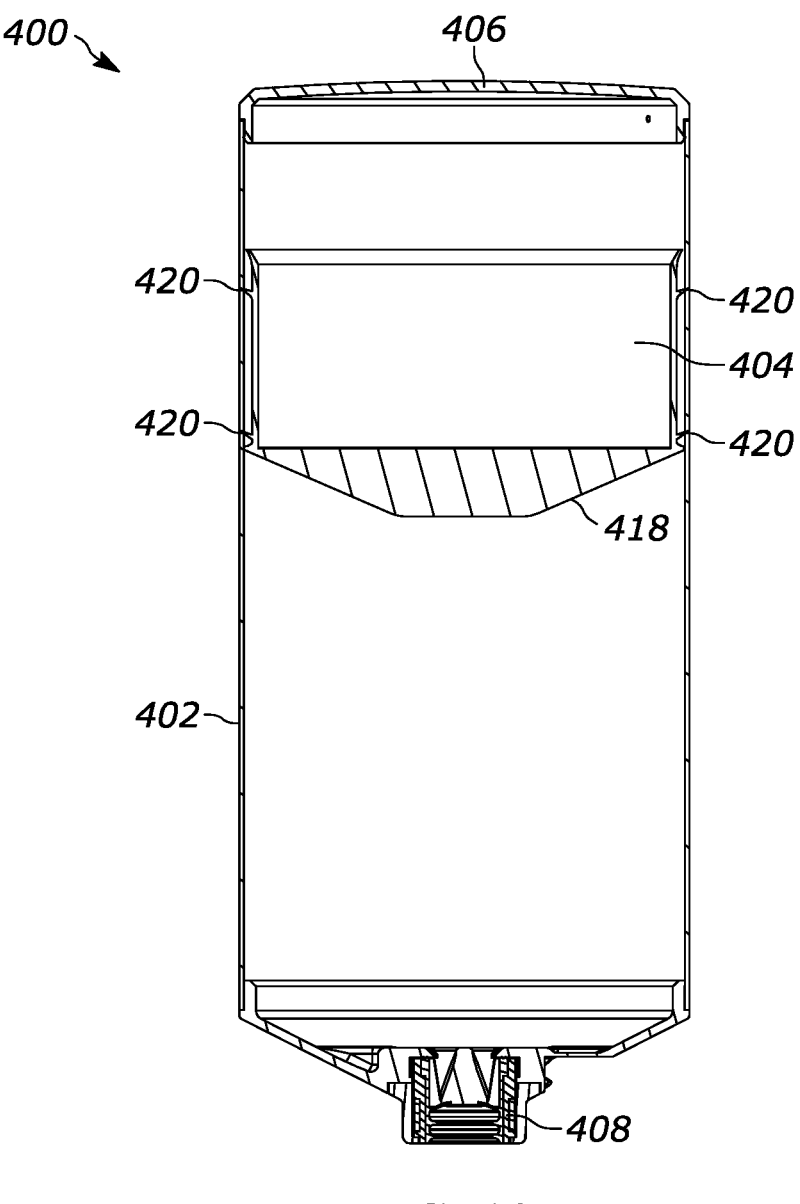
FIG. 13D is a cross-sectional view of the cartridge of FIG. 13A.

With respect to FIG. 13D, the plunger 404 is within the cartridge body 402 and configured to slide along the length of the cartridge body 402 to aid in driving the fluid toward the valve 408 similar to the plunger of a syringe. When a new, full cartridge 400 is inserted into the cartridge receiver 102, the plunger 404 rests on the top of the fluid within the cartridge 400. The plunger 404 has a cylindrical body 416 with a conical nose 418 having a shape corresponding substantially to the conical shape of the bottom face 410 of the cartridge body 402. The plunger 404 includes at least two seals 420 extending radially outward form the plunger body 416 to form a fluid tight seal between the plunger body 416 and the internal wall of the cartridge body 402 of the cartridge 400. The seals 420 may be a flexible flap extending from the plunger body 416 about the circumference of the plunger body 416. In other embodiments, a gasket or O-ring may be positioned to extend about the circumference of the plunger body 416 to form a fluid tight seal between the plunger body 416 and the cartridge body 402. As the pump tray 106 draws fluid form the cartridge 400, the plunger 404 remains resting on the top of the fluid to maintain a pressure on the fluid to force it out of the cartridge. The plunger 404 may be weighted such that it applies a force to the fluid and is not able to remain spaced from the fluid as the level of the fluid within the cartridge 400 lowers. The seals 420 drag along the interior surface of the cartridge body 402, to push the fluid adhered to the wall of the cartridge body 402 off the wall and toward the opening in the bottom face 410 of the cartridge body 402. The seals 420 thus aid in fully emptying the cartridge 400 as the seals 420 aid to scrape the condiment off of the inner wall of the cartridge body 402 and force it toward the opening. The seals 420 further seal the condiment from the outside air, thereby maintaining the freshness of the condiment and preventing the condiment from spoiling.

The plunger body 416 may have a length that extends along a longitudinal length of the cartridge body 402 to prevent the plunger 404 from tipping or twisting as the plunger 404 travels along the cartridge body 402. In other words, the seals 420 of the plunger 404 may be spaced apart from one another in the direction of travel of the plunger 404 to aid in keeping the plunger 404 oriented properly within the cartridge body 402. The plunger 404 may be formed of a plastic and/or rubber material. In one form, the plunger body 416 is formed of a plastic material and the seals 420 are formed of a rubber and affixed to the plunger body 416.

The lid 406 is mounted at the end of the cartridge body 402 opposite the bottom face 410. The lid 406 may be secured to the cartridge body 402 such that it is not able to be removed without the use of tools. In some forms, the lid 406 is affixed to the cartridge body 402 with an adhesive. The lid 406 may permit air to enter the cartridge body 402 above the plunger 404 to prevent a vacuum from forming within the cartridge body 402 as the plunger 404 travels along the cartridge body 402. The fluid within the cartridge 400 remains sealed from the air and is prevented from leaking out the lid 406 (e.g., if stored while resting on the lid 406) by the plunger 404 forming a seal with the interior surface of the cartridge body 402. The lid 406 may be formed of a plastic or rubber material as examples.

Figure 13E:
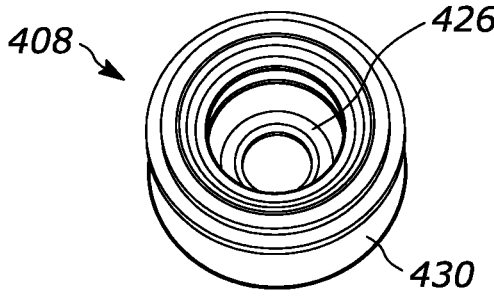
FIG. 13E is a top perspective view of the valve of the cartridge of FIG. 13A.
Figure 13F:
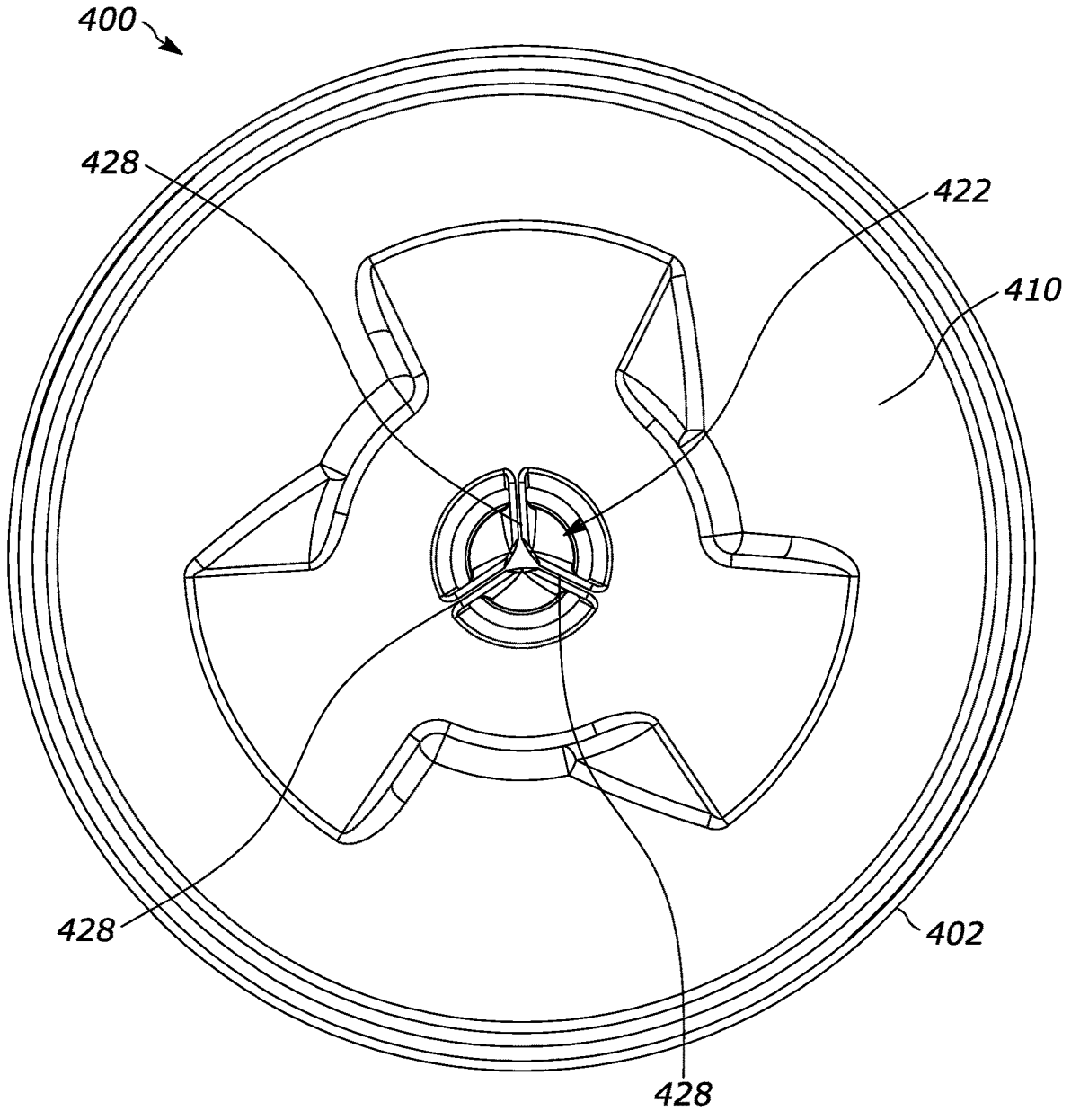
FIG. 13F is a cross-sectional view of the cartridge of FIG. 13A taken along lines 13F-13F of FIG. 13A.

With respect to FIG. 13C,13F, the bottom face 410 of the cartridge body 402 includes an opening 422 through which fluid may exit the cartridge 400. The bottom face 410 includes a sealing post 424 that interacts with the sealing flap 426 of the valve 408 similar to the sealing post 312 and sealing flap 314 of the dispenser-pouch adapter 130 of the cartridge 104 described above. As shown, the sealing post 424 is positioned within the opening 422 and held in place by support arms 428. The sealing post 424 is shaped to direct the fluid radially outward to flow around the radially outer edge of the sealing post 424. Similar to the cartridge 104 described above, the sealing flap 426 is normally in contact with the sealing post 424 to seal the contents of the cartridge 400. When attached to the inlet port 188, the pump tray 106 may create a negative pressure at the valve causing the sealing flap 426 to move off of the sealing post 424, permitting fluid to exit the cartridge 400 and travel into the inlet port 188. The sealing flaps 426 may be biased to return into sealing engagement with the sealing post 424 once the pressure equalizes. This biasing prevents fluid from leaking from the cartridge 400 or dripping out of the cartridge 400 when the cartridge 400 is removed from the condiment dispenser 100 (e.g., during insertion or removal from the cartridge receiver). The valve 408 may thus serve as an anti-drip valve. When the pump tray 106 creates a positive pressure to pump the fluid in the pump tray 106 out the outlet port 190, the fluid is forced against the sealing flap 426 which forms a seal with the sealing post 424, thereby preventing fluid from reentering the cartridge 400.

With respect to FIG. 13E, the valve 408 may have a cylindrical body 430 that is configured to be inserted into the tip portion 414 of the cartridge 400. The sealing flap 426 extend radially inward from the cylindrical body 430 and upward to engage the sealing post 424 of the cartridge body 402. The valve 408 may be formed of a plastic and/or a rubber material. As shown in FIGS. 13C-D, the lower portion of the valve 408 may include additional seal members 432 extending radially inward from the cylindrical body 430 of the valve 408 that are configured to engage the inlet port 188 to form a sealed connection between the cartridge 400 and the inlet port 188 when the cartridge 400 is attached to the inlet port 188.

In other embodiments, the bottom face 410 of the cartridge 400 (and cartridge 104) may be smooth such that the interior of the cartridge 400 is able to be quickly and easily cleaned, for example, by a dishwasher. The interior surface of the cartridge body 402 may have not crevices or ridges along which condiment could collect and be difficult to reach during cleaning. Moreover, providing a smooth surface on the interior of cartridge 400 further aids in fully emptying the cartridge 400 of condiment as the plunger forces the condiment to the opening in the valve 408 so that there are no folds or crevices forming the locking slots 412. In some embodiments, the locking slots 362, 412 of the cartridge embodiments may be formed by ridges extending from the external surface of the cartridge body such that the interior surface of the cartridge is smooth.

Figure 4B:
FIG. 4B is a rear perspective view of the condiment dispenser of FIG. 1A shown with a removable tray.
Figure 4B:
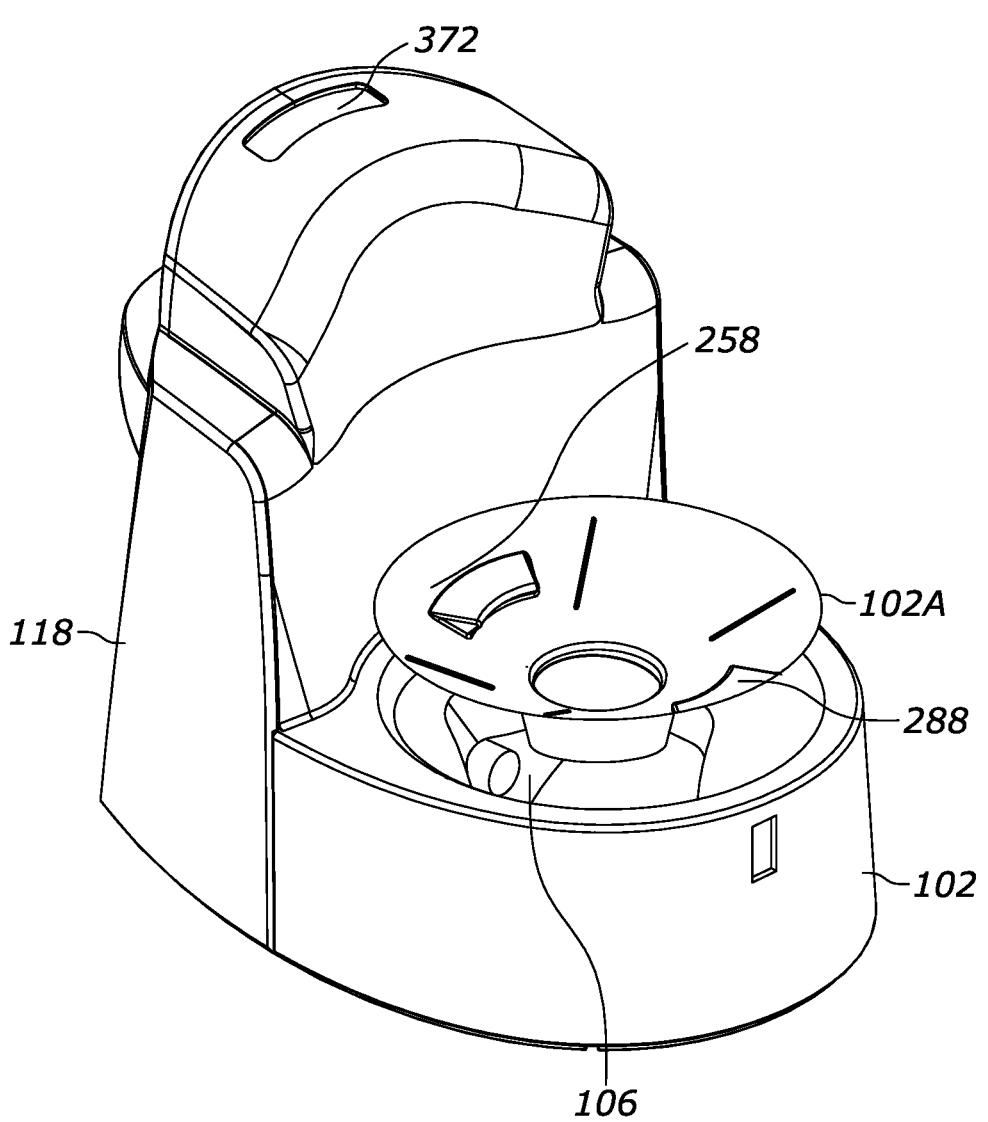

In other embodiments, the cartridge 104, 400 may include other numbers of locking slots 362, 412, such as two (similar to FIG. 11E) or four locking slots. The cartridge receiver 102 of the condiment dispenser 100 may have a corresponding number of locking protrusions 258 for insertion along the locking slots 362, 412 to affix the cartridge 104,400 to the cartridge receiver 102. For example, as shown in FIG. 4B, the tray 102A includes two locking protrusions 258 for locking to a cartridge 104, 400 having at least two locking slots 362, 414 positioned opposite one another on the cartridge bottom face.

With respect to FIGS. 14A-16C, a condiment dispenser 500 is shown according to a second embodiment. The condiment dispenser 500 is similar in many respects to the condiment dispenser 100 described above, with the differences being highlighted in the following discussion. For conciseness and clarity, reference numerals used for components and features described above with regard to condiment dispenser 100 will used for similar components and features with regard to the condiment dispenser 500. A central difference between the condiment dispenser 500 of the second embodiment and the condiment dispenser 100 described above is that the condiment dispenser 500 is a manual dispenser rather than an automated dispenser. The condiment dispenser 500 includes a pumping handle 502 that when pressed or pumped by a user causes fluid to be dispensed rather than using a sensor, a controller, a motor.

Figure 14:
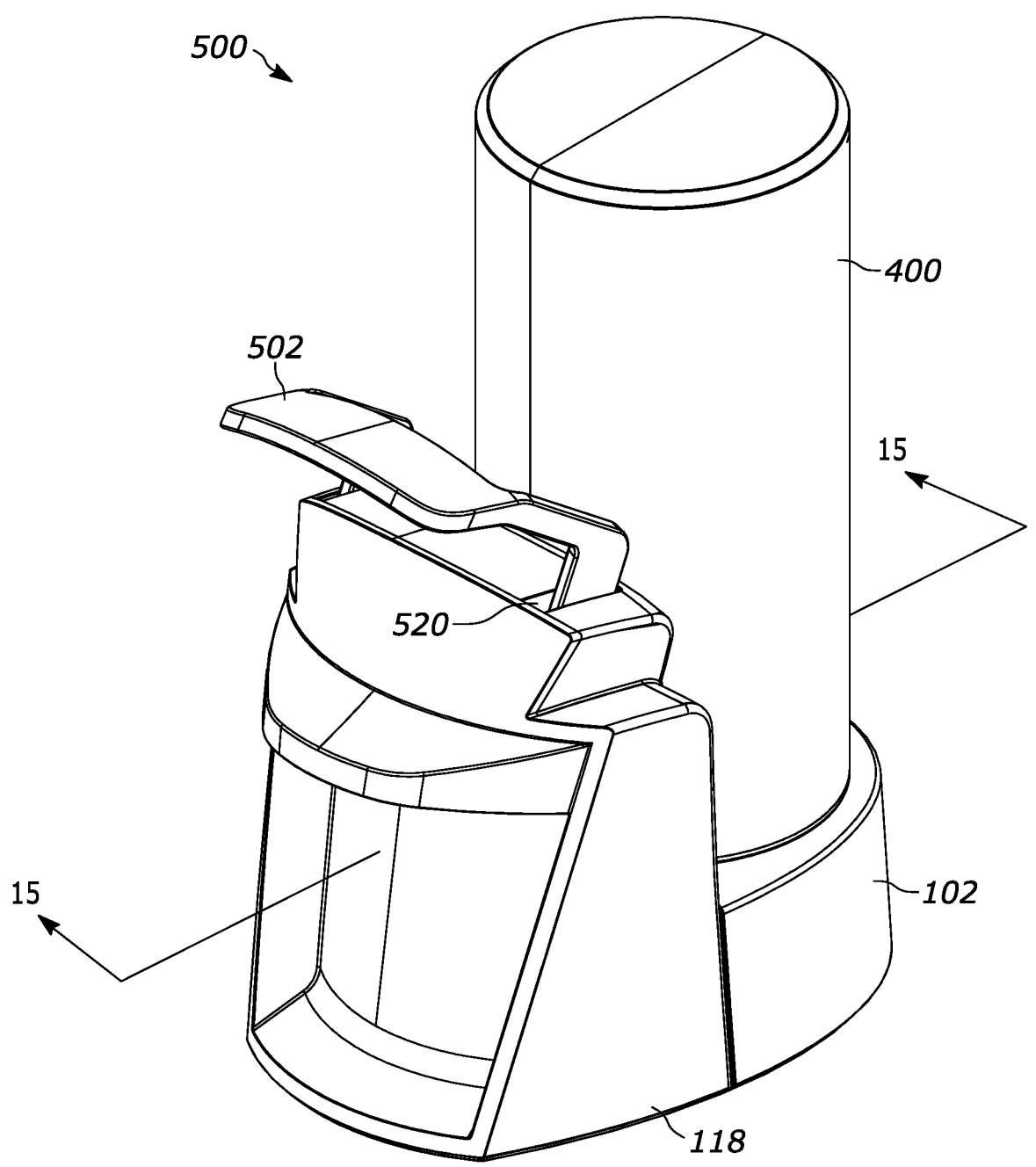
FIG. 14 is a top perspective view of a condiment dispenser according to a second embodiment with the cartridge of FIG. 12A inserted therein.
Figure 15:
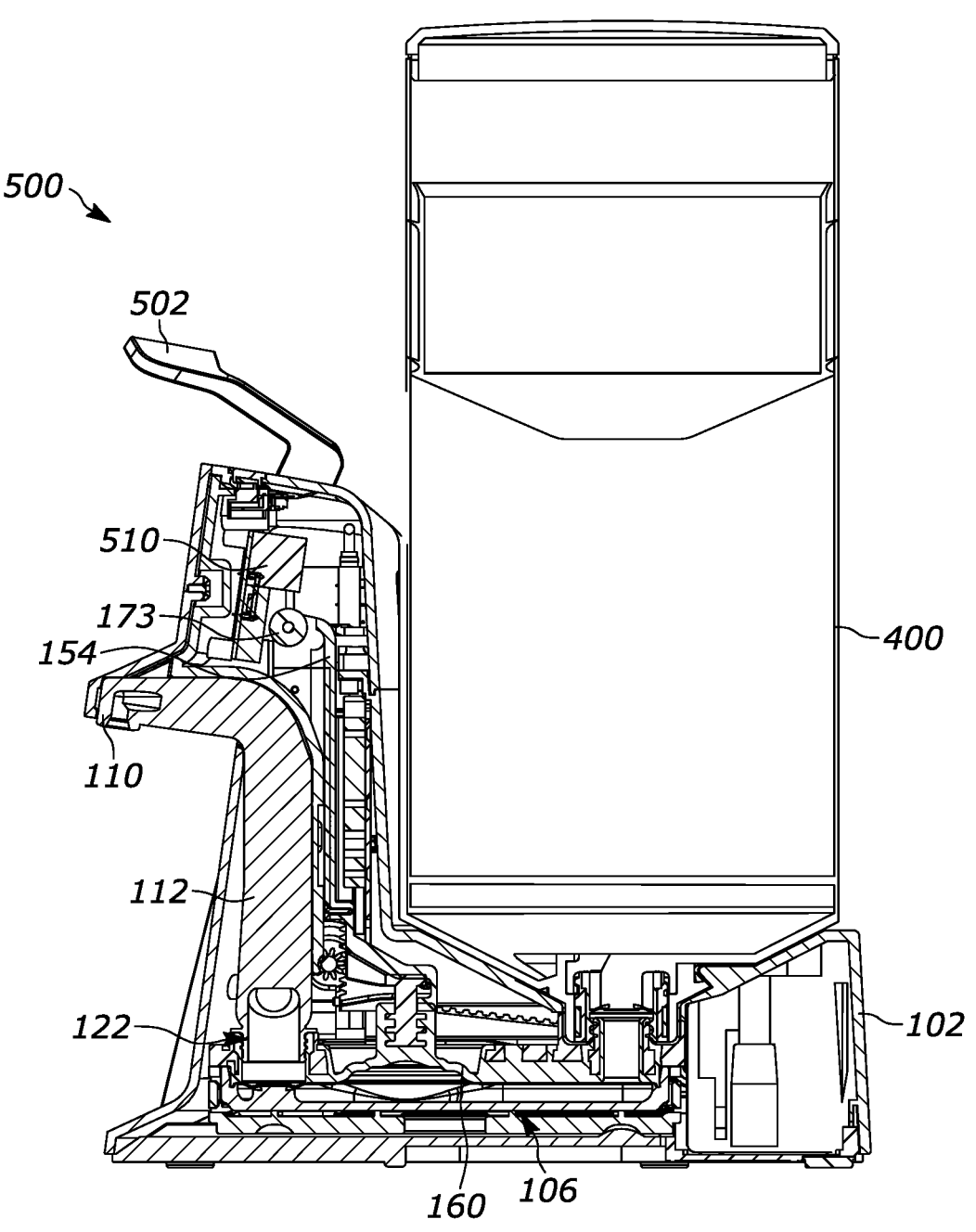
FIG. 15 is a cross-section view of the condiment dispenser of FIG. 14 taken along lines 15-15 of FIG. 14.

With reference to FIG. 14, the condiment dispenser 500 includes a cartridge receiver 102 into which a cartridge, such as cartridge 400 as shown, may be inserted as discussed in regard to the condiment dispenser 100. The condiment dispenser 500 includes the fluid transfer system 122 described with regard to the condiment dispenser 100 above. The cartridge 400 is inserted into the cartridge receiver 102 such that the valve 408 of the cartridge 400 is connected to the inlet port 188 of the pump tray 106 of the fluid transfer system 122. With reference to FIG. 15, the fluid transfer system 122 (pump tray 106 and spout 112) operates as described above with regard to the condiment dispenser 100, with the diaphragm 160 of the pump tray 106 being moved upward and downward to draw fluid from the cartridge 400, and pump the fluid up the spout 112 to the outlet 110 to dispense the fluid.

In condiment dispenser 500 of this second embodiment, fluid is pumped manually from the cartridge 400 to the outlet 110 of the spout 112. The diaphragm 160 of the pump tray 106 of the fluid transfer system 122 is forced downward by a user pressing on the handle 502 to force fluid toward the outlet 110. As discussed in further detail below, the handle 502 is biased to return to its original position by a biasing member, resulting in the diaphragm 160 being pulled upward to draw fluid into the pump tray 106 from the cartridge 400. The handle 502 may be pressed again to pump fluid toward the fluid outlet 110 of the condiment dispenser 500. The condiment dispenser 500 may include stops along the path of the piston 154 and/or handle 502 to limit the length of the stroke of the piston 154 to set the range of motion of the piston 154. This may be done to set the range the piston 154 moves the diaphragm 160 to set the amount of fluid to be dispensed from the outlet 110 in a single stroke. The range of motion of the piston 154 may be adjusted based on the type of condiment (e.g., viscosity, inclusion of particulates, etc.).

Figure 16A:
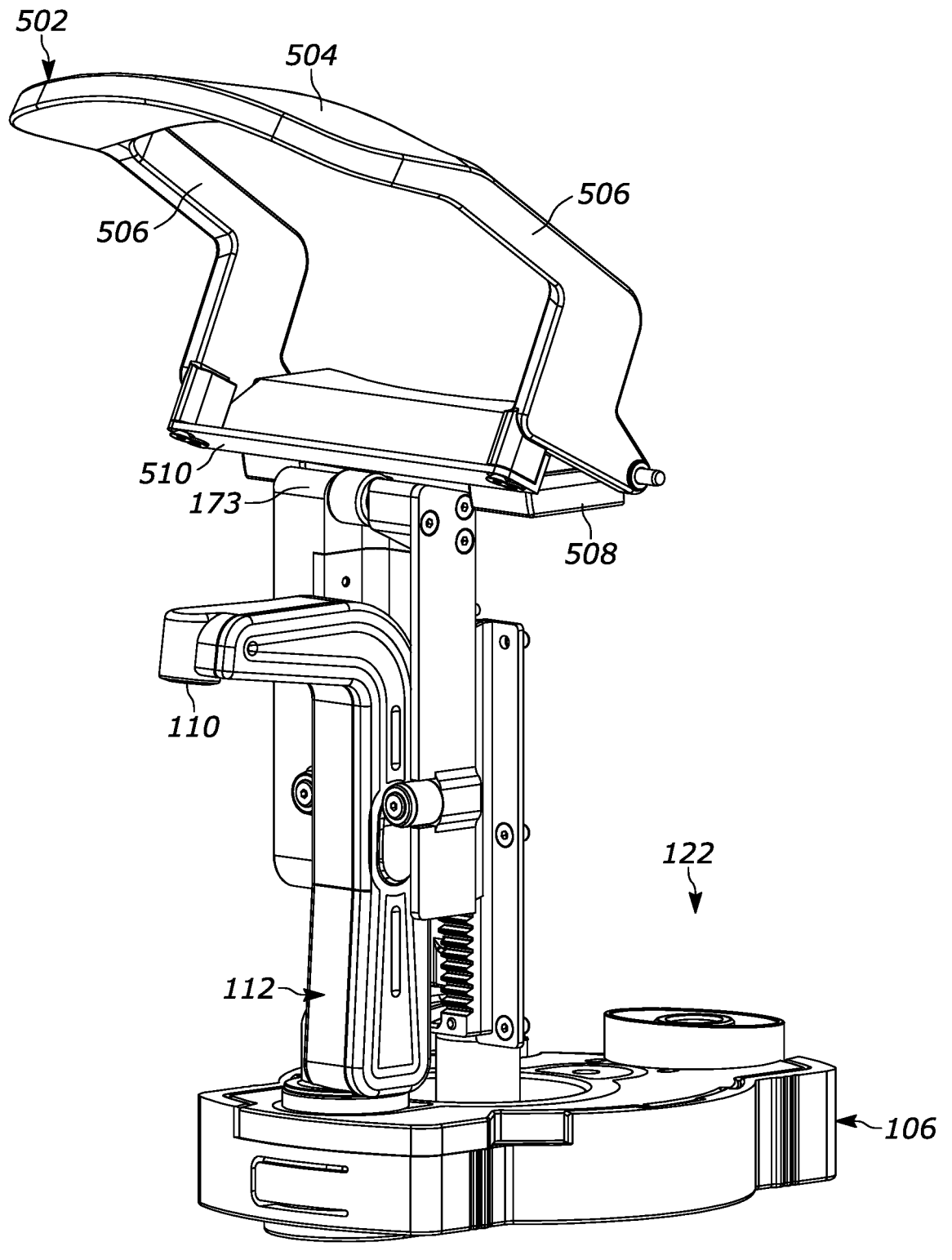
FIGS. 16A-B are perspective and side elevation views, respectively, of the fluid transfer mechanism, piston, and pump handle of the condiment dispenser of FIG. 14.
Figure 16B:
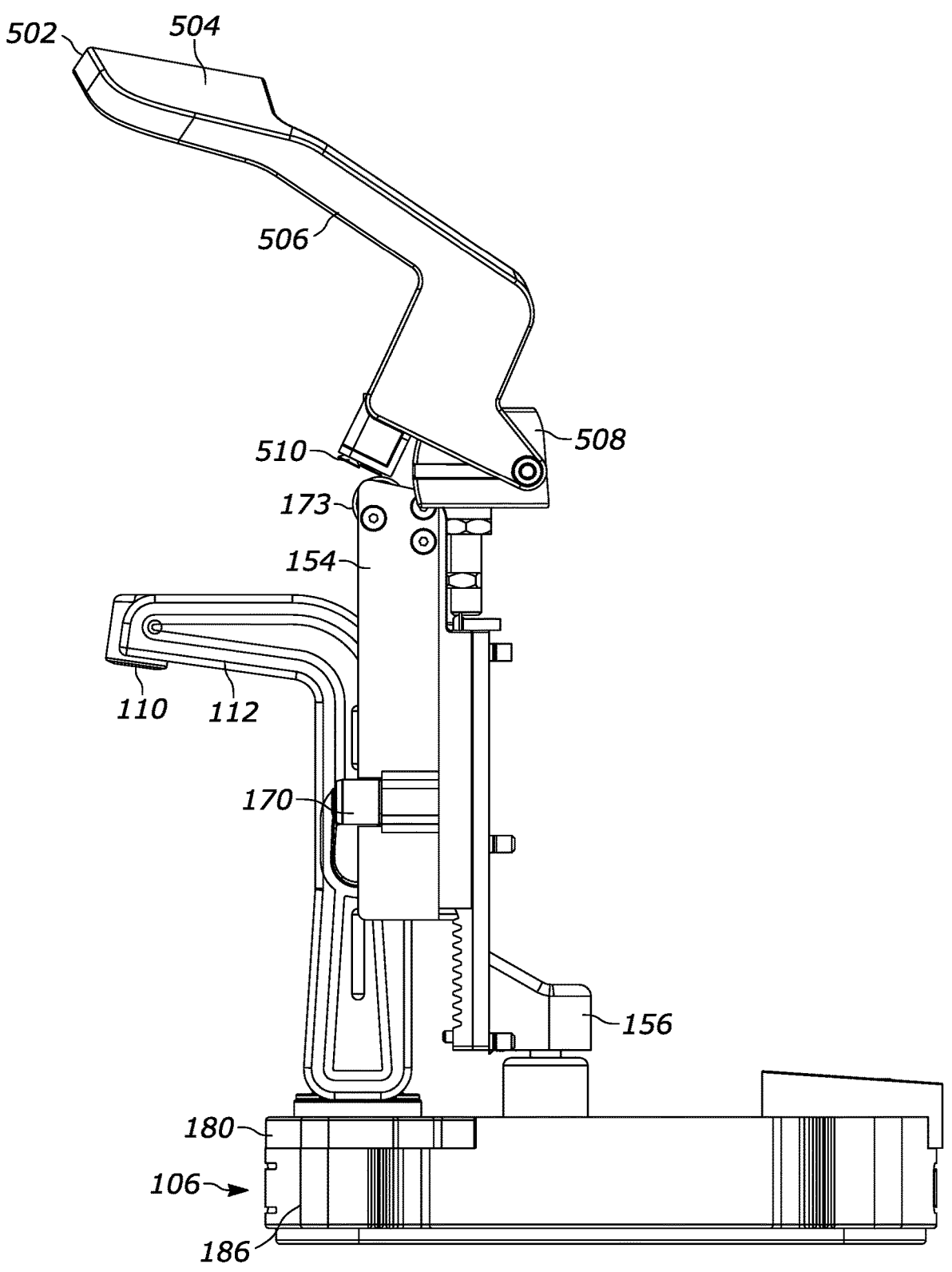
Figure 16C:
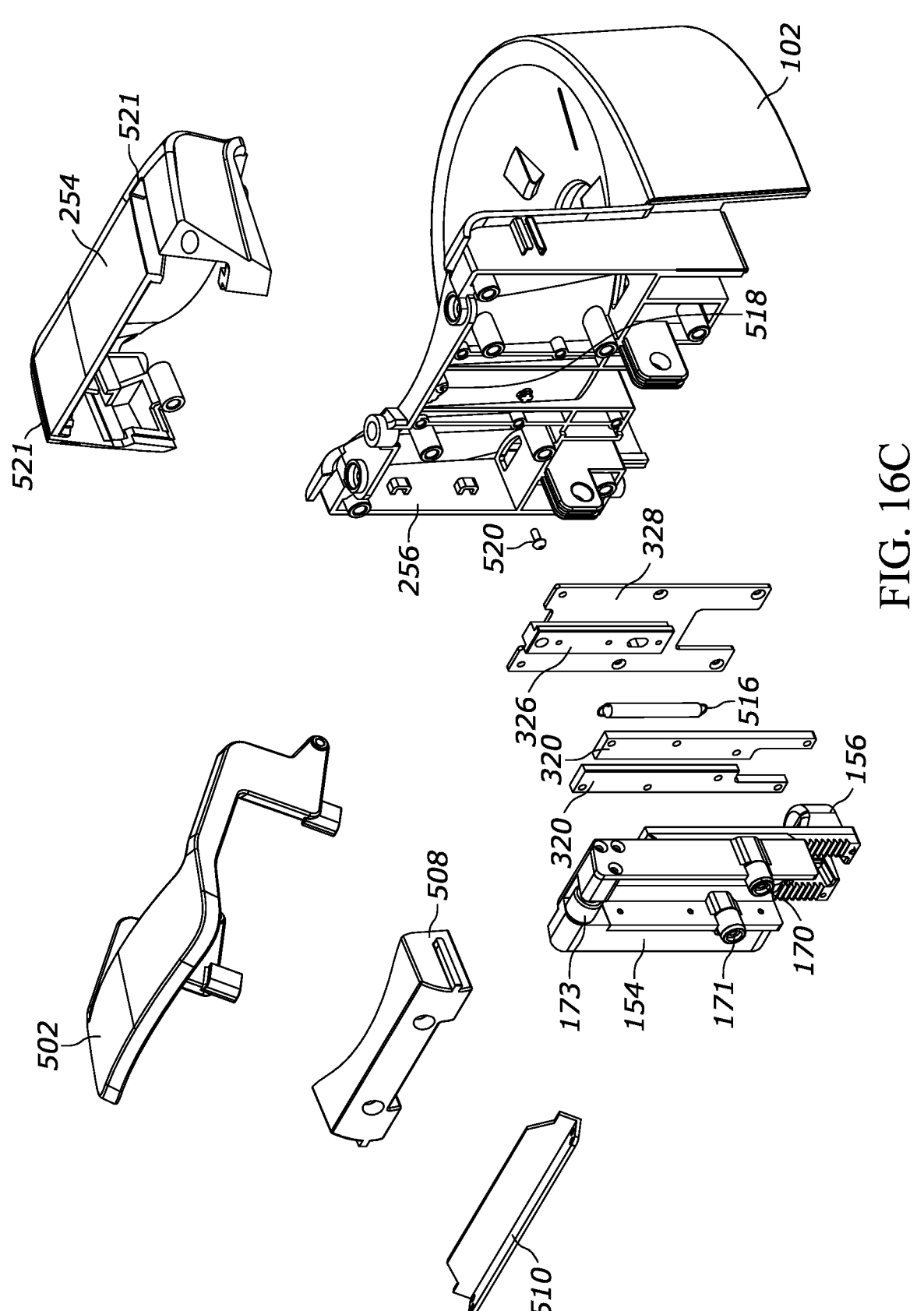
FIG. 16C is an exploded view of the pumping mechanism of the condiment dispenser of FIG. 14.

With reference to FIGS. 16A-C, the handle 502 includes an engagement portion 504 and arms 506 extending from the engagement portion 504. The arms 506 are hingedly attached to an attachment member 508 that is attached to the top cover 254 of the condiment dispenser 500. The top cover 254 may have slots or openings 521 therein through which the arms 506 of the handle 502 extend. The engagement portion 504 of the handle 502 may be rotated or pivoted about the hinged connection to the attachment member 508. The handle 502 further includes a crossbar 510 extending between the arms 506 that engages the piston 154. The crossbar 510 may be rigidly secured to the arms 506 by fasteners extending through the crossbar 510 and into the arms 506. The crossbar 510 may have an angle (e.g., approximately a right angle), as shown, for increased strength and to engage a greater portion of the handle 502 to prevent the crossbar 510 from twisting or otherwise moving substantially relative to the handle 502. The crossbar 510 may be formed of a plastic or a metal, as examples.

As the handle 502 is pressed downward, e.g., by a user applying a downward force to the handle 502, the crossbar 510 engages the piston 154 and forces the reciprocating member 514 downward. In the embodiment shown, the crossbar 510 engages the top roller 173 of the piston 154 which rotates as the crossbar 510 rotates about the arms 506 and the piston 154 is moved downward. Use of the roller 173 reduces the frictional resistance between the crossbar 510 and the piston 154 as the crossbar 510 slides along the piston 154 as the crossbar 510 is rotated to move the piston 154. Use of the roller 173 further increases the longevity of the condiment dispenser 500 as the wear on the crossbar 510 and the piston 154 is reduced. As described above with regard to the condiment dispenser 100, the piston 154 is coupled to the head 159 of the diaphragm 160 of the pump tray 106. As the piston 154 is forced downward from the force applied by a user, the piston 154 forces the diaphragm 160 downward. As the diaphragm 160 is moved downward, the volume within the pump chamber of the pump tray 106 is decreased, forcing fluid out the outlet port 190 and up the spout 112.

The handle 502 may return to its original upward position by way of a biasing member that forces the handle 502 toward the upward position when the downward force on the handle 502 is removed. As shown in FIG. 16C, condiment dispenser 500 includes a spring 516 that serves as the biasing member. In other forms, the biasing member may be, for example, a rubber or elastic band. The spring 516 is coupled to and extends between the back plate 256 of the cartridge receiver 102 and the piston 154. The back plate 256 of the cartridge receiver 102 of the condiment dispenser 500 includes a fastener receiver 518 for receiving a fastener 520. An end of the spring 516 is affixed to back plate 256 by the fastener 520. As the piston 154 is forced downward due the downward force applied to the handle 502, the spring 516 is stretched as the piston 154 moves downward relative to the fastener 520 or the point at which the spring 516 is coupled to the back plate 256. Due to the spring 516 being stretched, the spring 516 applies a biasing force to the piston 154 to draw the piston 154 upward to its original, normally upward position. When the biasing force of the spring 516 overcomes the downward force applied to the piston 154 (e.g., when a user releases the handle 502), the spring 516 pulls the piston 154 upward. This causes the piston 154 to apply an upward force on the crossbar 510 resulting in the handle 502 pivoting about the arms 506 to its original, upward position. Thus, to dispense condiment from the outlet 110, a user may press downward on the handle 502, release the handle 502 to allow the handle 502 to return to its upward position by the biasing force of the spring 516, and then press on the handle 502 again. The user may repeatedly press and release the handle 502 to pump the fluid from the cartridge 400 and up the spout 112 via the pump tray 106.

Figure 17A:
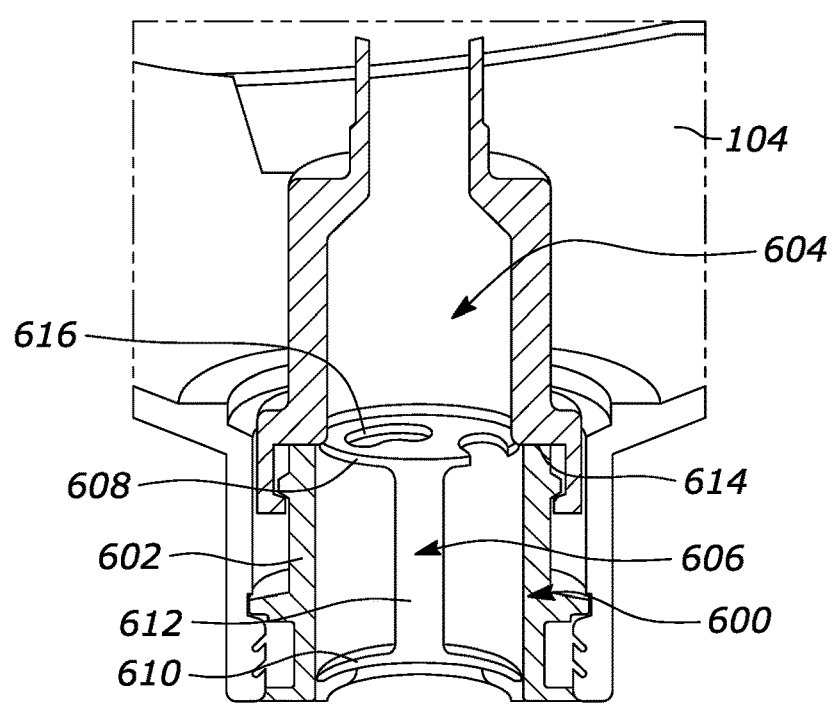
FIG. 17A illustrates an alternative valve for use with the cartridges of FIG. 11A and FIG. 13A in a closed configuration.
Figure 17B:
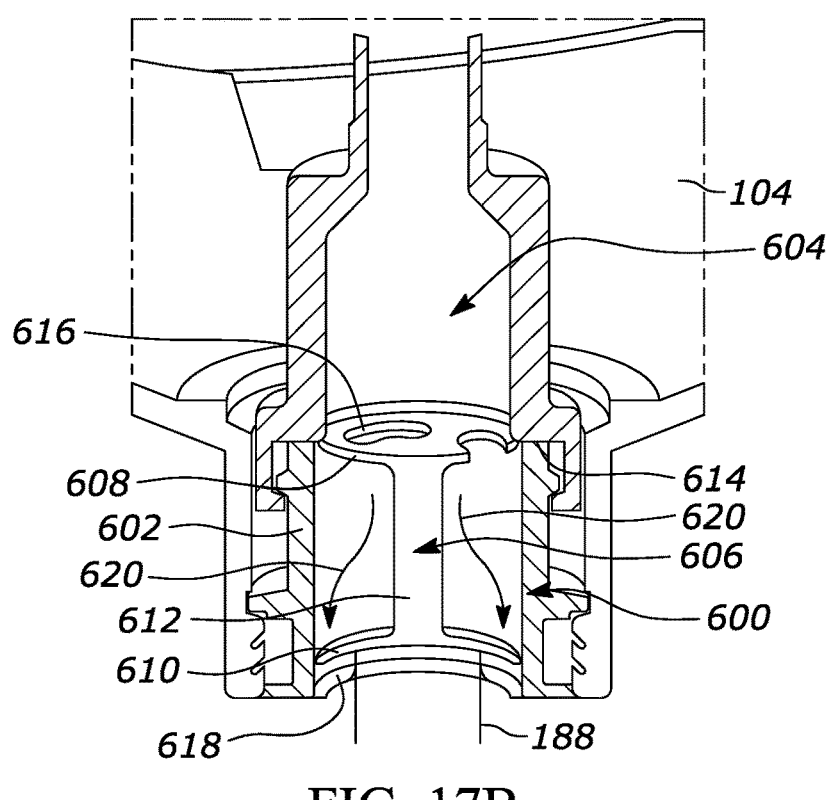
FIG. 17B illustrates the valve of FIG. 17A in an open configuration.

With reference to FIGS. 17A-B, a valve 600 is shown according to another embodiment. The valve 600 may be used as an alternative to the valves 307, 408 of the cartridges 104, 400, but will be described below with regard to cartridge 104. Valve 600 is configured to be biased toward a closed configuration when the cartridge 104 is not inserted into the cartridge receiver 102 of a condiment dispenser 100, 500. In the closed configuration, the valve 600 forms a fluid tight connection inhibiting fluid from entering or exiting the cartridge 104, 400. The valve 600 thus aids in preventing fluid from leaking out of the cartridge 104 when the cartridge 104 is withdrawn from the condiment dispenser. The valve 600 thus serves as an anti-drip valve, preventing fluid from exiting the cartridge when the cartridge 104 is being inserted or withdrawn from the condiment dispenser 100. This prevents condiment from dripping on the condiment dispenser (e.g., the cartridge receiver 102) during removal and insertion, reducing the need to clean and wipe down surfaces due to inadvertent dripping of condiment.

The valve 600 is positioned within the tip portion 240 of the cartridge 104. The valve 600 may include a cylindrical body 602 with an opening therethrough forming a portion of a channel 604 exiting the cartridge 104. An elastic valve sealing member 606 is disposed within the channel 604. The sealing member 606 may include a base portion 608 and a sealing portion 610 connected by an elongate connector arm 612. The valve sealing member 606 may be formed of a flexible material that is configured to be compressed when a force is applied and elastically return to its original position. The base portion 608 may be positioned to engage a narrow portion or step 614 of the channel 604 and prevent the sealing member 606 from sliding out of the valve 600 along the channel 604 beyond the step 614 of the channel 604. The base portion 608 may be forced against the step 614 when the sealing member 606 is compressed upon insertion into the condiment dispenser 100. The base portion 608 may include a plurality of holes 616 permitting fluid to pass through the base portion 608 along the channel 604.

The sealing member 606 is positioned at the opposite end of the valve 600 within the channel 604. The sealing member 606 may be a substantially dome-shaped or concave flap that is biased into engagement with a lip 618 of the valve 600 positioned at the end of the channel 604 as shown in FIG. 17A. Upon insertion into the condiment dispenser 100, and with respect to FIG. 17B, the inlet port 188 engages the sealing portion 610 and forces the sealing portion 610 off of the lip 618 of the valve, compressing the elongate connector arm 612. Fluid may then flow along flow paths 620 around the periphery of the sealing portion 610, deflecting the edges of the sealing portion 610 toward the lip 618 slightly and away from the interior wall of the valve 600 forming the channel 604. The inlet port 188 may include notches or recesses in the end surface of the inlet port 188 that engages the sealing portion 610 to permit fluid to flow into the inlet port 188. The end surface of the inlet port 188 may be undulating or wavy permitting fluid to enter the inlet port 188 in the spaces or gaps between the sealing portion 610 and the end surface of the inlet port 188. When the cartridge 104 is removed from the cartridge receiver 102 and the inlet port 188 is no longer engaging the sealing portion 610, the sealing portion 610 elastically returns to its original position in sealing engagement with the lip 618. The elongate connector arm 612 may act as a spring biasing the sealing portion 610 into engagement with the lip 618 when overcoming forces applied to the sealing portion 610 (e.g., from the inlet port 188). Thus, fluid is inhibited from entering or exiting the cartridge 104 when the cartridge 104 is not inserted into the cartridge receiver 102.

Figure 18A:
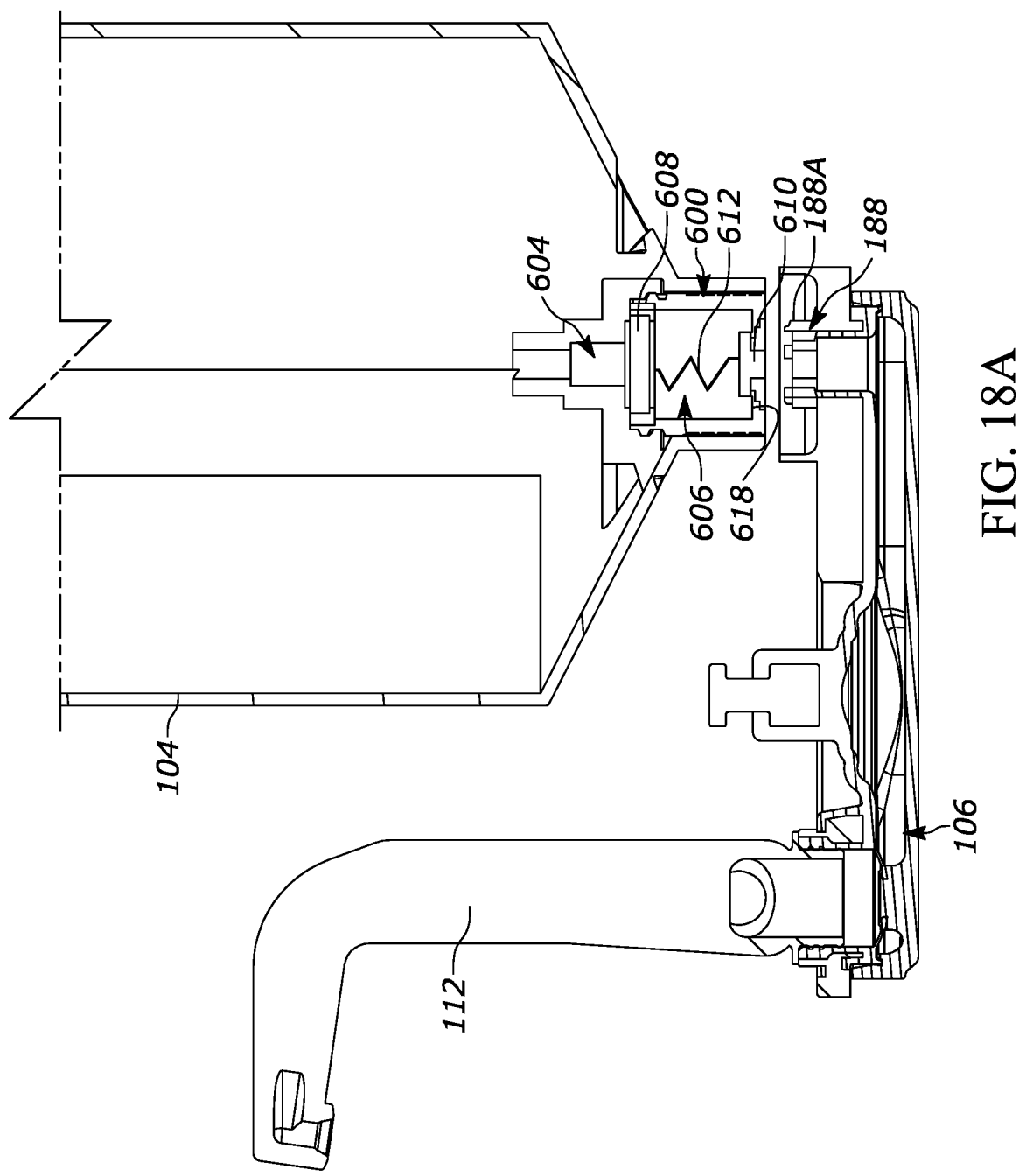
FIG. 18A illustrates another alternative valve for use with the cartridges of FIG. 11A and FIG. 13A in a closed configuration.
Figure 18B:
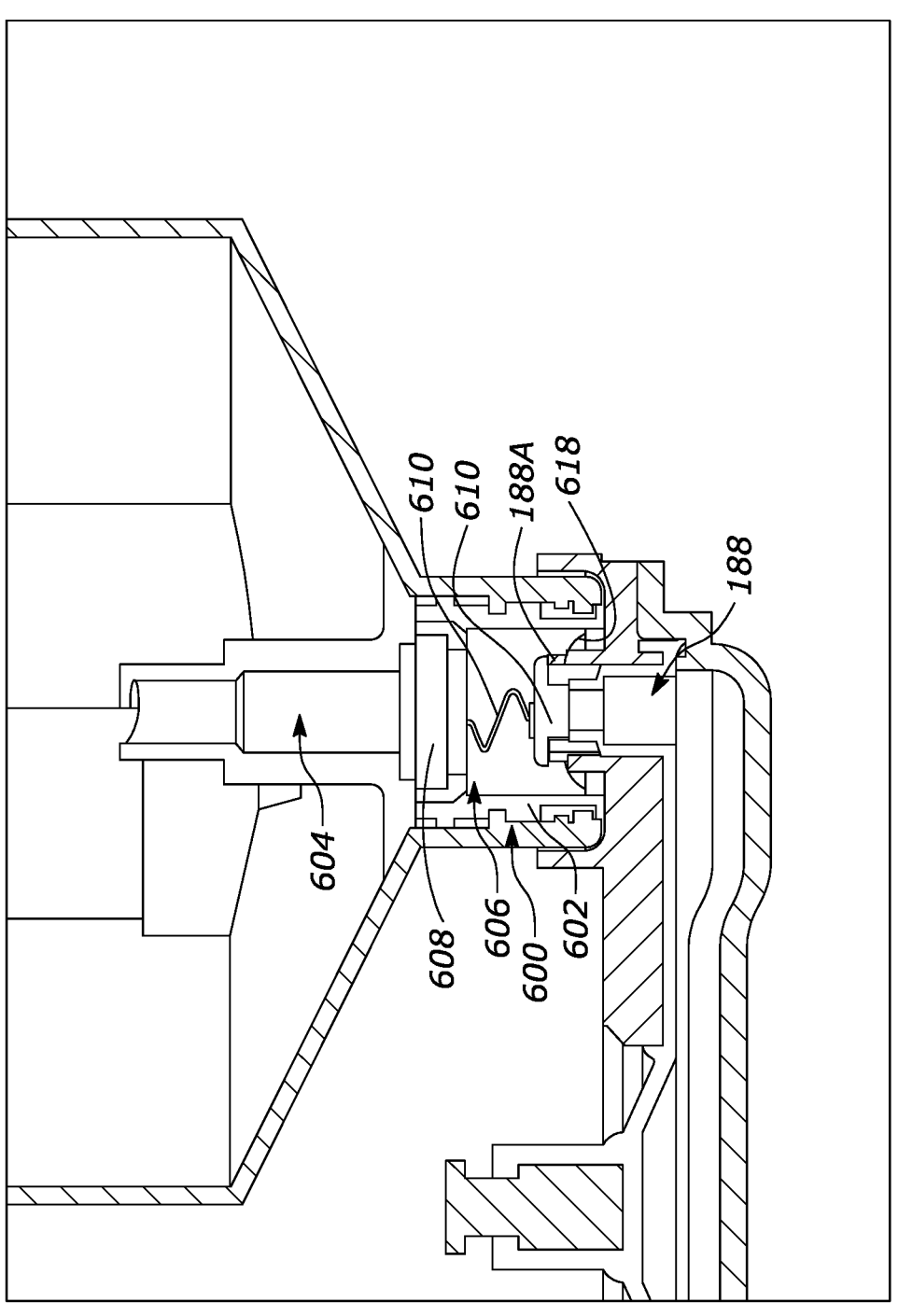
FIG. 18B illustrates the valve of FIG. 18A in an open configuration.

With reference to FIGS. 18A-B, a valve 600 is shown according to another embodiment. The valve 600 of FIGS. 18A-B is similar in many respects to the valve 600 of FIGS. 17A-B such that the same reference numerals will be used to describe similar features, with the differences being highlighted in the following discussion. With respect to FIG. 18A, the valve 600 is positioned within the tip portion 240 of the cartridge 104. The valve 600 includes an opening therethrough forming part of the channel 604 along which fluid from the cartridge 104 flows when exiting the cartridge 104.

The valve sealing member 606 is disposed within the channel 604 of the valve 600. The valve sealing member 606 includes a base portion 608 that is configured to be anchored at the upper end of the valve 600 so that the base portion 608 is not able to move substantially along the length of the channel 604. The elongate connector arm 612 extends from the base to the sealing portion 610 and biases the sealing portion 610 into engagement with the lip 618 of the valve 600. The sealing portion 610 may be formed of flexible material (e.g., rubber) and forms a fluid tight connection between the sealing portion 610 and the lip 618 when the sealing portion 610 is forced into engagement with the lip 618.

The valve 600 is positioned over the inlet port 188 of the condiment dispenser 100 to connect the cartridge 104 to the condiment dispenser 100. With reference to FIG. 18B, the inlet port 188 engages the sealing portion 610 when the cartridge 104 is inserted into the cartridge receiver 102 causing the sealing portion 610 to move away from or be lifted from the lip 618. This creates a gap between the sealing portion 610 and the lip 618 permitting fluid to exit the cartridge 104. As described with regard to FIGS. 17A-B, the end surface 188A of the inlet port 188 may be undulating or notched to permit fluid to flow between the end surface and the sealing portion 610 and into the inlet port 188. When the cartridge 104 is removed from the cartridge receiver 102 and the inlet port 188 is no longer engaging the sealing portion 610, the elongate connector arm 612 forces the sealing portion 610 to its original position and into sealing engagement with the lip 618. Thus, fluid is inhibited from entering or exiting the cartridge 104 when the cartridge 104 is not inserted into the cartridge receiver 102, preventing dripping or leakage from the cartridge.

The various embodiments of the condiment dispenser and the cartridges described above are interchangeable and are compatible with one another. For example, the condiment dispenser 100 of the first embodiment may be used with and is compatible with both cartridge 104 and the cartridge 400. Similarly, the condiment dispenser 500 of the second embodiment may be used with and is compatible with both cartridge 104 and the cartridge 400. Thus, a cartridge 104, 400 used with a condiment dispenser 100 may be removed, refilled and used with a condiment dispenser 500.

The condiment dispenser and cartridges described herein are configured to be cleanable. The condiment dispenser may be quickly and intuitively disassembled and washed to ensure that the condiment dispenser is properly and fully clean when washed. As described above, the components of the condiment dispenser may be disassembled such that there are no unreachable long channels or places along the fluid flow path that are difficult to reach. The components may be disassembled and placed in a dishwasher for a full cleaning without the need for the additional steps of using specialized tools (e.g., long brushes) for cleaning. Moreover, due to the quick and intuitive disassembly and cleanability of the condiment dispenser, cleaning the condiment dispenser is not as cumbersome which may result in the condiment dispenser being cleaned more regularly, unlike prior art dispensers where employees may put off cleaning due to the difficult nature of doing so.

Figure 19A:
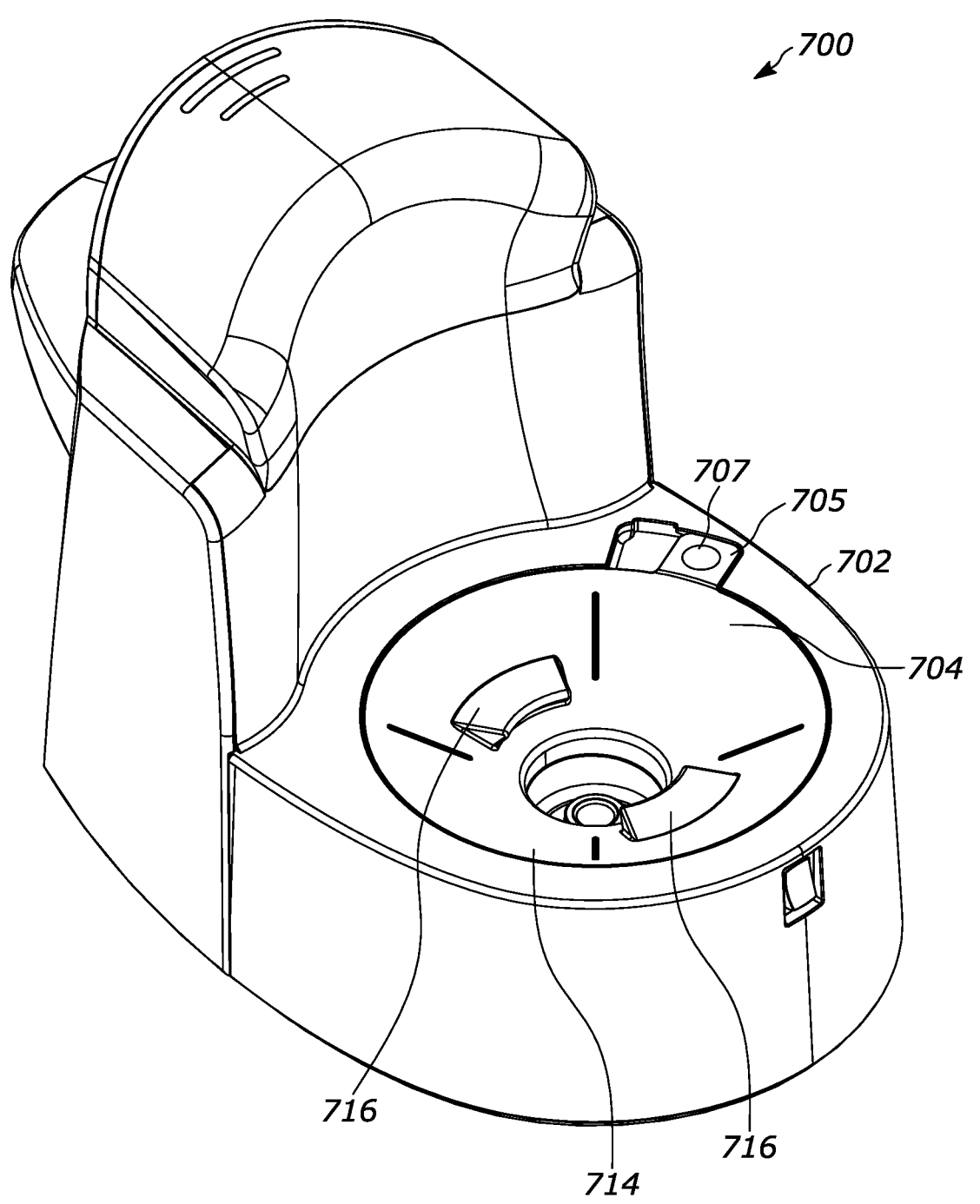
FIG. 19A is a top perspective view of a condiment dispenser according to another embodiment.
Figure 19B:
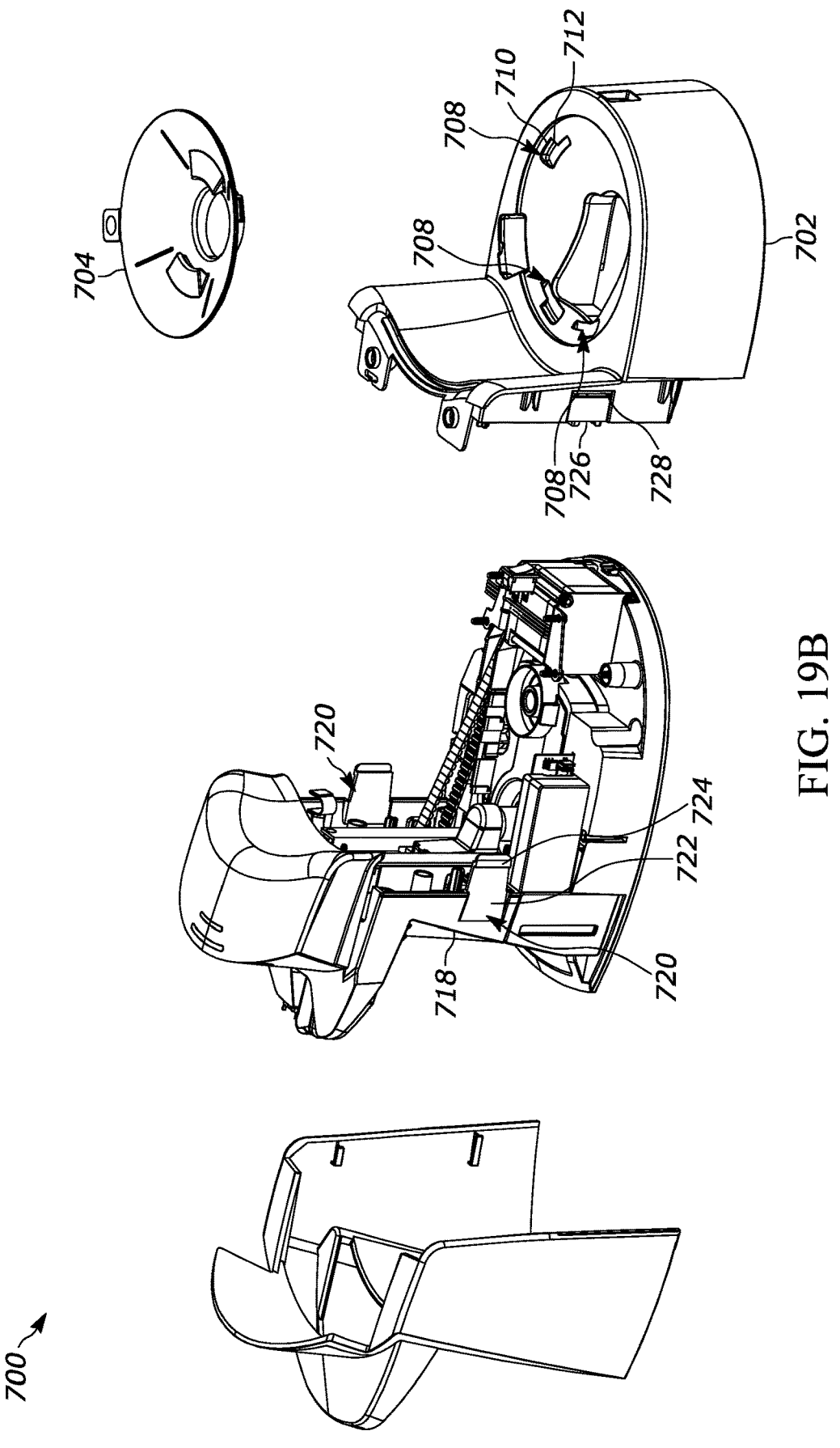
FIG. 19B shows the condiment dispenser of FIG. 19A in a separated configuration.
Figure 19C:
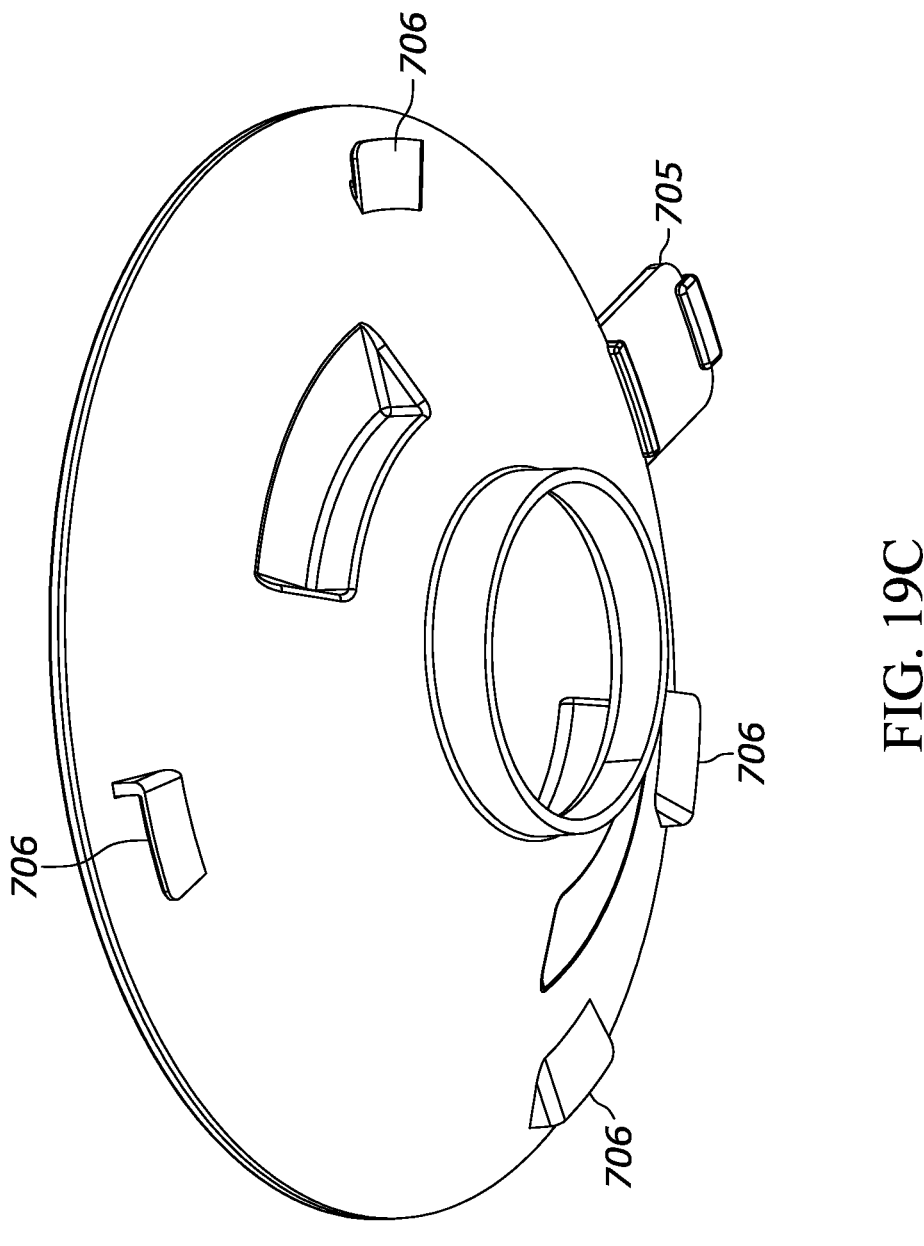
FIG. 19C is a bottom perspective view of a basin cover of the condiment dispenser of FIG. 19A.

With respect to FIGS. 19A-19C, a condiment dispenser 700 is shown according to yet another embodiment. The condiment dispenser 700 is similar in many respects to the embodiments of the condiment dispenser 100 discussed above such that the differences will be highlighted in the following discussion. The condiment dispenser 700 includes a cartridge receiver 702 for receiving a cartridge, such as cartridges 104, 400, 800 discussed herein.

The condiment dispenser 700 includes a basin tray 704 that may be attached to and removed from the cartridge receiver 702. The basin tray 704 may be connected to the cartridge receiver 702 by way of a bayonet connection. As shown in FIG. 19C, the basin tray 704 includes hooks 706 that may be inserted into corresponding locking slots 708 of the cartridge receiver 702 (see FIG. 19B). The locking slots 708 of the cartridge receiver include a receiving portion 710 and a locking portion 712. To attach the basin tray 704 to the cartridge receiver 702, the hooks 706 of the basin tray 704 may be aligned with and inserted into the receiving portions 710 of the locking slots 708. The basin tray 704 may then be rotated to slide the hooks 706 of the basin tray 704 under the locking portion 712 of the locking slots 702 to secure the basin tray 704 to the cartridge receiver 702 and inhibit the basin tray 704 from being removed from the cartridge receiver 702. The basin tray 704 may include a tab 705 that may be used to rotate the basin tray 704 to attach and/or detach the basin tray 704 from the cartridge receiver 702. The tab 705 may include a depression or divot 707 that may provide a sloped or curved surface for the user to engage to aid in rotating the basin tray 704. For example, the user may place their finger in the divot 707 to apply a force to the basin tray 704. The basin tray 704 may be removed for cleaning. For example, the basin tray 704 may be separated from the cartridge receiver 702 and may be placed in a dishwasher for cleaning. An upper face 714 of the basin tray 704 may include protrusions 716 for securing the cartridge to the basin tray similar to the embodiments discussed above.

The condiment dispenser 700 includes a front support 718 that includes deflectable hooks 720 for securing the cartridge receiver 702 to the front support 718. As shown in FIG. 19B, the deflectable hooks 720 have an arm 722 extending from a main body of the front support 718 to a protrusion 724. The cartridge receiver 702 include slots or channels 726 along which the deflectable hooks 720 of the front support 718 may slide to attach the front support 718 to the cartridge receiver 702. The deflectable hooks 720 may be elastically deflected from a resting position when slid along the channels 726 until the protrusions 724 are aligned with openings 728 of the channels 726 at which point the deflectable hooks 720 elastically return toward their resting position with the protrusions 724 extending into the openings 728. With the protrusions 724 of the front support 718 extending into the openings 728 of the cartridge receiver 702, the cartridge receiver 702 is attached to the front support 718. The cartridge receiver 702 may be detached from the front support 718 by deflecting the deflectable hooks 720 to withdraw the protrusions 724 from the openings 728 and sliding the deflectable hooks 720 along the channel 726 of the cartridge receiver 702.

Figure 20A:
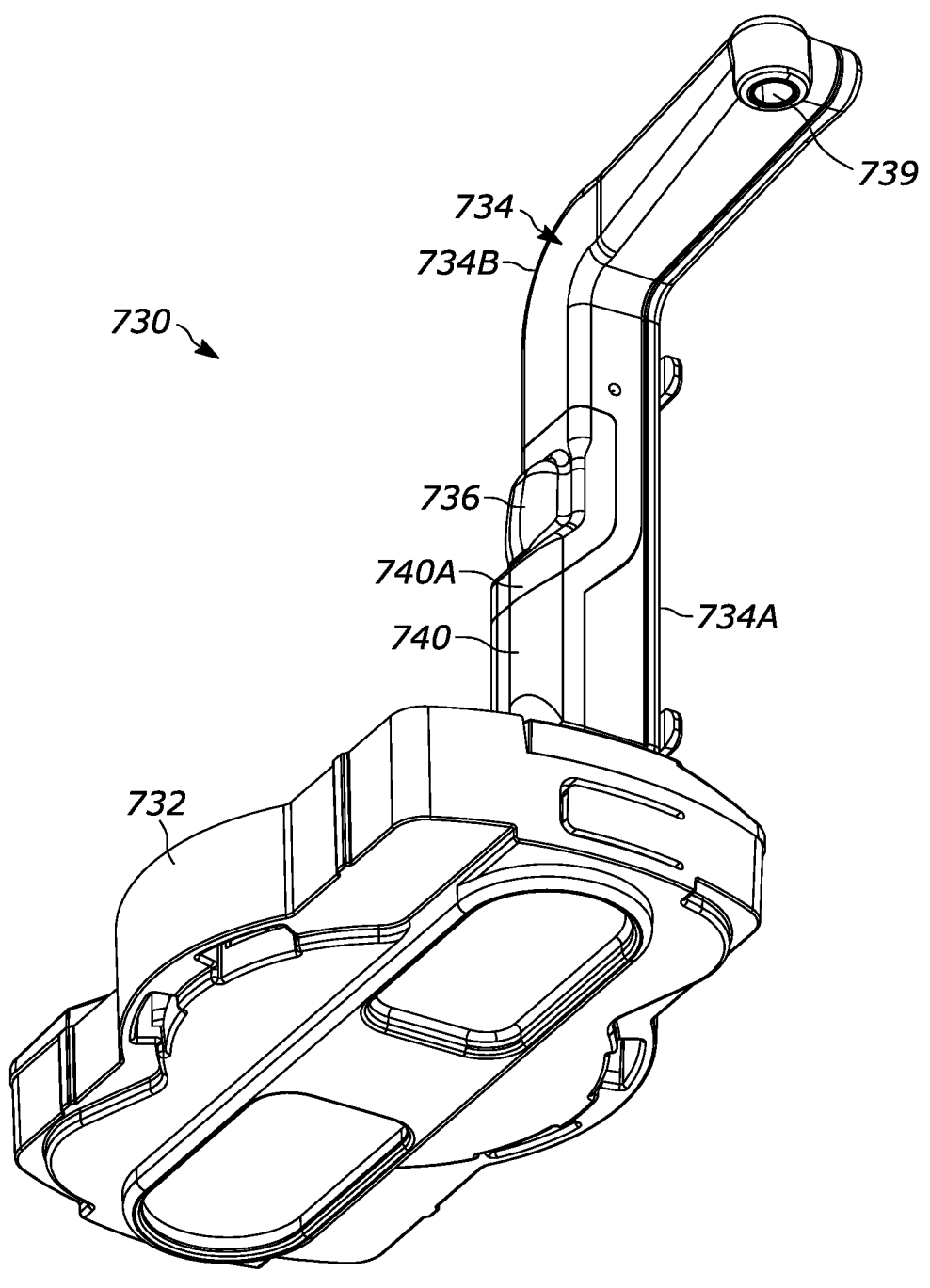
FIG. 20A is a bottom perspective view of a fluid transfer system of the condiment dispenser of FIG. 19A.
Figure 20B:
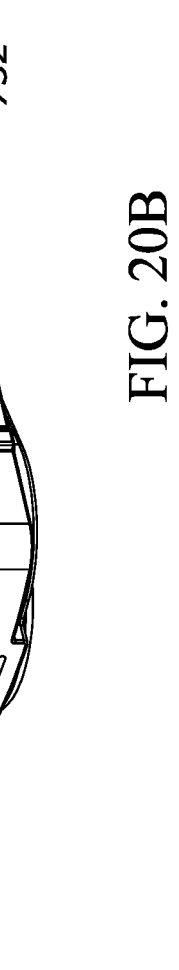
FIG. 20B is a top perspective view of the fluid transfer system of FIG. 20A.

With respect to FIGS. 20A-20B, a fluid transfer system 730 is provided that is similar in many respects to the fluid transfer system 122 discussed above such that the differences will be highlighted. The fluid transfer system 730 includes a pump tray 732 and a spout 734. Similar to the spout 112 discussed above, the spout 734 includes a side panel 734A that may be separated from the main body 734B of the spout 734. The spout 734 may also include a bellows 736 that may be pressed by a roller 737 (FIG. 21C) of a piston 738 of the condiment dispenser 700 as the piston 738 is reciprocated to aid in pumping fluid up and through the spout 734 to a dispensing opening 739 of the spout 734. The roller 737 may also be moved off of the bellows 736 to release the bellows 736 to draw the fluid from the dispensing opening 739 to inhibit fluid from dripping from the dispensing opening 739. In spout 734, the bellows 736 is included on the main body 734B of the spout 734. A lower portion 740 of the main body 734B below the bellows 736 may have an increased width relative to an upper portion 742 of the main body 734B above the bellows 736. The increased width of the lower portion 740 of the main body 734B may limit the movement of the roller 737 of the piston 738 as the piston 738 is moved downward to press the bellows 736. For example, the roller 737 may roll along the bellows 736 until the roller 737 abuts stop edge 740A of the main body 734B inhibiting the roller 737 from passing to the lower portion 740 of the main body 734B.

The side panel 734A of the spout 734 may include hooks 744. The hooks 744 may be used to secure the side panel 734A within a dishwasher. For example, when the spout 734 is disassembled for cleaning in a dishwasher, the hooks 744 may be used to secure the side panel 734A to a rack of the dishwasher. The hooks 744 may inhibit the side panel 734A from moving substantially as water is sprayed on the side panel 734A by the dishwasher during the cleaning cycle which may, for example, inhibit the side panel 734A from moving around the dishwasher during the cleaning cycle and potentially becoming lost.

Figure 21A:
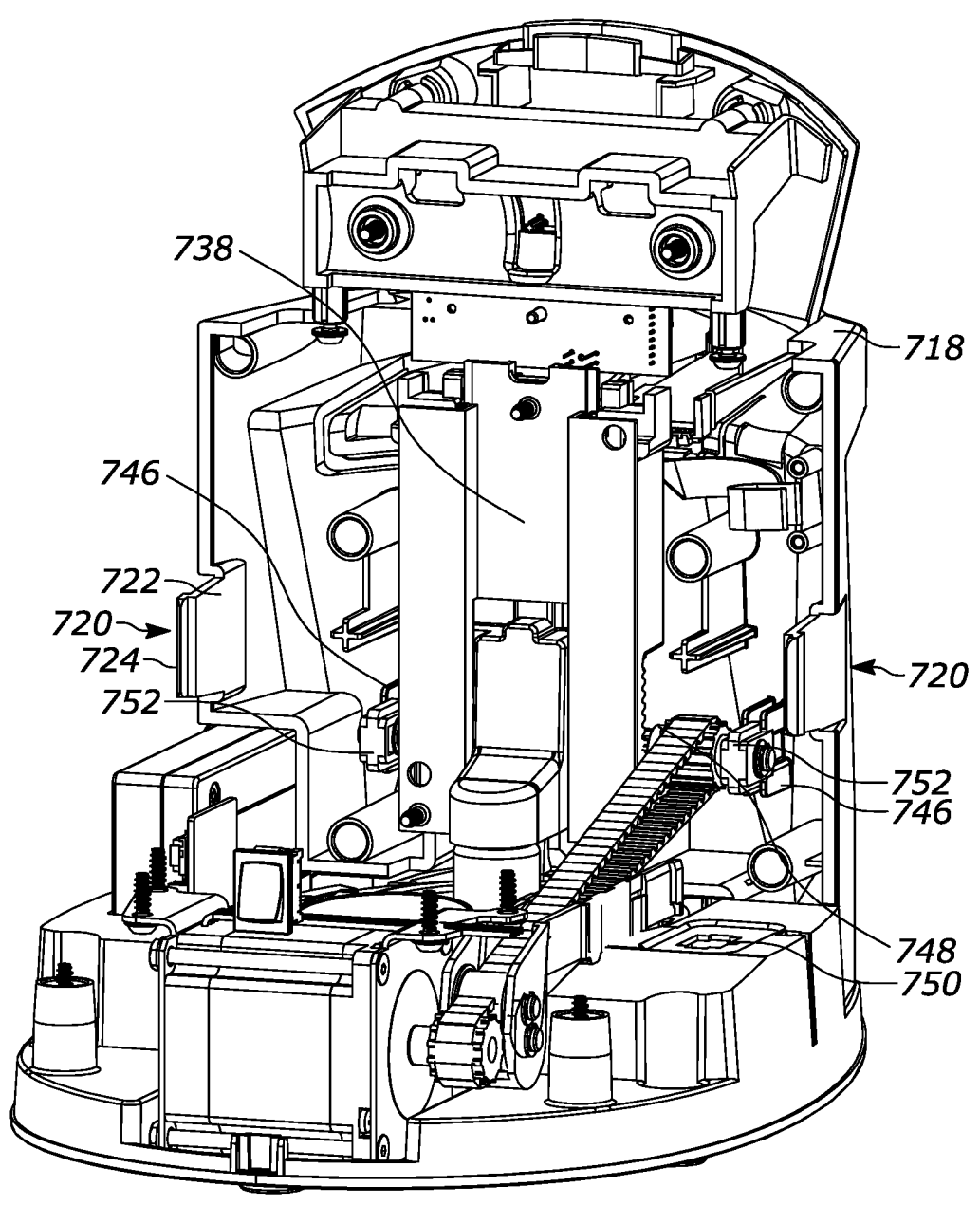
FIG. 21A is a rear perspective view of the condiment dispenser of FIG. 19A shown with a cartridge receiver removed.
Figure 21B:
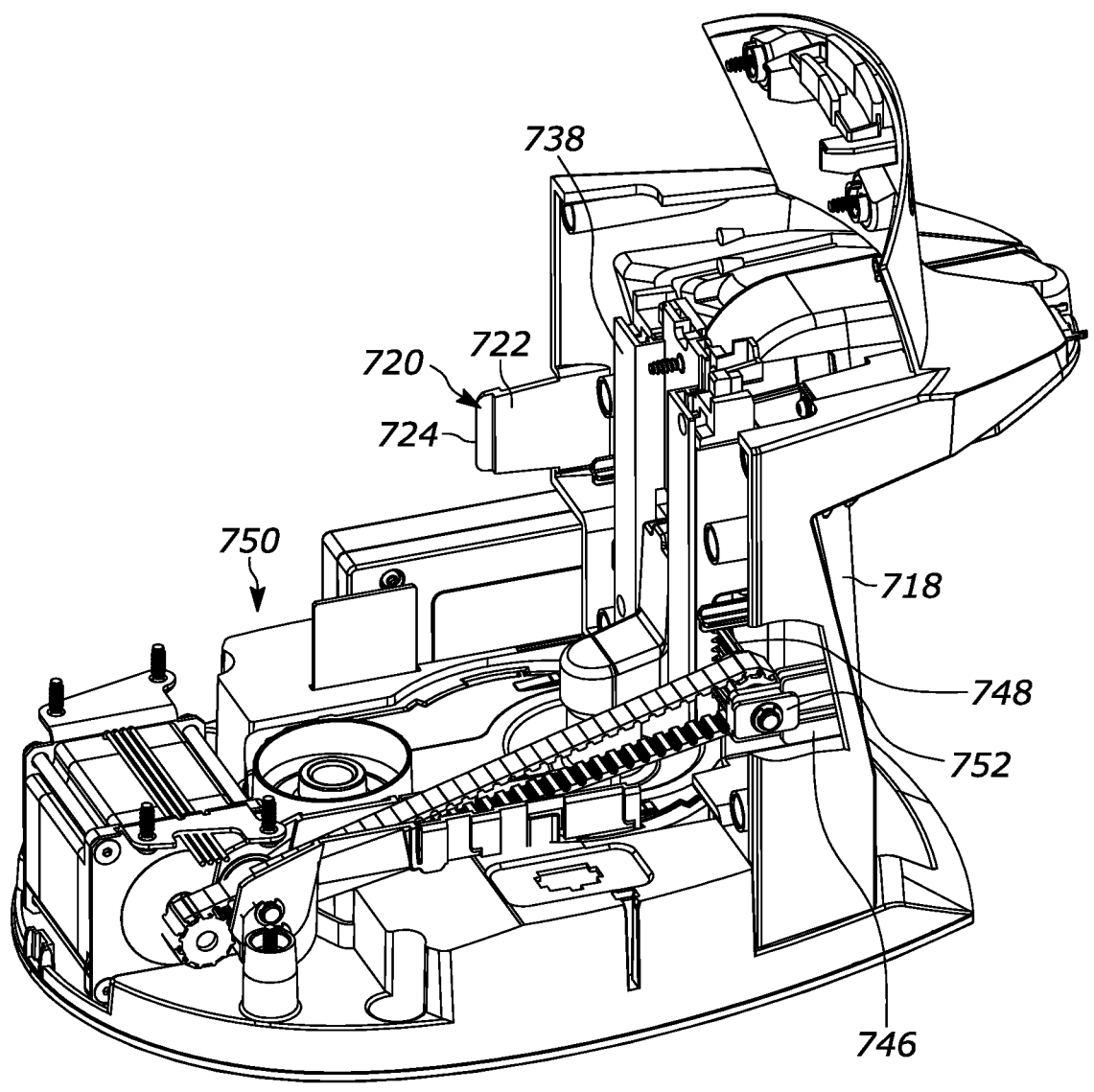
FIG. 21B is a side partial cutaway view of the condiment dispenser as shown in FIG. 21A.
Figure 21C:
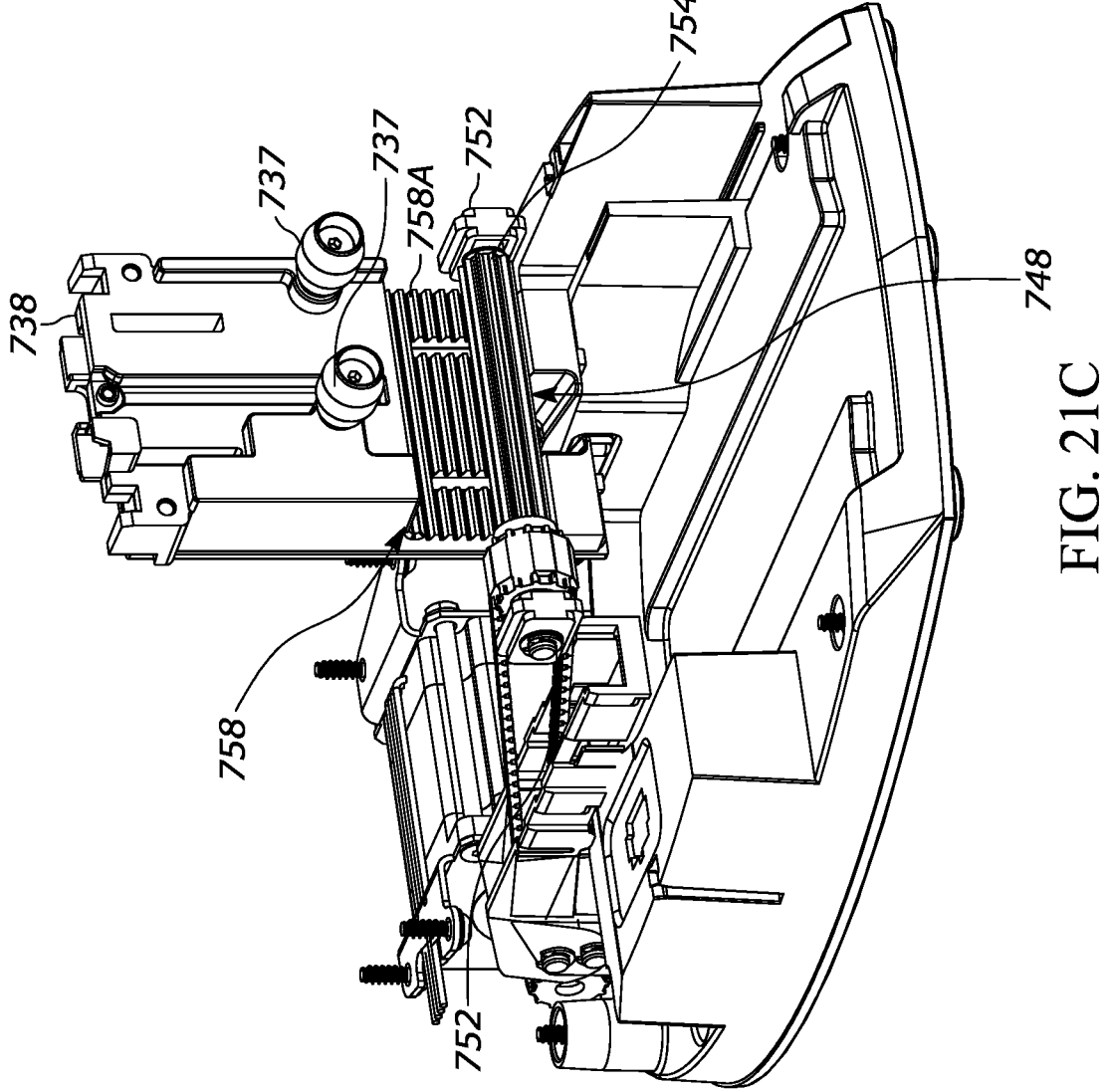
FIG. 21C is a front perspective view of a portion of the condiment dispenser of FIG. 19A showing a driveshaft and a piston.

With respect to FIGS. 21A-21B, the front support 718 includes arms 746 that may support a shaft 748 of the pump drive system 750 of the condiment dispenser 700. Attachment brackets 752 may be secured to the ends of the shaft 748 that permit the shaft 748 to rotate therein. The attachment brackets 752 may be mounted to the arms 746 to support the shaft 748 and to permit the shaft 748 to be rotated by the pump drive system 750 to move the piston 738 upward and downward. With respect to FIG. 21C, the shaft 748 may include gear teeth 754 that extend along the length of the shaft 748 span the width or a substantial portion of the width of the piston 738. The gear teeth 754 of the shaft 748 engage the teeth 758A of the piston 738 such that rotation of the shaft 748 causes the piston 738 to move upward and/or downward which may cause the condiment dispenser 700 to dispense fluid. Having the gear teeth 754 of the shaft 748 extend along teeth 758A of the piston 738 along the width of the piston 738 may reduce the amount of slippage that may occur between the shaft 748 and the piston 738 during operation due to the increased area of contact between the shaft 748 and the piston 738.

Figure 22A:
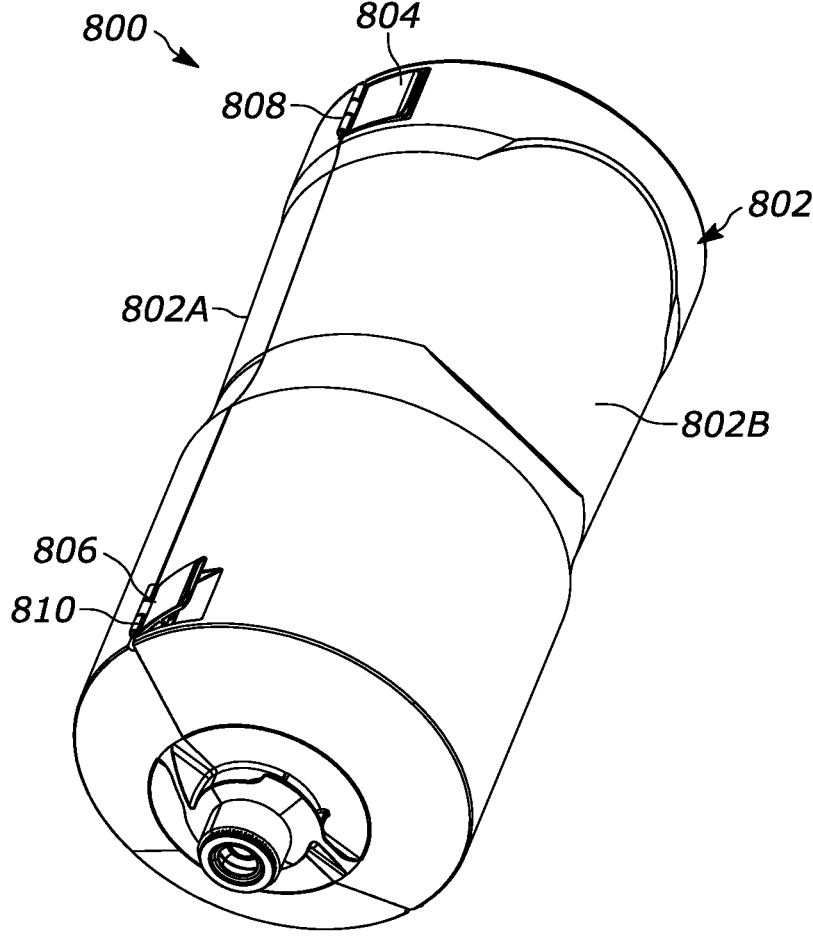
FIG. 22A is a perspective view of a condiment cartridge according to another embodiment.
Figure 22B:
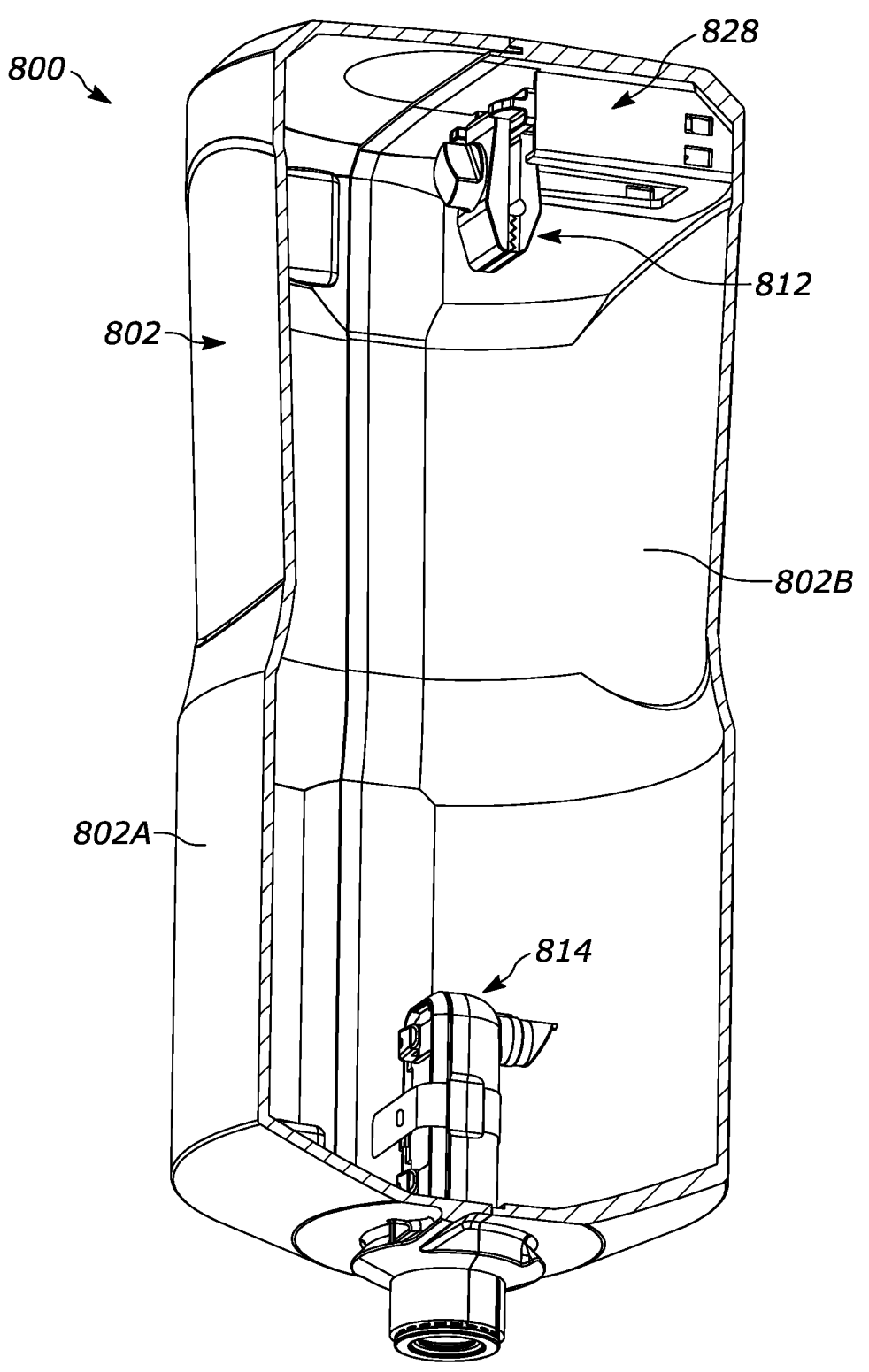
FIG. 22B is cross-sectional view of the condiment cartridge of FIG. 22A.
Figure 22C:
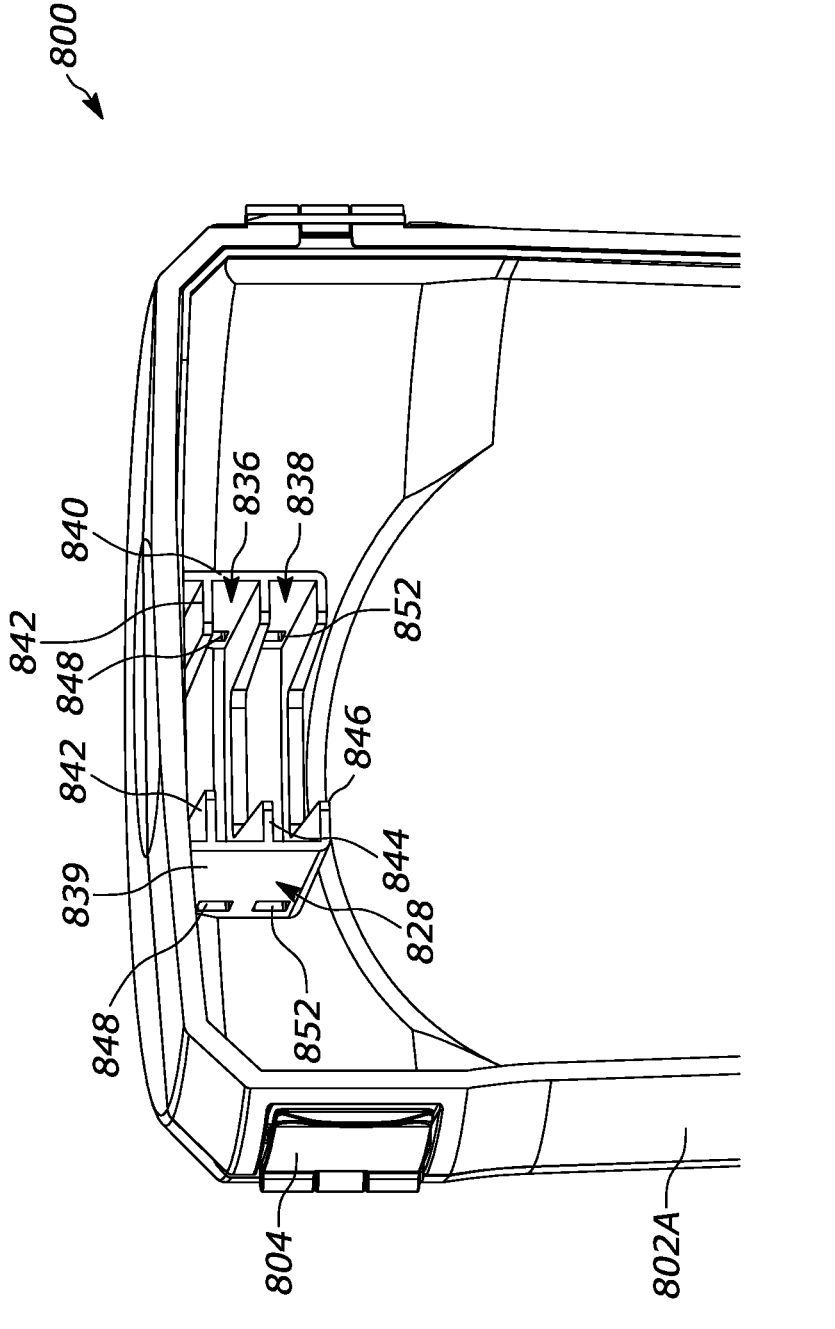
FIG. 22C is a perspective view of an upper portion of the condiment cartridge of FIG. 22A.

With respect to FIGS. 22A-22C, a condiment cartridge 800 is shown according to another embodiment that may be used with the condiment dispensers of the embodiments discussed above. The condiment cartridge 800 is similar in many respects to the condiment cartridge 104 discussed above such that the differences will be highlighted. The condiment cartridge 800 includes a cartridge body 802 having first and second halves 802A, 802B hingedly connected together that may be moved between open and closed configurations. The condiment cartridge 800 includes upper and lower clasps 804, 806 that may be used to secure the first and second halves 802A, 802B of the cartridge body 802 together in the closed configuration to inhibit substantial movement of the first half 802A relative to the second half 802B about the hinged connection. The upper and lower clasps 804, 806 may be connected to the first half 802A by upper and lower hinges 808, 810 that the upper and lower clasps 804, 806 pivot about. The upper and lower clasps 804, 806 may be snapped to a corresponding ledge or hook of the second half 802B to secure the cartridge body 802 in the closed configuration. The upper and lower clasps 804, 806 may be pried away from the second half 802B to unsnap the upper and lower clasps 804, 806 to permit the first and second halves 802A, 802B to be moved about the hinged connection toward an open configuration, for example, to remove and/or load a condiment pouch.

With respect to FIGS. 22B, the cartridge 800 includes a pouch holder 812 mounted to an upper portion of the interior of the cartridge body 802. The pouch holder 812 may be clamped to a condiment pouch inserted into the cartridge 800 to suspend the condiment pouch within the cartridge when the cartridge 800 is inserted into a condiment dispenser. Suspending the condiment pouch within the cartridge 800 may aid in draining condiment from the condiment pouch and directing the condiment toward a dispenser-pouch adapter 814. For instance, clipping the condiment pouch to the upper portion of the cartridge body 802 inhibits the condiment pouch from collapsing about the dispenser-pouch adapter 814 which may restrict the flow of condiment from the condiment pouch and inhibit condiment from being evacuated from the condiment pouch.

Figure 23B:
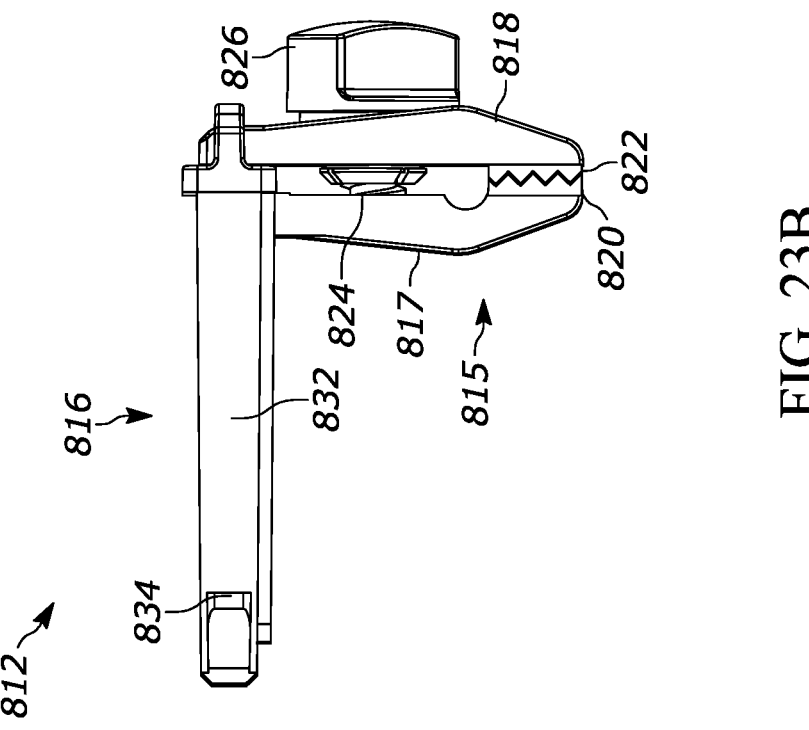
FIGS. 23A-23B are a top perspective and side elevation views, respectively, of a pouch clip of the condiment cartridge of FIG. 22A.
Figure 23A:
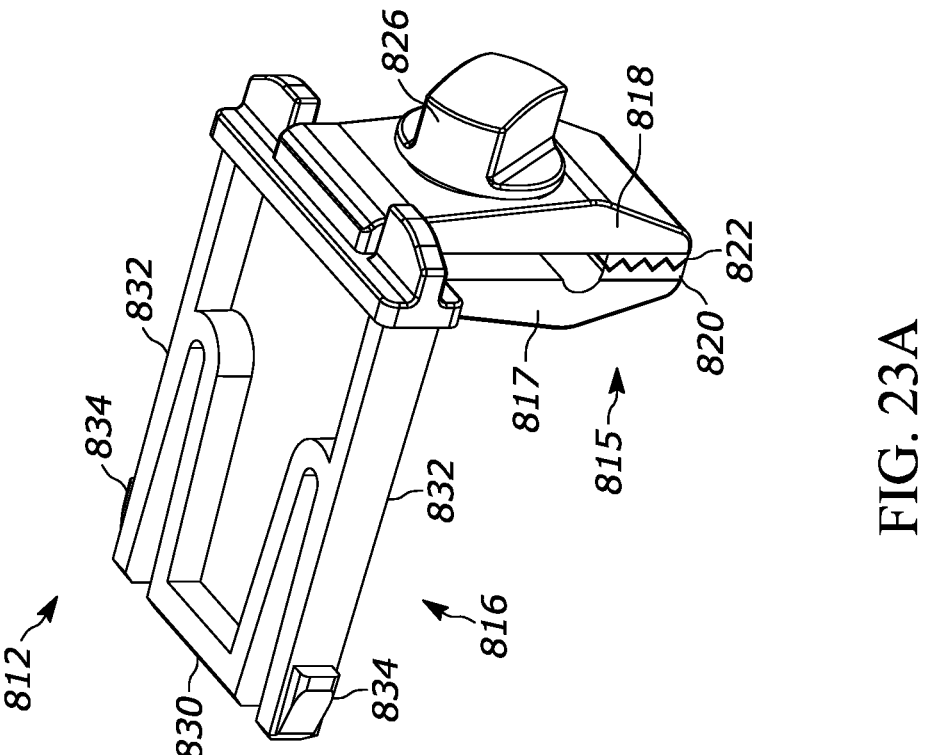

With respect to FIGS. 23A-23B, the pouch holder 812 includes a claw 815 and a buckle 816. The claw 815 includes opposing plates or arms 817, 818 that may be pressed against one another to retain an object therebetween. For example, a portion of the condiment pouch may be held between the arms 817, 818 such that the arms 817, 818 clamp the portion of the condiment pouch therebetween to retain the condiment pouch. The arms 817, 818 may each include a ribbed clamping surface 820, 822 that may aid in retaining the condiment pouch therebetween. For example, the ribs of the clamping surfaces 820, 822 may intermesh (see FIG. 23B) which inhibits the condiment pouch from sliding along the clamping surfaces 820, 822 and out of the claw 815. The arms 817, 818 of the claw 815 may be drawn together by a screw 824. The screw 824 includes a head 826 that may be grasped by a user to turn the screw 824. The screw 824 may extend through the second arm 818 and into a threaded hole of the first arm 817. Rotating the head 826 of the screw 824 in a first direction draws the first arm 817 toward the second arm 818. The head 826 of the screw 824 may be rotated in the first direction until the clamping surfaces 820, 822 of the arms 817, 818 contact one another. The portion of the condiment pouch may be positioned between the clamping surfaces 820, 822 of the arms 817, 818 before drawing the arms 817, 818 toward one another to clamp the condiment pouch between the clamping surfaces 820, 822 of the arms 817, 818. The head 826 of the screw 824 may be rotated in the opposite direction to move the arms 817, 818 apart from one another. Where a portion of the condiment pouch is clamped between the arms 817, 818, the head 826 may be rotated to release the condiment pouch, for example, to replace the condiment pouch.

The buckle 816 of the pouch holder 812 may be inserted into a buckle receiver 828 (FIG. 22B-22C) of the cartridge body 802 to attach the pouch holder 812 to the cartridge body 802. As shown in FIG. 23A-23B, the buckle 816 includes deflectable arms 832 extending from the claw 815. A connecting portion 830 may extend between the deflectable arms 832 to bias the deflectable arms 832 toward an original or resting position. The deflectable arms 832 include an angled protrusion 834 at the ends thereof. With respect to FIG. 22C, the buckle receiver 828 includes an upper slot 836 and a lower slot 838 into which the buckle 816 of the pouch holder 812 may be inserted to secure the pouch holder 812 to the cartridge body 802. The buckle receiver 828 includes sidewalls 839, 840 depending from the cartridge body 802. Upper walls 842, middle walls 844, and lower walls 846 extend inward from the sidewalls to form the upper slot 836 and the lower slot 838. While the buckle receiver 828 shown includes both an upper slot and a lower slot, the buckle receiver 828 may include any number of slots for mounting the pouch holder 812 at different heights within the cartridge body 802. In some embodiments, the buckle receiver 828 includes a single slot for mounting the pouch holder 812.

The sidewalls 839, 840 include upper openings 848 adjacent the upper slot 836 between the upper walls 842 and middle walls 844 and lower openings 852 adjacent the lower slot 838 between the middle walls 844 and lower walls 846. The buckle 816 may be inserted into the upper slot 836 or lower slot 838 to attach the pouch holder 812 to the buckle receiver 828. To insert the buckle 816 into the upper slot 836, for example, the angled protrusions 834 of the deflectable arms 832 may be aligned with the upper slot 836 and inserted between the upper walls 842 and middle walls 844. As the buckle 816 is inserted, the angled protrusions 834 contact the sidewalls 839, 840 causing the deflectable arms to be deflected inward. The buckle 816 may be inserted into the upper slot 836 until the angled protrusions 834 are aligned with the upper openings 848 at which point the deflectable arms 832 elastically return to their original positions with the angled protrusions 834 extending into the upper openings 848. The angled protrusions 834 hook the upper openings 848 which inhibits the buckle 816 from being withdrawn from the upper slot 836. Force may be applied to the angled protrusions 834 (e.g., with a finger or tool) to deflect the deflectable arms 832 inward until the angled protrusions 834 are no longer within the upper openings 848 such that the buckle 816 may be withdrawn from the upper slot 836. The buckle 816 may similarly be inserted into and removed from the lower slot 838. The user may select which of the upper slot 836 or lower slot 838 to insert the buckle 816 to set the height from which the condiment pouch is suspended. For example, for smaller condiment pouch sizes, the user may insert the buckle 816 into the lower slot 838 so that the condiment pouch is able to be extended to the dispenser-pouch adapter 814 at the lower end of the cartridge 800.

Figure 12A:
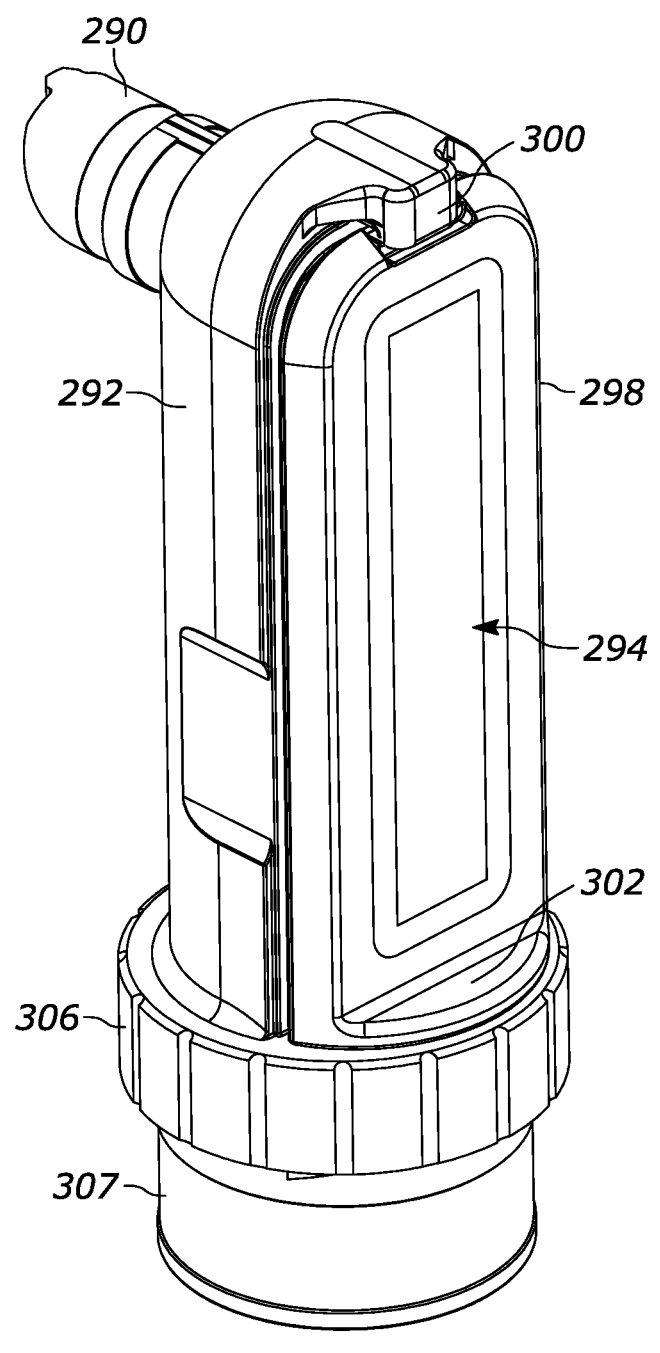
FIG. 12A is a side perspective view of a dispenser-pouch adapter of the cartridge of FIG. 11A.
Figure 12B:
FIG. 12B is a perspective view of the dispenser-pouch adapter of FIG. 12A shown with a side panel removed.
Figure 12B:
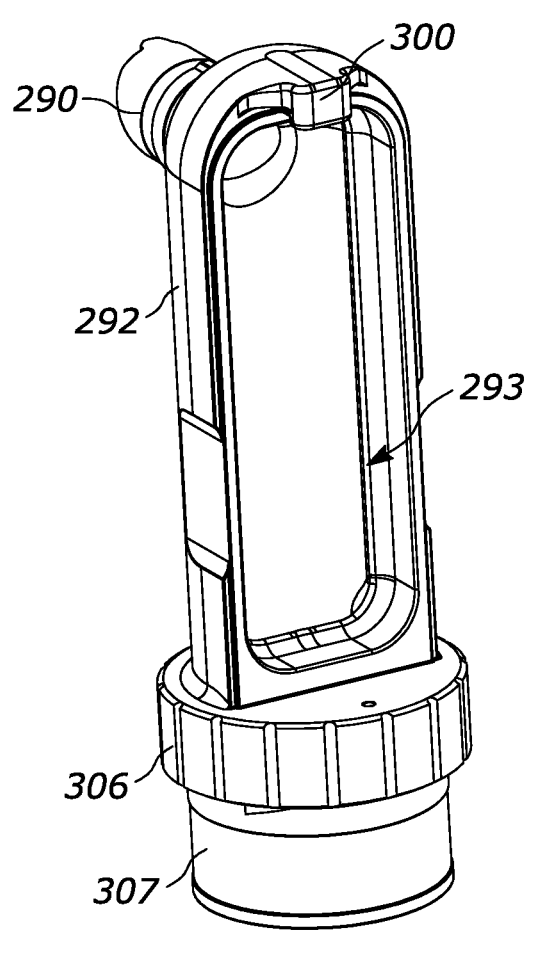
Figure 12B:
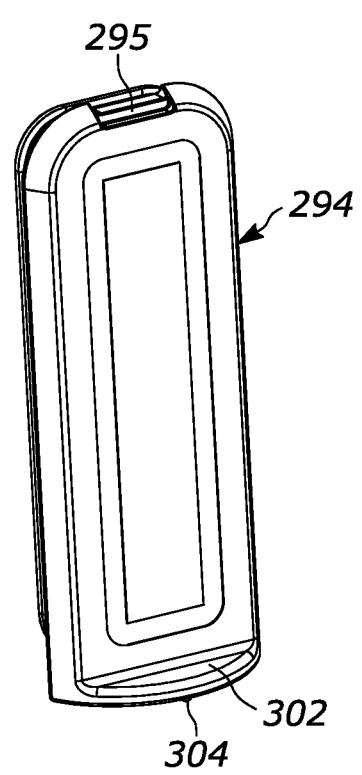
Figure 12C:
FIG. 12C is a side perspective view of the dispenser-pouch adapter of FIG. 12A shown in a disassembled configuration.
Figure 12C:
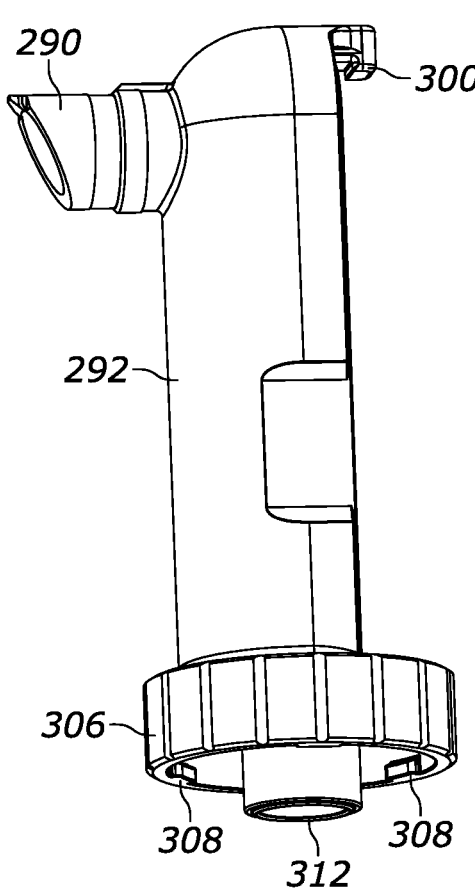
Figure 12C:
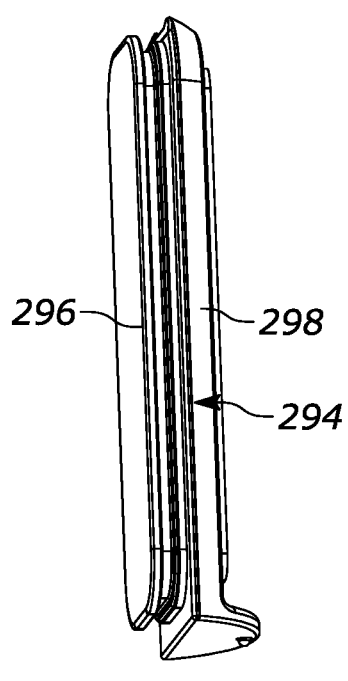
Figure 12C:
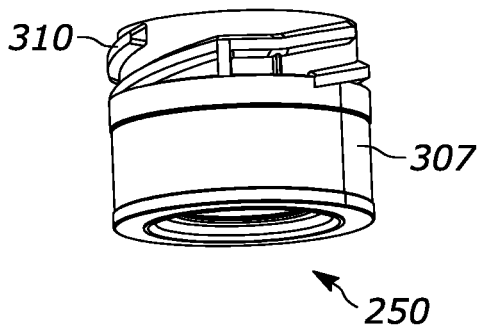
Figure 12D:
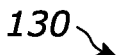
FIG. 12D is a bottom perspective view of the dispenser-pouch adapter of FIG. 12A shown in a disassembled configuration.
Figure 12D:
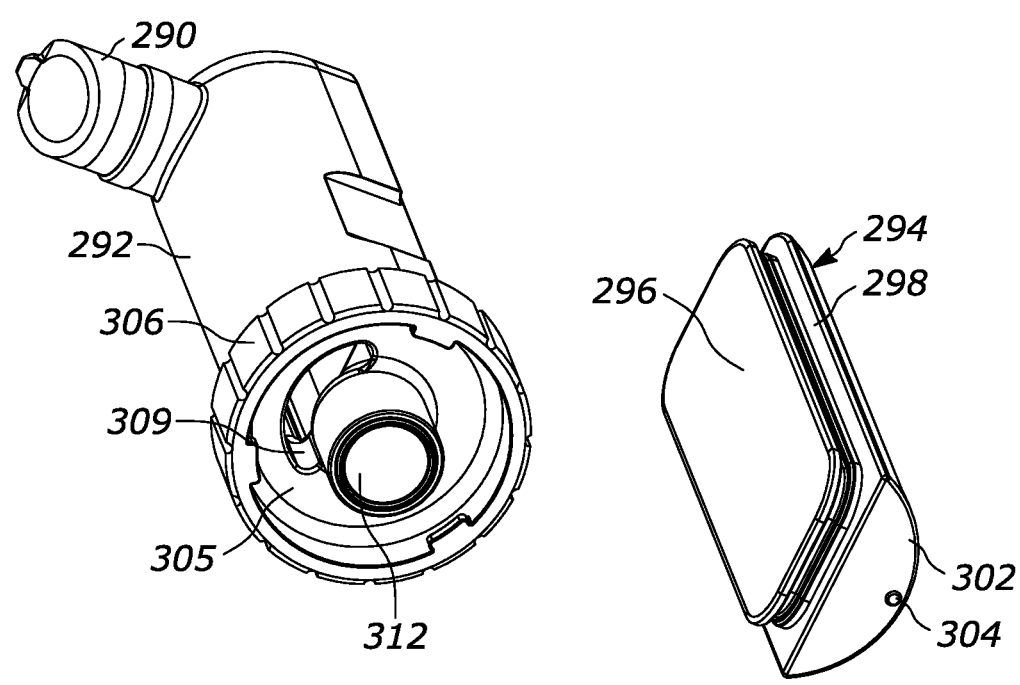
Figure 12D:
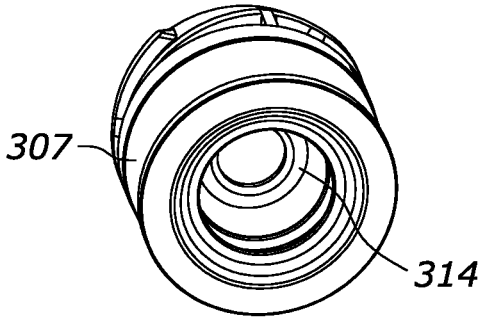
Figure 12E:
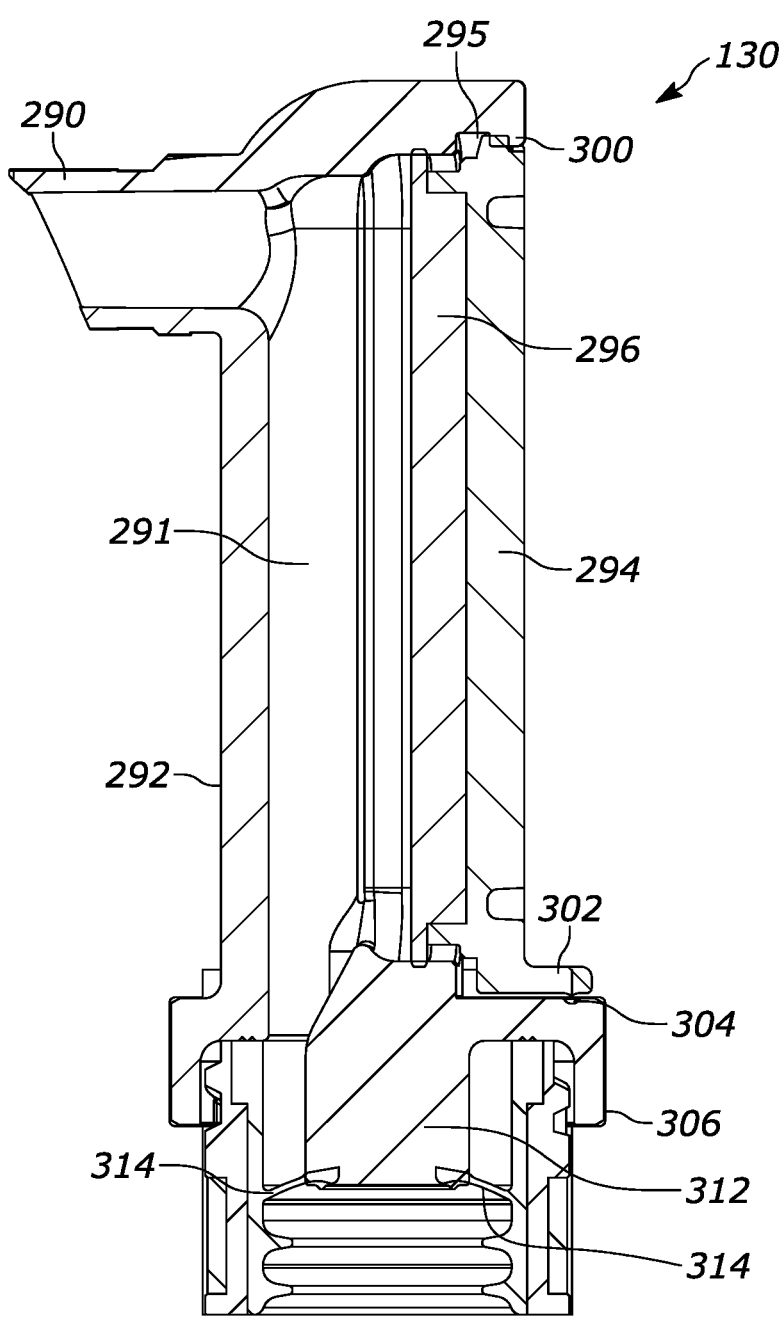
FIG. 12E is a side cross-section view of the dispenser-pouch adapter of FIG. 12A.
Figure 12F:
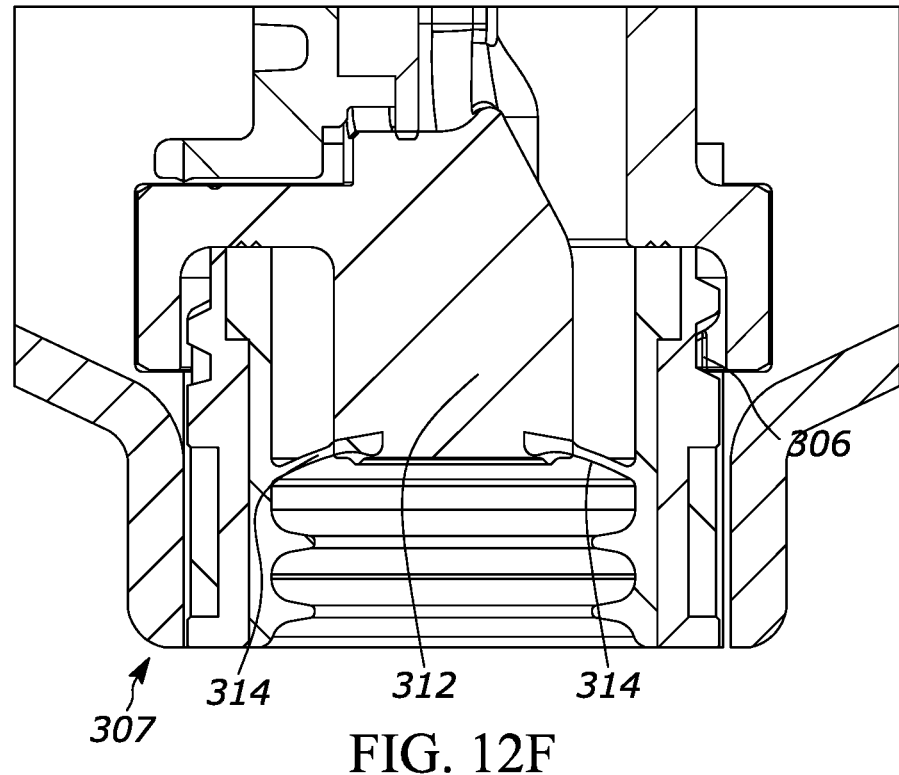
FIG. 12F is a side cross-section view of a valve of the dispenser-pouch adapter of FIG. 12A in a closed configuration.
Figure 12G:
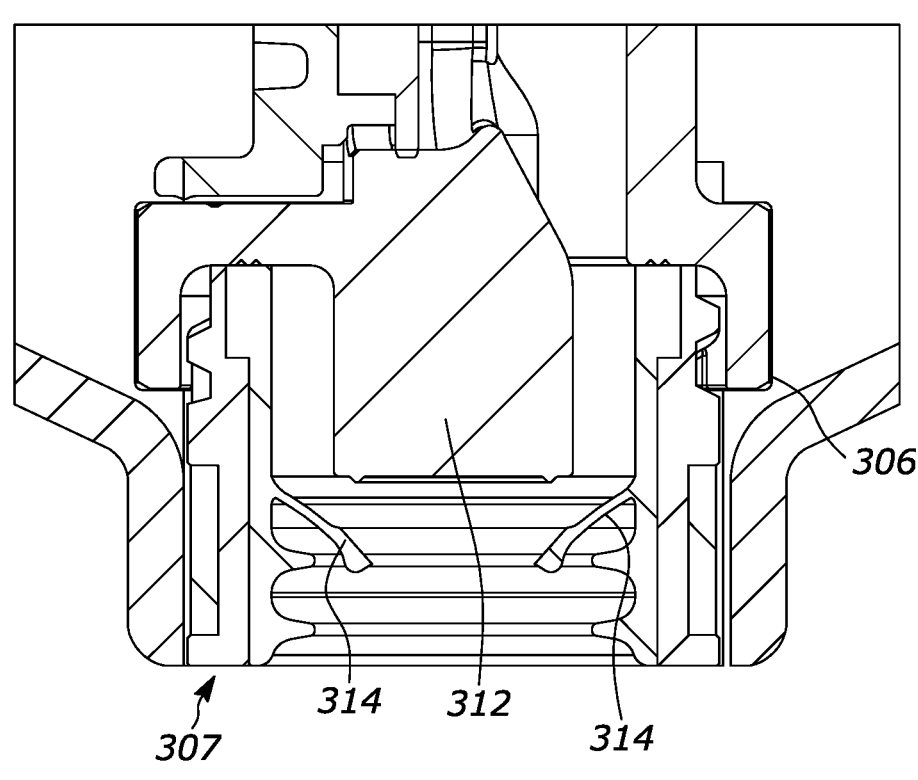
FIG. 12G is a side cross-section view of the valve of the dispenser-pouch adapter of FIG. 12A in an open configuration.
Figure 24B:
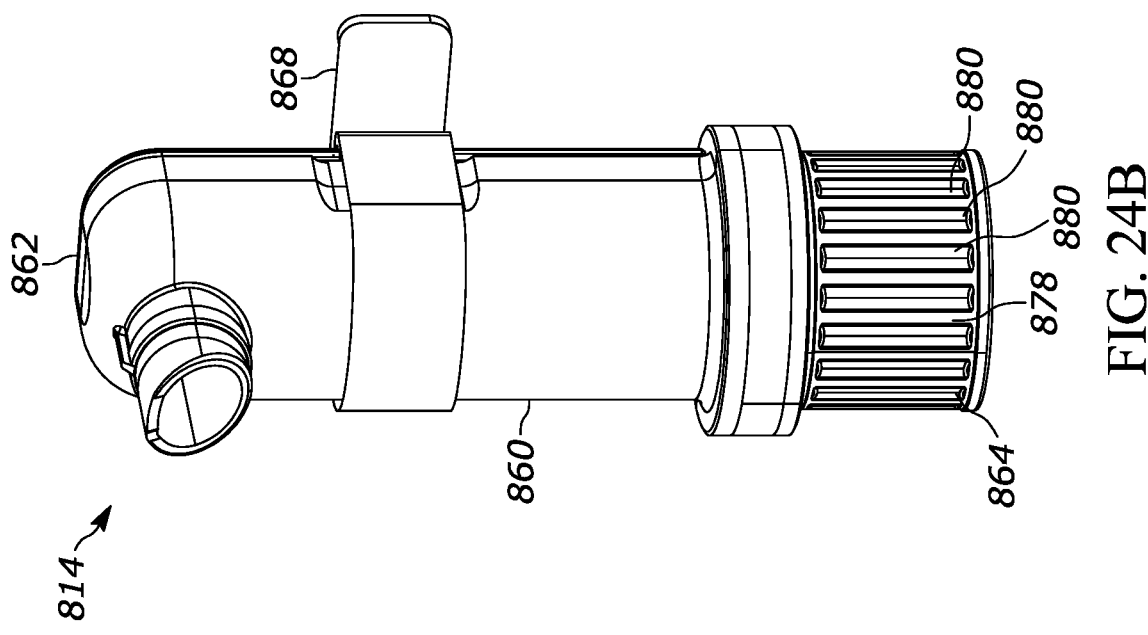
FIGS. 24A-24B are a front perspective and rear perspective views, respectively, of a dispenser-pouch adapter of the condiment cartridge of FIG. 22A.
Figure 24A:
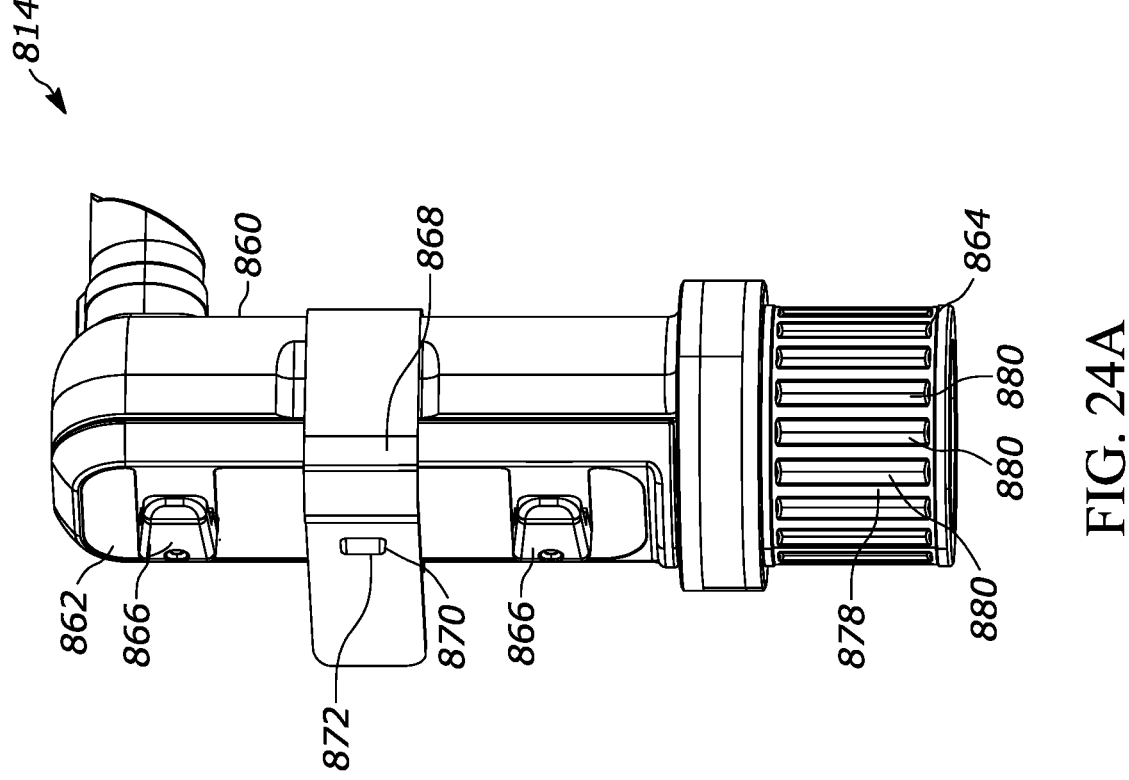

With respect to FIGS. 24A-24B, the dispenser-pouch adapter 814 is similar in many respects to the dispenser-pouch adapter 130 of FIGS. 12A-12C such that the differences will be highlighted. The dispenser-pouch adapter 814 includes a main body 860, a side panel 862, and an inlet valve 864. The side panel 862 may be removed from the main body 860 to provide access to the interior of the dispenser-pouch adapter 814, for example, for cleaning. The side panel 862 may include hooks 866. The hooks 866 may be used to attach the side panel 862 to a rack of a dishwasher. For example, when the dispenser-pouch adapter 814 is disassembled for cleaning in a dishwasher, the hooks 866 may be used to secure the side panel 862 to a rack of the dishwasher. The hooks 866 may inhibit the side panel 862 from moving substantially as water is sprayed on the side panel 862 by the dishwasher during the cleaning cycle which may, for example, inhibit the side panel 862 from moving around the dishwasher during the cleaning cycle and potentially becoming lost.

The dispenser-pouch adapter 814 may include a strap 868 to secure the side panel 862 to the main body 860. The strap 868 may be wrapped about the main body 860 and side panel 862 to secure the side panel 862 to the main body 860 once the side panel 862 has been attached to the main body 860. The strap 868 may be mounted to the side panel 862 such that the strap 868 is not removable from the side panel 862. For example, the strap 868 may be secured to the side panel 862 by an adhesive. In other forms, the strap 868 is secured to the main body 860. The strap 868 may be formed of a flexible material such as a rubber. The strap 868 may include an opening 870 and a protrusion 872. The protrusion 872 may be extended through the opening 870 of the strap 868 to secure the strap 868. The protrusion 872 may have a neck portion and head portion having a greater width than the neck portion. The head portion may be sized such that force is required to pass the head portion through the opening 870 of the strap 868. In use, a user may insert the side panel 862 into the main body 860 of the dispenser-pouch adapter 814. An end of the strap 868 may be wound about the main body 860 until the opening 870 is aligned with the protrusion 872. The head portion of the protrusion 872 may be forced through the opening 870 in the strap 868 to secure the strap about the side panel 862 and main body 860. The strap 868 thus holds the side panel 862 to the main body 860 and inhibits separation of the side panel 862 from the main body 860, for example, as condiment is pumped through the dispenser-pouch adapter 814.

The inlet valve 864 may have a cylindrical body that is clamped by the lower portions of the cartridge body 802 when the cartridge 800 is in a closed configuration. An outer surface 878 of the inlet valve 864 may include a plurality of ribs 880 which may aid to inhibit the inlet valve 864 from rotating relative to the cartridge body 802 when in the closed configuration. The ribs 880 further provide a user with grip to rotate the inlet valve 864 relative to the body 860, for example, when assembling or disassembling the dispenser-pouch adapter 814.

Figure 25A:
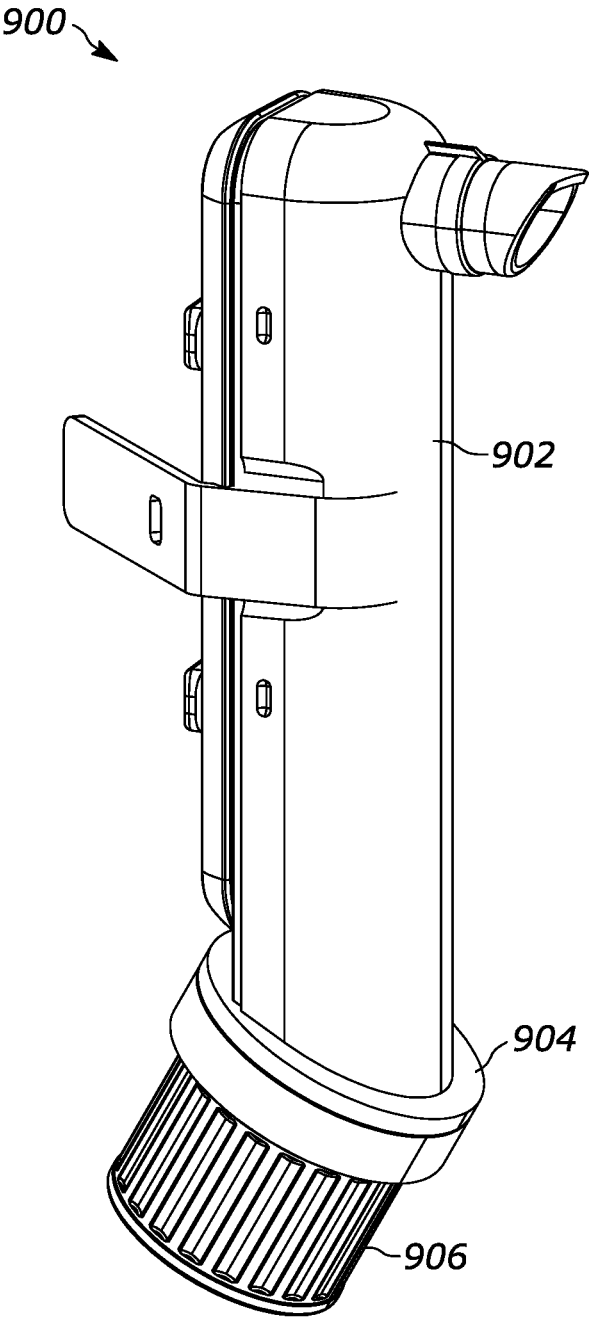
FIG. 25A is a perspective view of a dispenser-pouch adapter according to another embodiment.
Figure 25B:
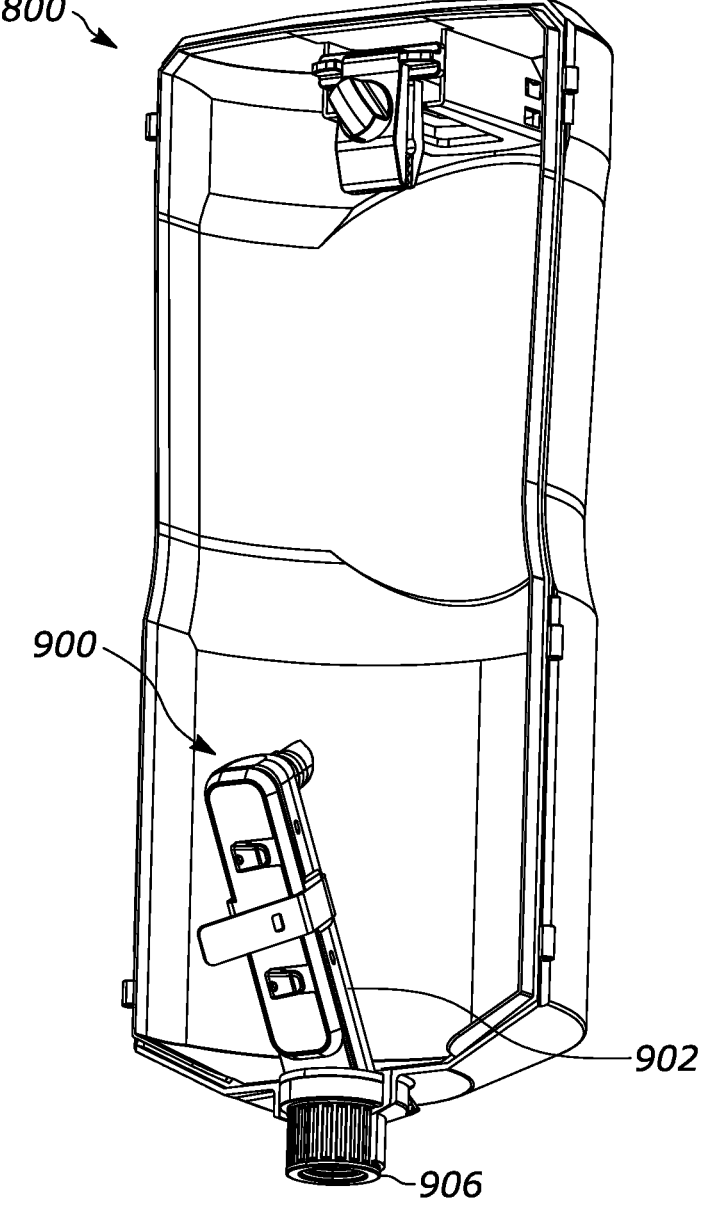
FIG. 25B is a cross-sectional view of the condiment cartridge of FIG. 22A including the dispenser-pouch adapter of FIG. 25A.

With respect to FIGS. 25A-25B, a dispenser-pouch adapter 900 is shown according to another embodiment. The dispenser-pouch adapter 900 is similar to the dispenser-pouch adapters of the embodiments discussed above such that the differences will be highlighted. As shown in FIG. 25A, the main body 902 of the dispenser-pouch adapter 900 extends from the base portion 904 obliquely or at an angle relative to the inlet valve 906. As shown in FIG. 25B, when installed in the cartridge 800, the dispenser-pouch adapter 900 does not extend vertically but instead extends outward toward the cartridge body 802 as it extends upward. This angled configuration of the dispenser-pouch adapter 900 is allows for additional space within the cartridge 800 into which a condiment pouch may be inserted. Using the angled configuration of the dispenser-pouch adapter 900 thus allows a larger sized condiment pouch to be loaded into the condiment cartridge 800.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A cartridge for containing condiment, the cartridge comprising:
   a body having an inner substantially cylindrical surface for containing a fluid, the body having a first end defining an opening;
   a plunger disposed within the body and configured to slide axially within the body to force fluid within the body toward the opening;
   a valve within the opening sealing the fluid within the body and permitting the fluid to exit the body, the valve including a sealing flap engaging a sealing post of the body positioned within the opening of the body to form a fluid tight connection therebetween, the sealing flap configured to be moved from the sealing post to permit fluid to be withdrawn through the valve.

2. The cartridge of claim 1 wherein the first end is configured to be removably secured to a cartridge receiver of a condiment dispenser.

3. The cartridge of claim 2 wherein the first end includes at least one locking slot configured to receive a corresponding protrusion of the condiment dispenser to secure the cartridge to the condiment dispenser.

4. The cartridge of claim 3 wherein the at least one locking slot is two or more locking slots, the cartridge being rotated relative to the condiment dispenser to position corresponding protrusions of the condiment dispenser within the two or more locking slots.

5. The cartridge of claim 1 wherein the plunger includes at least one seal configured to extend between a body of the plunger and the inner substantially cylindrical surface of the body.

6. He cartridge of claim 1 wherein the plunger is positioned axially within the body and having a first seal and a second seal spaced apart axially to maintain an orientation of the plunger within the body, the first and second seals extending radially from the plunger to the inner substantially cylindrical surface of the body.

7. The cartridge of claim 1 wherein the plunger includes a substantially frustoconical nose corresponding to a substantially conical face of the first end.

8. A cartridge for receiving a condiment pouch, the cartridge comprising:
   a body including a first portion and a second portion coupled together via a hinge, the first portion configured to be secured to the second portion to inhibit the first portion from moving substantially relative to the second portion about the hinge and to form an opening at a first end of the body;
   an adapter configured to be positioned within the opening and including a first end having a piercing portion for insertion into a pouch containing condiment and a second end for connection to a fluid inlet of a condiment dispenser, a channel extending from the first end to the second end through the adapter, a removable panel to permit access to the channel, a body having a side opening, the panel including an insertion portion configured to be positioned within the side opening of the body when the panel is attached to the body, the adapter including a valve sealing fluid within the adapter and permitting fluid to be withdrawn from the adapter.

9. The cartridge of claim 8 wherein the adapter includes a body that extends obliquely relative to a central axis of the body of the cartridge.

10. The cartridge of claim 8 wherein the valve is a one-way valve inhibiting fluid from entering the adapter at the second end.

11. The cartridge of claim 8 wherein the adapter includes a body having an attachment skirt at the second end, the valve removably attached to an interior surface of the attachment skirt of the adapter body.

12. The cartridge of claim 11 wherein the valve includes a sealing flap engaging a sealing protrusion of the adapter body when the valve is attached to the adapter body to form a fluid tight connection therebetween, the sealing flap configured to be moved from the sealing protrusion to permit fluid to be withdrawn through the adapter.

13. The cartridge of claim 8 wherein the first portion of the body includes a tab having a hook and the second portion of the body includes a ridge, wherein the hook of the tab is snapped to the ridge to secure the first portion to the second portion.

14. A cartridge for receiving a condiment pouch, the cartridge comprising:

a body including a first portion and a second portion coupled together via a hinge, the first portion configured to be secured to the second portion to inhibit the first portion from moving substantially relative to the second portion about the hinge and to form an opening at a first end of the body;

an adapter configured to be positioned within the opening and including a first end having a piercing portion for insertion into a pouch containing condiment and a second end for connection to a fluid inlet of a condiment dispenser, a channel extending from the first end to the second end through the adapter, the adapter including a valve sealing fluid within the adapter and permitting fluid to be withdrawn from the adapter; and a pouch holder mounted to a second end of the body opposite the first end and configured to suspend at least a portion of the condiment pouch, wherein the body includes a receiver and the pouch holder includes a buckle insertable into the receiver to reversibly secure the pouch holder to the body.

15. The cartridge of claim 14 wherein the pouch holder includes a claw having a first plate and a second plate to clamp a portion of a condiment pouch therebetween.

\*   \*   \*   \*   \*